US007873721B2

(12) United States Patent
Hitaka et al.

(10) Patent No.: US 7,873,721 B2
(45) Date of Patent: Jan. 18, 2011

(54) INFORMATION PROCESSING SYSTEM, INFORMATION PROCESSING APPARATUS, INFORMATION PROCESSING METHOD, STORAGE MEDIUM THAT STORES PROGRAM FOR IMPLEMENTING IT TO BE READABLE BY INFORMATION PROCESSING APPARATUS AND THAT PROGRAM

(75) Inventors: Yosato Hitaka, Tokyo (JP); Akihiro Masukawa, Kanagawa (JP); Hiroshi Satomi, Kanagawa (JP); Kenji Kasai, Tokyo (JP); Yoichi Matsuyama, Kanagawa (JP); Shigeyuki Mitani, Kanagawa (JP); Koichiro Tanaka, Kanagawa (JP); Satoshi Watanabe, Tokyo (JP); Tomonobu Hiraishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 11/750,749

(22) Filed: May 18, 2007

(65) Prior Publication Data

US 2007/0226330 A1    Sep. 27, 2007

Related U.S. Application Data

(62) Division of application No. 10/378,633, filed on Mar. 5, 2003, now abandoned.

(30) Foreign Application Priority Data

| Mar. 6, 2002 | (JP) | ............................. 2002-060904 |
| Mar. 6, 2002 | (JP) | ............................. 2002-060905 |

(51) Int. Cl.
   *G06F 15/173* (2006.01)
(52) U.S. Cl. ........................ 709/223; 709/200; 709/224; 358/1.14

(58) Field of Classification Search .................. 709/204, 709/200, 223–224; 358/1.14–1.16
See application file for complete search history.

(56) References Cited

U.S. PATENT DOCUMENTS 6,064,838 A * 5/2000 Maruta et al. .................. 399/79

(Continued)

FOREIGN PATENT DOCUMENTS

CN          1327190 A    12/2001

(Continued)

*Primary Examiner*—William C Vaughn, Jr.
*Assistant Examiner*—Mohamed Ibrahim
(74) *Attorney, Agent, or Firm*—Fitzpatrick, Cella, Harper & Scinto

(57) ABSTRACT

Upon transferring image data stored in a first information processing apparatus (photo site) to a second information processing apparatus (print site), at least one of information that pertains to whether or not the image data is to be acquired by the second information processing apparatus, information that pertains to whether or not the image data has already been acquired by the second information processing apparatus, and information that pertains to the number of times of acquisition of the image data by the second information processing apparatus is managed, and whether or not unwanted image data is transferred to the second information processing apparatus, and whether or not image data illicitly leaks to the second information processing apparatus are monitored on the basis of the managed information. The first information processing apparatus (photo site) prepares required image data in accordance with the current state of a series of processes to be executed by the second information processing apparatus (print site), and passes it to the second information processing apparatus, thereby preventing the first information processing apparatus that saves image data from passing unwanted image data to the second information processing apparatus that processes image data.

6 Claims, 81 Drawing Sheets

U.S. PATENT DOCUMENTS

| | | | |
|---|---|---|---|
| 6,324,521 B1 | 11/2001 | Shiota et al. | 705/27 |
| 6,636,259 B1* | 10/2003 | Anderson et al. | 348/211.3 |
| 6,727,973 B2* | 4/2004 | Mizumo | 355/40 |
| 6,876,461 B2 | 4/2005 | Usami | 358/1.15 |
| 2002/0051191 A1 | 5/2002 | Naito et al. | 358/1.15 |
| 2002/0063889 A1* | 5/2002 | Takemoto et al. | 358/1.15 |
| 2002/0080397 A1 | 6/2002 | Igarashi et al. | 358/1.15 |
| 2002/0093680 A1* | 7/2002 | Tanaka | 358/1.15 |
| 2002/0103718 A1* | 8/2002 | Matsuda et al. | 705/26 |
| 2004/0183918 A1* | 9/2004 | Squilla et al. | 348/211.2 |

FOREIGN PATENT DOCUMENTS

| | | |
|---|---|---|
| JP | 2000-267996 | 9/2000 |
| WO | WO 99/19811 | 4/1999 |
| WO | WO 01/86511 A2 | 11/2001 |

\* cited by examiner

FIG. 3

| ITEM | TYPE |
|---|---|
| USER ID | INTEGER TYPE |
| NOTIFICATION DESTINATION E-MAIL ADDRESS | CHARACTER TYPE 64 BYTES |
| Login Name | CHARACTER TYPE 64 BYTES |
| Password | CHARACTER TYPE 64 BYTES |
| NAME (LAST NAME) | CHARACTER TYPE 64 BYTES |
| NAME (FIRST NAME) | CHARACTER TYPE 64 BYTES |
| FURIGANA NAME (LAST NAME) | CHARACTER TYPE 64 BYTES |
| FURIGANA NAME (FIRST NAME) | CHARACTER TYPE 64 BYTES |
| POSTAL CODE 1 | CHARACTER TYPE 8 BYTES |
| POSTAL CODE 2 | CHARACTER TYPE 8 BYTES |
| PREFECTURE CODE | INTEGER TYPE |
| ADDRESS LINE 1 | CHARACTER TYPE 256 BYTES |
| ADDRESS LINE 2 | CHARACTER TYPE 256 BYTES |
| PHONE NUMBER 1 | CHARACTER TYPE 8 BYTES |
| PHONE NUMBER 2 | CHARACTER TYPE 8 BYTES |
| PHONE NUMBER 3 | CHARACTER TYPE 8 BYTES |
| USER REGISTRATION STATE | INTEGER TYPE |

| ITEM | TYPE | |
|---|---|---|
| USER ID | INTEGER TYPE | 501 |
| LAST DISPLAYED ALBUM ID | INTEGER TYPE | 502 |
| DISK USE LIMIT SIZE | INTEGER TYPE | 503 |
| ACCUMULATED POINTS | INTEGER TYPE | 504 |

FIG. 5

| ITEM | TYPE | |
|---|---|---|
| USER ID | INTEGER TYPE | ~601 |
| ALBUM ID | INTEGER TYPE | ~602 |
| ALBUM DISPLAY ORDER NUMBER | INTEGER TYPE | ~603 |

| ITEM | TYPE | |
|---|---|---|
| USER ID | INTEGER TYPE | ~701 |
| ALBUM NAME | CHARACTER TYPE 64 BYTES | ~702 |
| COMMENT (FILE PATH) | CHARACTER TYPE 256 BYTES | ~703 |
| PUBLICATION AVAILABILITY | INTEGER TYPE | ~704 |
| PASSWORD AVAILABILITY | INTEGER TYPE | ~705 |
| ALBUM PASSWORD | CHARACTER TYPE 64 BYTES | ~706 |
| PRINT AVAILABILITY | INTEGER TYPE | ~707 |
| ORIGINAL DISPLAY AVAILABILITY | INTEGER TYPE | ~708 |
| DISPLAY MODE NUMBER | INTEGER TYPE | ~709 |

| ITEM | TYPE | |
|---|---|---|
| ALBUM ID | INTEGER TYPE | ~801 |
| IMAGE ID | INTEGER TYPE | ~802 |
| IMAGE DISPLAY NUMBER | INTEGER TYPE | ~803 |

| ITEM | TYPE | |
|---|---|---|
| IMAGE ID | INTEGER TYPE | ~901 |
| USER ID | INTEGER TYPE | ~902 |
| IMAGE NAME | CHARACTER TYPE 64 BYTES | ~903 |
| ORIGINAL IMAGE FILE PATH | CHARACTER TYPE 256 BYTES | ~904 |
| THUMBNAIL FILE PATH | CHARACTER TYPE 256 BYTES | ~905 |
| PREVIEW IMAGE FILE PATH | CHARACTER TYPE 256 BYTES | ~906 |
| COMMENT (FILE PATH) | CHARACTER TYPE 256 BYTES | ~907 |
| BROWSE COUNT | INTEGER TYPE | ~908 |
| PRINT COUNT | INTEGER TYPE | ~909 |

| ITEM | TYPE | |
|---|---|---|
| ORDER NUMBER | INTEGER TYPE | ~1001 |
| ORDERER ID | INTEGER TYPE | ~1002 |
| SHIPPING-ADDRESS NAME | CHARACTER TYPE 64 BYTES | ~1003 |
| SHIPPING-ADDRESS POSTAL CODE 1 | CHARACTER TYPE 8 BYTES | ~1004 |
| SHIPPING-ADDRESS POSTAL CODE 2 | CHARACTER TYPE 8 BYTES | ~1005 |
| SHIPPING-ADDRESS PREFECTURE CODE | INTEGER TYPE | ~1006 |
| SHIPPING ADDRESS LINE 1 | CHARACTER TYPE 256 BYTES | ~1007 |
| SHIPPING ADDRESS LINE 2 | CHARACTER TYPE 256 BYTES | ~1008 |
| SHIPPING-ADDRESS PHONE NUMBER 1 | CHARACTER TYPE 8 BYTES | ~1009 |
| SHIPPING-ADDRESS PHONE NUMBER 2 | CHARACTER TYPE 8 BYTES | ~1010 |
| SHIPPING-ADDRESS PHONE NUMBER 3 | CHARACTER TYPE 8 BYTES | ~1011 |
| PRINT SITE ID | INTEGER TYPE | ~1012 |
| ORDER DATE | INTEGER TYPE | ~1013 |
| STATUS | INTEGER TYPE | ~1014 |

| ITEM | TYPE | |
|---|---|---|
| ORDER NUMBER | INTEGER TYPE | ~1101 |
| PRINT SITE RECEIPT NUMBER | INTEGER TYPE | ~1102 |
| IMAGE NUMBER | INTEGER TYPE | ~1103 |
| FILE PATH TO COPY OF THUMBNAIL IMAGE | CHARACTER TYPE 256 BYTES | ~1104 |
| FILE PATH TO COPY OF ORIGINAL IMAGE | CHARACTER TYPE 256 BYTES | ~1105 |
| FILE PATH TO COPY OF PREVIEW IMAGE | CHARACTER TYPE 256 BYTES | ~1106 |
| PRINT QUANTITY | INTEGER TYPE | ~1107 |
| PRINT SIZE | INTEGER TYPE | ~1108 |
| PRINT TYPE | INTEGER TYPE | ~1109 |
| IMAGE ID | INTEGER TYPE | ~1110 |
| LOCK FLAG | INTEGER TYPE | ~1111 |
| ACQUIRED FLAG | INTEGER TYPE | ~1112 |
| ACQUISITION COUNT | INTEGER TYPE | ~1113 |

| ITEM | TYPE | |
|---|---|---|
| ORDER NUMBER | INTEGER TYPE | ~1201 |
| SETTLEMENT METHOD | INTEGER TYPE | ~1202 |
| TOTAL CHARGE | INTEGER TYPE | ~1203 |
| PRINT CHARGE | INTEGER TYPE | ~1204 |
| PRINT CHARGE BONUS | INTEGER TYPE | ~1205 |
| PRINT CHARGE TAX | INTEGER TYPE | ~1206 |
| SHIPPING CHARGE | INTEGER TYPE | ~1207 |
| SHIPPING CHARGE TAX | INTEGER TYPE | ~1208 |
| PHOTO SITE BONUS | INTEGER TYPE | ~1209 |
| STATUS | INTEGER TYPE | ~1210 |

| ITEM | TYPE | |
|---|---|---|
| ORDERER ID | INTEGER TYPE | ~1301 |
| USER ID | INTEGER TYPE | ~1302 |
| NOTIFICATION DESTINATION E-MAIL ADDRESS | CHARACTER TYPE 64 BYTES | ~1303 |
| NAME (LAST NAME) | CHARACTER TYPE 64 BYTES | ~1304 |
| NAME (FIRST NAME) | CHARACTER TYPE 64 BYTES | ~1305 |
| FURIGANA NAME (LAST NAME) | CHARACTER TYPE 64 BYTES | ~1306 |
| FURIGANA NAME (FIRST NAME) | CHARACTER TYPE 64 BYTES | ~1307 |
| POSTAL CODE 1 | CHARACTER TYPE 8 BYTES | ~1308 |
| POSTAL CODE 2 | CHARACTER TYPE 8 BYTES | ~1309 |
| PREFECTURE CODE | INTEGER TYPE | ~1310 |
| ADDRESS LINE 1 | CHARACTER TYPE 256 BYTES | ~1311 |
| ADDRESS LINE 2 | CHARACTER TYPE 256 BYTES | ~1312 |
| PHONE NUMBER 1 | CHARACTER TYPE 8 BYTES | ~1313 |
| PHONE NUMBER 2 | CHARACTER TYPE 8 BYTES | ~1314 |
| PHONE NUMBER 3 | CHARACTER TYPE 8 BYTES | ~1315 |

| ITEM | TYPE |
|---|---|
| PRINT SITE ID | INTEGER TYPE |
| PROVIDER NAME | CHARACTER TYPE 64 BYTES |
| URL TO TEMPORARY ORDER NOTIFICATION CGI | CHARACTER TYPE 256 BYTES |
| URL TO FIRM ORDER NOTIFICATION CGI | CHARACTER TYPE 256 BYTES |
| URL TO ORDER CANCEL CGI | CHARACTER TYPE 256 BYTES |

| ITEM | TYPE | |
|---|---|---|
| PHOTO SITE ID | INTEGER TYPE | 1501 |
| PHOTO SITE NAME | CHARACTER TYPE 64 BYTES | 1502 |
| URL TO ESTIMATION NOTIFICATION CGI | CHARACTER TYPE 256 BYTES | 1503 |
| URL TO EXCEPTIONAL PROCESS NOTIFICATION CGI | CHARACTER TYPE 256 BYTES | 1504 |
| URL TO PRINT STATUS NOTIFICATION CGI | CHARACTER TYPE 256 BYTES | 1505 |

| ITEM | TYPE | |
|---|---|---|
| RECEIPT NUMBER | INTEGER TYPE | ~1601 |
| PHOTO SITE ID | INTEGER TYPE | ~1602 |
| PHOTO SITE ORDER NUMBER | INTEGER TYPE | ~1603 |
| TEMPORARY ORDER DATE | INTEGER TYPE | ~1604 |
| FIRM ORDER DATE | INTEGER TYPE | ~1605 |
| ORDER STATUS | INTEGER TYPE | ~1606 |
| PRINT TYPE | INTEGER TYPE | ~1607 |
| PRINT CHARGE | INTEGER TYPE | ~1608 |
| PRINT SITE BONUS CHARGE | INTEGER TYPE | ~1609 |
| PRINT TAX | INTEGER TYPE | ~1610 |
| SHIPPING CHARGE | INTEGER TYPE | ~1611 |
| SHIPPING CHARGE TAX | INTEGER TYPE | ~1612 |
| TOTAL AMOUNT | INTEGER TYPE | ~1613 |

FIG. 16

| ITEM | TYPE | |
|---|---|---|
| RECEIPT NUMBER | INTEGER TYPE | ~1701 |
| IMAGE NUMBER | INTEGER TYPE | ~1702 |
| URL REQUIRED TO ACQUIRE ORIGINAL IMAGE FILE | CHARACTER TYPE 256 BYTES | ~1703 |
| URL REQUIRED TO ACQUIRE PREVIEW IMAGE FILE | CHARACTER TYPE 256 BYTES | ~1704 |
| URL REQUIRED TO ACQUIRE THUMBNAIL IMAGE FILE | CHARACTER TYPE 256 BYTES | ~1705 |
| PRINT QUANTITY | INTEGER TYPE | ~1706 |
| PRINT SIZE | INTEGER TYPE | ~1707 |
| PRINT STATUS | INTEGER TYPE | ~1708 |
| PRINT UNIT PRICE | INTEGER TYPE | ~1709 |

| ITEM | TYPE | |
|---|---|---|
| RECEIPT NUMBER | INTEGER TYPE | ~1801 |
| SHIPPING-ADDRESS NAME | CHARACTER TYPE 64 BYTES | ~1802 |
| SHIPPING-ADDRESS POSTAL CODE 1 | CHARACTER TYPE 8 BYTES | ~1803 |
| SHIPPING-ADDRESS POSTAL CODE 2 | CHARACTER TYPE 8 BYTES | ~1804 |
| SHIPPING-ADDRESS PREFECTURE CODE | INTEGER TYPE | ~1805 |
| SHIPPING ADDRESS LINE 1 | CHARACTER TYPE 256 BYTES | ~1806 |
| SHIPPING ADDRESS LINE 2 | CHARACTER TYPE 256 BYTES | ~1807 |
| SHIPPING-ADDRESS PHONE NUMBER 1 | CHARACTER TYPE 8 BYTES | ~1808 |
| SHIPPING-ADDRESS PHONE NUMBER 2 | CHARACTER TYPE 8 BYTES | ~1809 |
| SHIPPING-ADDRESS PHONE NUMBER 3 | CHARACTER TYPE 8 BYTES | ~1810 |
| SHIPPING DATE | INTEGER TYPE | ~1811 |
| STATUS | INTEGER TYPE | ~1812 |

1800

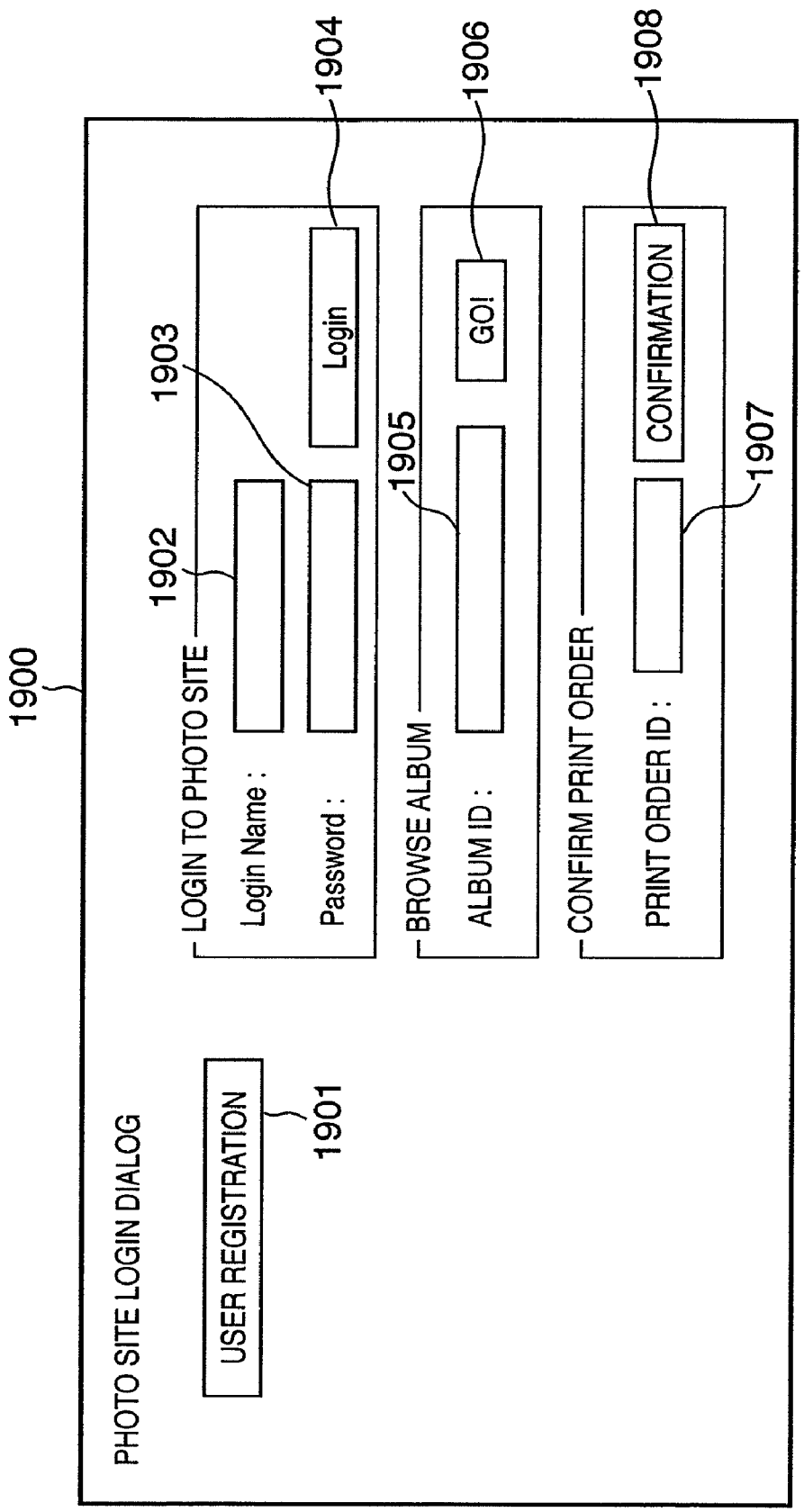

FIG. 20

USER REGISTRATION DIALOG AT PHOTO SITE — 2100

- E-MAIL ADDRESS: — 2101
- LOGIN NAME: — 2102
- PASSWORD: — 2103

NAME — 2104
- LAST NAME: — 2105  FIRST NAME: — 2107
- FURIGANA NAME: — 2106  FIRST NAME:

ADDRESS — 2108
- 〒: — 2109 - 
- PREFECTURE: — 2110
- CITY NAME, BLOCK NUMBER: — 2111
- NAME OF APARTMENT HOUSE, ROOM NUMBER, ETC.: — 2112

PHONE NUMBER — 2113
- 2114 - 2115

REGISTRATION — 2116   CANCEL — 2117

FIG. 25

2600 — USER INFORMATION CONFIRMATION DIALOG

DEAR MR. TARO KYANON
YOU HAVE BEEN REGISTERED AT PHOTO SITE
YOUR LOGIN NAME IS △△△@◇◇◇◇.ne.jp.

YOUR REGISTRATION CONTENTS ARE
NOTIFICATION DESTINATION E-MAIL ADDRESS: △△△@◇◇◇◇.ne.jp.
ADDRESS: 1-1-2 ○○-CHO, ○○-KU, TOKYO AAA-BBBB
PHONE NUMBER: 03-XXXX-XXXX

E-MAIL WITH ABOVE CONTENTS WILL BE SENT TO
YOUR NOTIFICATION DESTINATION E-MAIL ADDRESS.

2601 — CONFIRMATION
2602 — CORRECTION

FIG. 26

Date: Sat, 23 Jun 2001 12:13:37 +0900
Form: PhotoSite <×××@○○○.com>
To: △△△@◇◇◇◇.ne.jp
Subject:[USER REGISTRATION CONFIRMATION] YOU HAVE BEEN REGISTERED.
Content-Type: text/plain; charset="ISO-2022-JP"
Content-Transfer-Encoding: 7bit

DEAR MR. TARO KYANON

YOU HAVE BEEN REGISTERED AS USER AT PHOTO SITE

YOUR LOGIN NAME IS △△△@◇◇◇◇.ne.jp.

YOUR REGISTRATION CONTENTS ARE
NOTIFICATION DESTINATION E-MAIL ADDRESS: △△△@◇◇◇◇.ne.jp
ADDRESS: 1-1-2 ○○-CHO, ○○-KU, TOKYO AAA-BBBB
PHONE NUMBER: 03-XXXX-XXXX

IF YOU DID NOT MAKE USER REGISTRATION,
PLEASE CONTACT TO XXX-SUPPORT@○○○.com.

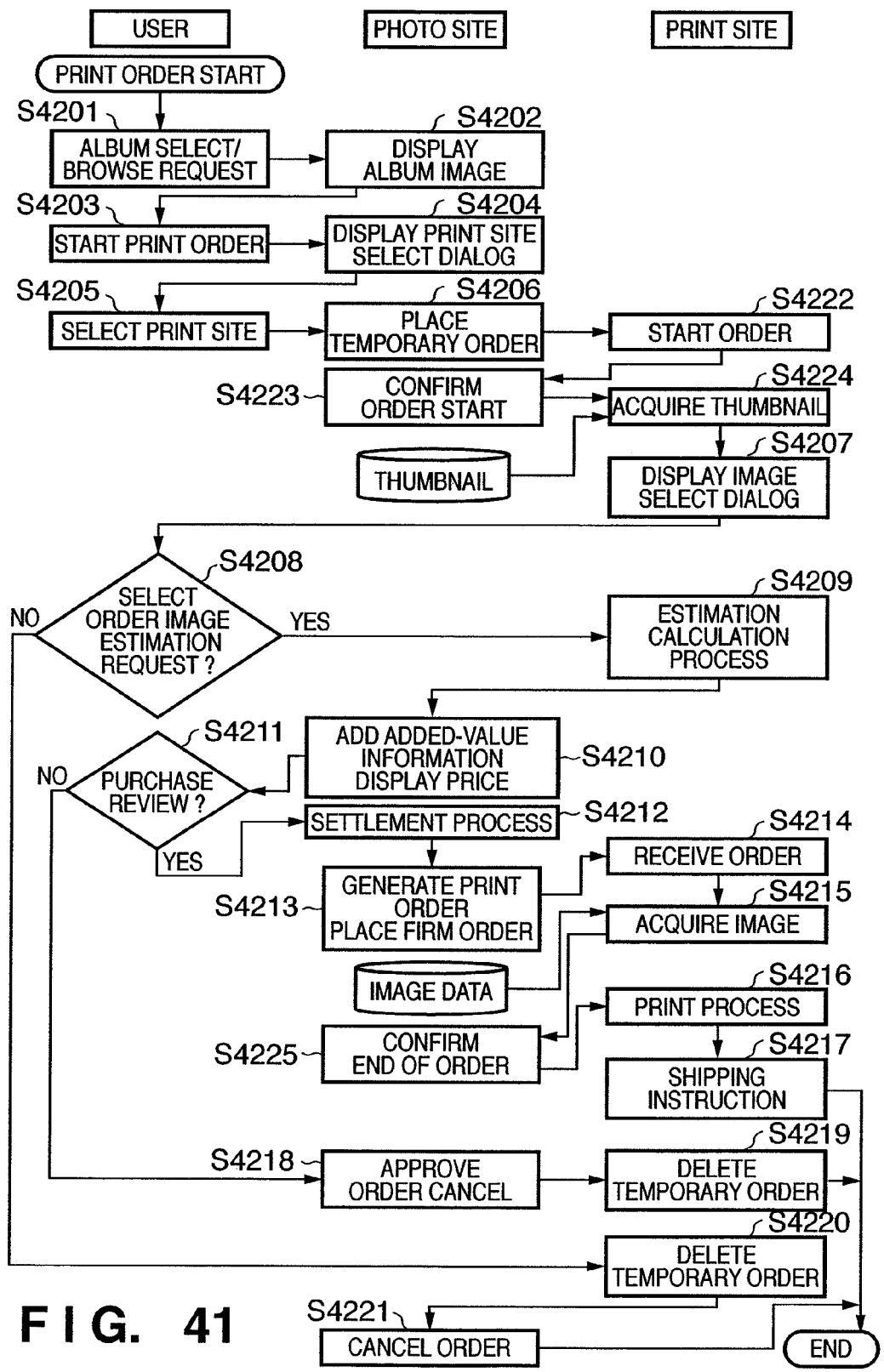
F I G. 41

FIG. 44

DISPLAY OF ESTIMATION

| ITEM NAME | APPLY | QUANTITY | UNIT PRICE | TOTAL |
|---|---|---|---|---|
| DIGITAL PRINT | L SIZE | 8 | 40 | 320 |
| DIGITAL PRINT | A4 SIZE | 1 | 300 | 300 |
| PRINT SITE BONUS | 10% DISCOUNT PER A4 PRINT | | −30 | −30 |
| SUB TOTAL | | | | 590 |
| SALES TAX | | | | 29 |
| PRINT SITE TOTAL | | | | 619 |
| SHIPPING CHARGE | | | | 450 |
| SHIPPING CHARGE SALES TAX | | | | 22 |
| PHOTO SITE BONUS | | | | −20 |
| TOTAL | | | | 1,071 |

BONUS INFORMATION    SET CREDIT INFORMATION    CANCEL

```
ORDERER INFORMATION
  ┌─ CREDIT CARD INFORMATION ──────────────────────────┐
  │   CREDIT CARD NUMBER :  [0000-0000-0000-0000]      │
  │   GOOD THRU:    YEAR [2003]    MONTH [6]           │
  └────────────────────────────────────────────────────┘
  ┌─ NAME ─────────────────────────────────────────────┐
  │     LAST NAME : [木矢呑]    FIRST NAME : [太郎]     │
  │  FURIGANA NAME : [KYANON]   FIRST NAME : [TARO]    │
  └────────────────────────────────────────────────────┘
  ┌─ ADDRESS ──────────────────────────────────────────┐
  │   〒: [aaa] - [bbbb]   PREFECTURE : [TOKYO ▼]      │
  │   CITY NAME, BLOCK NUMBER : [TOKYO ○○KU ○○CHO 1-1-2]│
  │   NAME OF APARTMENT HOUSE, ROOM NUMBER, ETC. : [  ]│
  └────────────────────────────────────────────────────┘
  ┌─ PHONE NUMBER ─────────────┐
  │   [03] - [○○○] - [0000]    │
  └────────────────────────────┘

CONTACT E-MAIL ADDRESS : [△△△@◇◇◇.ne.jp]

[SUBMIT ORDER]  [CANCEL]
```

┌─────────────────────────────────────────────────────────┐
│ SHIPPING ADDRESS DESIGNATION DIALOG                     │
│                                                         │
│   ⊙ SAME AS ORDERER    ○ DESIGNATE ANOTHER SHIPPING ADDRESS │
│   ┌─ NAME ──────────────────────────────────────────┐  │
│   │   LAST NAME : [        ]   FIRST NAME : [    ]  │  │
│   └─────────────────────────────────────────────────┘  │
│   ┌─ ADDRESS ───────────────────────────────────────┐  │
│   │   〒: [  ] - [  ]   PREFECTURE : [        ▼]    │  │
│   │   CITY NAME, BLOCK NUMBER : [            ]      │  │
│   │   NAME OF APARTMENT HOUSE, ROOM NUMBER, ETC. : [  ] │  │
│   └─────────────────────────────────────────────────┘  │
│   ┌─ PHONE NUMBER ──────────────────────┐              │
│   │   [    ] - [    ] - [    ]          │ [SUBMIT ORDER] [CANCEL] │
│   └─────────────────────────────────────┘              │
└─────────────────────────────────────────────────────────┘
                                            4701      4702
```

NO IMAGE IN ALBUM IS SELECTED.
PLEASE SELECT AT LEAST ONE IMAGE.

```
<?xml version="1.0" encode"?>
 <!DOCTYPE PhotoSiteorder System">
 <xmlns PhotoSiteorder="http://www. PHOTO SITE DOMAIN NAME/">

<PhotoSiteorder >
  <estimate order PhotoSiteid="P0001" PhotoSiteOrderid="1001" cant="6">
    <estimate item PhotoSiteid="1">
      <name> PHOTO 1 </name>
      <urlimg>
        <thumbnail>http://www. PHOTO SITE DOMAIN NAME /thumbnail/P0001/t1.jpg</thumbnail>
        <preview>http://www. PHOTO SITE DOMAIN NAME /viewdata/P0001/v1.jpg</preview>
        <image>http://www. PHOTO SITE DOMAIN NAME /printdat/
GetPrintData.cgi?image=p1.jpg&OrderID=1001</image>
      </urlimg>
    </estimate item>
    <estimate item PhotoSiteid="2">
      <name> SCANNER </name>
      <urlimg>
        <thumbnail>http://www. PHOTO SITE DOMAIN NAME /thumbnail/P0001/t2.jpg</thumbnail>
        <preview>http://www. PHOTO SITE DOMAIN NAME /viewdata/P0001/v2.jpg</preview>
        <image>http://www. PHOTO SITE DOMAIN NAME /printdat/
GetPrintData.cgi?image=p2.jpg&OrderID=1001</image>
      </urlimg>
    </estimate item>
```

··· OMISSION (DESCRIPTIONS FOR IMAGES INCLUDED IN
    ESTIMATION REQUEST)

```
  </estimate order>
</PhotoSiteorder>
```

FIG. 54

```xml
<?xml version="1.0" encode="Shift_JIS"?>
<!DOCTYPE PhotoSiteorder SYSTEM"PhotoSiteorder.dtd">
<xmlns PhotoSiteorder="http://www. PHOTO SITE DOMAIN NAME /">

<PhotoSiteorder >
  <estimateresult PhotoSiteid="P0001" PhotoSiteOrderid="1001" cont="4">
    <resultmode>success</resultmode>
    <resultinf printsiteid="Print0001" printsiteOrderid="Pr-1001">
      <chargeinf total="1091">
        <print total="619" charge="590" tax="29"/>
        <ship total="472" charge="450" tax="22"/>
      </chargeinf>
    </resultinf>

<printtype edge=" WITH BORDER" />
      <resultitem PhotoSiteid="1">
        <printinf size=" L SIZE" count="1"/>
        <printcharge rate="40" total="40" />
      </resultitem>
      <resultitem PhotoSiteid="2">
        <printinf size=" L SIZE" count="3"/>
        <printcharge rate="40" total="120" />
      </resultitem>
      <resultitem PhotoSiteid="3">
        <printinf size="A4 SIZE" count="1"/>
        <printcharge rate="300" total="300" />
      </resultitem>
      <resultitem PhotoSiteid="6">
        <printinf size=" L SIZE" count="4"/>
        <printcharge rate="40" total="240" />
      </resultitem>
      <resultitem PhotoSiteid="NONE">
        <printinf size="A4 SIZE DISCOUNT" count="1"/>
        <printcharge rate="-30" total="-30" />
      </resultitem>
    </estimateresult>
</PhotoSiteorder>
```

FIG. 55

```xml
<?xml version="1.0" encode="Shift_JIS"?>
<!DOCTYPE PhotoSiteorder SYSTEM"PhotoSiteorder.dtd">
<xmlns PhotoSiteorder="http://www. PHOTO SITE DOMAIN NAME /">

<PhotoSiteorder >
   <order printsiteid="Print0001" printsiteOrderid="Pr-1001"
              photoSiteid="P0001" PhotoSiteOrderid="1001" count="4">
     <orderresult>success</orderresult>
     <orderinf>
       <shipinf>
         <name> TARO KYANON </name>
         <zip>AAABBBB</zip>
         <address> 1-1-2 ○○-CHO, ○○-KU, TOKYO </address>
         <phone>03XXXXXXXX</phone>
         <email>GANON@eanon.co.jp</email>
       </shipinf>
       <chargeinf total="1091">
         <print total="619" charge="590" tax="29"/>
         <ship total="472" charge="450" tax="22"/>
       </chargeinf>
     </orderinf>
     <orderitem PhotoSiteid="1">
       <printinf size=" L SIZE " count="1"/>
       <printcharge rate="40" total="40" />
     </orderitem>
     <orderitem PhotoSiteid="2">
       <printinf size=" L SIZE" count="3"/>
       <printcharge rate="40" total="120" />
     </orderitem>
     <orderitem PhotoSiteid="3">
       <printinf size=" A4 SIZE " count="1"/>
       <printcharge rate="300" total="300" />
     </orderitem>
     <orderitem PhotoSiteid="6">
       <printinf size=" L SIZE " count="4"/>
       <printcharge rate="40" total="240" />
     </orderitem>
     <orderitem PhotoSiteid="NONE">
       <printinf size=" A4 SIZE DISCOUNT " count="1"/>
       <printcharge rate="-30" total="-30" />
     </orderitem>
   </order>
</PhotoSiteorder>
```

```
ORDER CONTENTS CONFIRMATION
WE RECEIVED FOLLOWING ORDER.
NOTE THAT E-MAIL WITH ORDER CONTENTS
WILL BE SENT TO aaa@eanon.co.jp.
```

| | |
|---|---|
| YOUR ORDER NUMBER | : 10242678 |
| ORDER DATE | : MAY 10, 2001, PM 7:45 |
| ORDER CONTENTS | : L SIZE, BORDERLESS  8 (QTY) |
| | A4 SIZE  1 (QTY) |
| BILLING AMOUNT | : 1,071 YEN |
| CUSTOMER | : TARO KYANON |
| ADDRESS | : 1-1-2 ○○-CHO, ○○-KU, TOKYO AAA-BBBB |
| PHONE NUMBER | : 03-XXXX-XXXX |
| SHIPPING ADDRESS | : SAME AS YOUR CONTACT ADDRESS |

| ITEM | SIZE ID | PRICE | |
|---|---|---|---|
| L SIZE | 1 | 40 | ~5801 |
| 2L SIZE | 2 | 80 | ~5802 |
| POSTCARD | 3 | 150 | ~5803 |
| UNOFFICIAL POSTCARD | 4 | 100 | ~5804 |
| A4 SIZE | 5 | 300 | ~5805 |

| ITEM | SIZE ID | BONUS UNIT | PRICE |
|---|---|---|---|
| POSTCARD | 3 | 100 | −500 |
| UNOFFICIAL POSTCARD | 4 | 100 | −500 |
| A4 SIZE | 5 | 1 | −20 |

FIG. 59

Date: Sat, 23 Jun 2001 01:00:00 +0900
Form: PhotoSite <×××@○○○.com>
To: △△△@◇◇◇.ne.jp
Subject: [PRINT ORDER CONFIRMATION] ORDER NO. 10242678
Content-Type: text/plain; charset="ISO-2022-JP"
Content-Transfer-Encoding: 7bit

THANK YOU FOR YOUR PRINT ORDER.
WE RECEIVED FOLLOWING ORDER.

DEAR MR. TARO KYANON
YOUR ORDER NUMBER  : 10242678
ORDER DATE           : MAY 10, 2001, PM 7:45
ORDER CONTENTS       : L SIZE, BORDERLESS  8 (QTY)
                       A4 SIZE              1 (QTY)
BILLING AMOUNT       : 1,062 YEN

CUSTOMER             : TARO KYANON
ADDRESS              : 1-1-2 ○○-CHO, ○○-KU, TOKYO AAA-BBBB

PHONE NUMBER         : 03-XXXX-XXXX

SHIPPING ADDRESS     : SAME AS YOUR CONTACT ADDRESS

YOUR ORDER STATUS CAN BE CONFIRMED USING
YOUR ORDER NUMBER AT http://○○○.com/PhotoSite/.

FIG. 61

```
Date : Sat,23 Jun 2001 02:34:56 +0900
Form : PhotoSite <△△△@eanon.co.jp>
To : aaa@○○.ne.jp
Subject : PUBLIC ALBUM NOTIFICATION
Error-to : △△△@eanon.co.jp
Content-Type : text/plain;charset="ISO-2022-JP"
Content-Transfer-Encoding : 7bit YOU CAN BROWSE PUBLIC ALBUM OF PHOTO SITE AT FOLLOWING URL.
http://www.○○○.com/PhotoSite/UserAlbum/IbumEntry.cgi?AlbumID=AJNWDMF   ～6201
OR YOUR CAN BROWSE ALBUM BY DESIGNATING FOLLOWING NUMBER IN ALBUM ID AT http://○○○.com/PhotoSite/.
ALBUM ID : AJNWDMF   ～6203

- SENDER'S MESSAGE -
DEAR CUSTOMER,
PHOTOS TAKEN AT OUR ITEM BRIEFING THE OTHER DAY HAVE BEEN UPLOADED.
PLEASE GIVE US YOUR FEEDBACK AFTER YOU BROWSE THEM.
- END OF MESSAGE -
```

| Button | Letters | AL |
|--------|---------|-----|
| 1 |  | 0 |
| 2 | ABC | 3 |
| 3 | DEF | 3 |
| 4 | GHI | 3 |
| 5 | JKL | 3 |
| 6 | MNO | 3 |
| 7 | PQRS | 4 |
| 8 | TUV | 3 |
| 9 | WXYZ | 4 |

FIG. 68

DISPLAY OF RE-ESTIMATION
YOUR ORDER RESULTED IN LOWER PRICE DUE TO PRICE REVISION AT
PRINT SITE THAT WENT EFFECTIVE IN THE INTERVAL BETWEEN       4504
ESTIMATION AND ORDER. DIFFERENCE CAN BE REGISTERED AS POINTS
AND BE REDEEMED DISCOUNT AT YOUR NEXT ORDER.

| ITEM NAME | APPLY | QUANTITY | UNIT PRICE | TOTAL |
|---|---|---|---|---|
| DIGITAL PRINT | L SIZE | 8 | 35 | 280 |
| DIGITAL PRINT | A4 SIZE | 1 | 300 | 300 |
| PRINT SITE BONUS | 10% DISCOUNT PER A4 PRINT | | −30 | −30 |
| SUB TOTAL | | | | 550 |
| SALES TAX | | | | 27 |
| PRINT SITE TOTAL | | | | 577 |
| SHIPPING CHARGE | | | | 450 |
| SHIPPING CHARGE SALES TAX | | | | 22 |
| PHOTO SITE BONUS | | | | −20 |
| TOTAL | | | | 1,029 |
| PREVIOUS ESTIMATED AMOUNT | | | | 1,071 |
| DIFFERENCE | | | | 42 |

7000

OK — 7001

7100

YOU CAN PRINT AT LOWER PRICE THAN ESTIMATION DUE
TO PRICE REVISION.
DIFFERENCE CAN BE PAID BACK OR REGISTERED AS POINTS.
PLEASE SELECT.

SAVE DIFFERENCE AS POINTS    PAY BACK 7101    7102

FIG. 76

```
<?xml version="1.0" encode="Shift_JIS"?>
<!DOCTYPE CustomerInfo SYSTEM "CustomerInfo.dtd">
<xmlns CustomerInfo="http://www.PHOTO SITE DOMAIN NAME /">

<CustomerInfo >
   <order printsiteid="Print0001" printsiteOrderid="Pr-1001"
              photoSiteid="P0001" PhotoSiteOrderid="1001" count="4">
     <reginf>
        <name>木矢呑 太郎 </name>
        <yomi> KYANON TARO </yomi>
        <email>GANON@eanon.co.jp</email>
        <zip>AAABBBB</zip>
        <address> TOKYO ○○KU ○○CHO 1-1-2 </address>
        <phone>03XXXXXXXX</phone>
        <birthday>19XX/XX/XX</birthday>
     </reginf>
     <shipinf>
        <name>木矢呑 太郎 </name>
        <zip>AAABBBB</zip>
        <address>TOKYO ○○KU ○○CHO 1-1-2 </address>
        <phone>03XXXXXXXX</phone>
        <email>GANON@eanon.co.jp</email>
     </shipinf>
   </order>
</CustomerInfo>
```

| ITEM | TYPE |
|---|---|
| ORDER NUMBER | INTEGER TYPE |
| PRINT SITE RECEIPT NUMBER | INTEGER TYPE |
| FILE PATH OF ORDERER INFORMATION/SHIPPING ADDRESS INFORMATION | CHARACTER TYPE 256 BYTES |
| LOCK FLAG | INTEGER TYPE |
| ACQUIRED FLAG | INTEGER TYPE |
| ACQUISITION COUNT | INTEGER TYPE |

8101
8102
8103
8104
8105
8106

… # INFORMATION PROCESSING SYSTEM, INFORMATION PROCESSING APPARATUS, INFORMATION PROCESSING METHOD, STORAGE MEDIUM THAT STORES PROGRAM FOR IMPLEMENTING IT TO BE READABLE BY INFORMATION PROCESSING APPARATUS AND THAT PROGRAM

CROSS-REFERENCE TO RELATED APPLICATIONS

This application is a divisional of U.S. patent application Ser. No. 10/378,633, filed Mar. 5, 2003 and claims benefit of the filing date of that application, and priority benefit of the filing date of Japanese patent application nos. 2002-060904 and 2002-060905, of which both were filed Mar. 6, 2002. The entire disclosures of each of those prior applications are incorporated herein by reference.

FIELD OF THE INVENTION

The present invention relates to an information processing system that provides a service in which a first information processing apparatus that stores data transfers the data to a second information processing apparatus and makes the second information processing apparatus execute various processes such as a printout process and the like, an information processing apparatus, an information processing method, a storage medium that stores a program for implementing them to be readable by an information processing apparatus, and that program. Hereinafter, though it is shown that the image data is processed by the present information processing system, the present invention cannot be limited in the application for the image data but can be applied to various data. These applications are included a scope of the present invention.

BACKGROUND OF THE INVENTION

Along with the development of communication infrastructures and progress of information communication technologies, various services using the Internet are provided.

For example, a site (to be referred to as a photo site hereinafter) that provides a service for receiving and storing images sensed by the user using a digital camera or scanned using a scanner via the Internet, and a service for allowing the user to browse stored user's images anytime he or she wants via the Internet is known.

Also, a site (to be referred to as a print site hereinafter) that prints out a transferred user's image and provides it as a commodity is known.

Such photo sites include a site that uniquely provides both an image storage service and image printout service, and also a site that provides only an image storage service, transfers an image to be printed out to a print site, and makes the print site provide a service.

In the photo site that provides a print service in collaboration with the print site, image data is transferred to the print site in response to a request from the print site. The image data is transferred based on a protocol such as http, ftp, or the like, which can be used on the Internet. Hence, upon transferring image data from the photo site in response to a request from the print site, acquisition of image data is entrusted to the print site.

As a result, since the print site can also acquire image data which is not related to order information, image data may leak. Also, the print site may repetitively acquire image data that has already been acquired from the photo site.

When a print service is provided by collaboration of the photo site and print site, after the photo site passes image data required for a print process to the print site, the setups of detailed print information, and a series of processes such as an estimation process, printout process, settlement service, and the like are handed to the print site.

Therefore, when the user sends a cancel request of a print order to the print site after the photo site has passed image data to the print site, the print site must receive and store image data which is not printed out in practice, thus wasting resources. On the other hand, although the user who placed the print order sends a printout cancel request, since image data is saved in the print site, the saved image data may be illicitly used.

SUMMARY OF THE INVENTION

The present invention has been made to solve the conventional problems, and has as its object to confirm whether or not unnecessary data is transferred from a first information processing apparatus to a second information processing apparatus, and whether or not data illicitly runs out, when the second information processing apparatus acquires data stored in the first information processing apparatus.

It is another object of the present invention to inform a first information processing apparatus (photo site) of the state transition of a series of processes executed by a second information processing apparatus (print site), and to pass information such as image data or the like according to the state of the series of processes to be executed by the second information processing apparatus (print site) to the second information processing apparatus (print site).

In order to solve the aforementioned problems, an information processing system of the present invention includes a first information processing apparatus that stores data, and a second information processing apparatus which acquires the data and executes an output process, wherein the first information processing apparatus comprises: management means for managing, at least one of information that pertains to whether or not the data can be used by the second information processing apparatus and information that pertains to the number of times of acquisition of the data by the second information processing apparatus; and monitor means for monitoring the data on the basis of various kinds of information managed by the management means.

The management means manages state of acquisition by the second information processing apparatus, and when the information indicates that the data can be used by the second information processing apparatus, and has not been acquired by the second information processing apparatus yet, the monitor means determines that the second information processing apparatus has not normally executed an acquisition process. When the information indicates that the data cannot be used by the second information processing apparatus, and the number of times of acquisition of the data by the second information processing apparatus is not less than a predetermined value, the monitor means determines that the second information processing apparatus has illicitly acquired the data.

An information processing apparatus of the present invention comprises: storage means for storing data; transfer means for transferring the data to another information processing apparatus; management means for managing, at least one of information that pertains to whether or not the data can be used by the other information processing apparatus and information that pertains to the number of times of acquisition of the data by the other information processing apparatus; and monitor means for monitoring the data on the basis of various kinds of information managed by the management means.

The management means manages state of acquisition by the second information processing apparatus, and when the information indicates that the data can be used by the other information processing apparatus, and has not been acquired by the other information processing apparatus yet, the monitor means determines that the other information processing apparatus has not normally executed an acquisition process. When the information indicates that the data cannot be used by the other information processing apparatus, and the number of times of acquisition of the data by the other information processing apparatus is not less than a predetermined value, the monitor means determines that the other information processing apparatus has illicitly acquired the data. The transfer means transfers the data to the other information processing apparatus to make the apparatus execute an output process of the data.

An information processing method of the present invention comprises: a storage step of storing data; a transfer step of transferring the data to another information processing apparatus; a management step of managing, at least one of information that pertains to whether or not the data can be used by the other information processing apparatus and information that pertains to the number of times of acquisition of the data by the other information processing apparatus; and a monitor step of monitoring the data on the basis of various kinds of information managed in the management step.

A storage medium of the present invention stores, to be readable by an information processing apparatus, a program for implementing an information processing method, which comprises: a storage step of storing data; a transfer step of transferring the data to another information processing apparatus; a management step of managing, at least one of information that pertains to whether or not the data can be used by the other information processing apparatus and information that pertains to the number of times of acquisition of the data by the other information processing apparatus; and a monitor step of monitoring the data on the basis of various kinds of information managed in the management step.

A program of the present invention makes an information processing apparatus implement an information processing method, which comprises: a storage step of storing data; a transfer step of transferring the data to another information processing apparatus; a management step of managing, at least one of information that pertains to whether or not the data can be used by the other information processing apparatus and information that pertains to the number of times of acquisition of the data by the other information processing apparatus; and a monitor step of monitoring the data on the basis of various kinds of information managed in the management step.

An information processing system of the present invention is an information processing system which includes a first information processing apparatus that stores data, and a second information processing apparatus which acquires the data and executes an output process, wherein the second information processing apparatus comprises: notification means for notifying the first information processing apparatus of information associated with state of processes to be executed by the second information processing apparatus, and the first information processing apparatus comprises: management means for managing the information; and control means for controlling the second information processing apparatus to acquire the data on the basis of the information.

The notification means notifies at least one of state of an acquisition process of the data, state of an output process of the data, state of an estimation process of cost required for the output process of the data, and state of a settlement process of the cost required for the output process of the data, which are executed by the second information processing apparatus. The management means manages state of processes to be executed by the first information processing apparatus on the basis of the information. The processes to be executed by the first information processing apparatus include a process for storing data received from a third information processing apparatus, or a process for instructing the second information processing apparatus to execute an output process of the data on the basis of a request from the third information processing apparatus. The control means controls to acquire attribute data, the attribute data including credit information used to pay cost required for an output process of the data, or shipping address information of a printout as the result of the output process of the data. The data includes a thumbnail of the data.

An information processing apparatus of the present invention comprises: storage means for storing data; transfer means for transferring the data stored in the storage means to another information processing apparatus; reception means for receiving information associated with state of processes to be executed by the other information processing apparatus; management means for managing the information; and control means for controlling transfer of the data to the other information processing apparatus on the basis of the information.

Also, an information processing apparatus for acquiring data transferred from another information processing apparatus, and executing an output process, comprises: notification means for notifying the other information processing apparatus of information associated with state of an executed process; and acquisition means for acquiring the data controlled by the other information processing apparatus on the basis of the information.

An information processing method of the present invention comprises: a storage step of storing data; a transfer step of transferring the data to another information processing apparatus; a reception step of receiving information associated with state of processes to be executed by the other information processing apparatus; a management step of managing the information; and a control step of controlling transfer of the data to the other information processing apparatus on the basis of the information.

Also, an information processing method for acquiring data transferred from another information processing apparatus, and executing an output process, comprises: a notification step of notifying the other information processing apparatus of information associated with state of an executed process; and an acquisition step of acquiring the data controlled by the other information processing apparatus on the basis of the information.

A storage medium of the present invention stores, to be readable by an information processing apparatus, a program for implementing an information processing method, which comprises: a storage step of storing data; a transfer step of transferring the data stored in the storage step to another information processing apparatus; a reception step of receiving information associated with state of processes to be executed by the other information processing apparatus; a management step of managing received information; and a control step of controlling transfer of the data to the other information processing apparatus on the basis of the information.

Also, a storage medium stores, to be readable by an information processing apparatus, a program for implementing an information processing method for acquiring image data transferred from another information processing apparatus, and executing an output process, and the method comprises: a notification step of notifying the other information processing apparatus of information associated with state of an executed process; and an acquisition step of acquiring the data controlled by the other information processing apparatus on the basis of the information.

A program of the present invention implements an information processing method, which comprises: a storage step of storing data; a transfer step of transferring the data stored in the storage step to another information processing apparatus; a reception step of receiving information associated with state of processes to be executed by the other information processing apparatus; a management step of managing received information; and a control step of controlling transfer of the data to the other information processing apparatus on the basis of the information.

Also, a program implements an information processing method for acquiring data transferred from another information processing apparatus, and executing an output process, and the method comprises: a notification step of notifying the other information processing apparatus of information associated with state of an executed process; and an acquisition step of acquiring the data controlled by the other information processing apparatus on the basis of the information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a data table associated with customer information managed by the photo site in the embodiment of the present invention;

FIG. 4 is a customer state table used to manage information of the current state of a given user who uses the photo site in the embodiment of the present invention;

FIG. 5 is a customer album data table managed by the photo site in the embodiment of the present invention;

FIG. 6 is an album information data table managed by the photo site in the embodiment of the present invention;

FIG. 7 is an album image data table managed by the photo site in the embodiment of the present invention;

FIG. 8 is an image information table managed by the photo site in the embodiment of the present invention;

FIG. 9 is an order information table managed by the photo site in the embodiment of the present invention;

FIG. 10 is an order image data table managed by the photo site in the embodiment of the present invention;

FIG. 11 is an order settlement data table managed by the photo site in the embodiment of the present invention;

FIG. 12 is an orderer data table managed by the photo site in the embodiment of the present invention;

FIG. 13 is a print site data table managed by the photo site in the embodiment of the present invention;

FIG. 14 shows the contents of a database of the print site, which is used to manage information of the photo site in the embodiment of the present invention;

FIG. 15 shows the contents of an order information table of the print site in the embodiment of the present invention;

FIG. 16 shows the contents of a print image information table of the print site in the embodiment of the present invention;

FIG. 17 shows the contents of an order shipping table of the print site in the embodiment of the present invention;

FIG. 18 shows an example of a dialog displayed at the beginning of a server service of the photo site in the embodiment of the present invention;

FIG. 20 shows a dialog used to make user registration in the embodiment of the present invention;

FIG. 25 shows an example of a user registration confirmation dialog of the photo site in the embodiment of the present invention;

FIG. 26 shows an example of the contents of an e-mail message issued upon user registration at the photo site in the embodiment of the present invention;

FIG. 41 is a flow chart showing the flow of processes among a client PC, photo site, and print site upon placing a print order using the photo site in the embodiment of the present invention;

FIG. 44 shows an estimation display dialog upon placing an image print order in the embodiment of the present invention;

FIG. 45 shows an orderer information input/display dialog upon placing an image print order in the embodiment of the present invention;

FIG. 46 shows a shipping address information input/display dialog upon placing an image print order in the embodiment of the present invention;

FIG. 48 shows an alert dialog displayed when no image is selected upon placing an image print order in the embodiment of the present invention;

FIG. 53 shows an example of a temporary order format sent from the photo site to the print site in the embodiment of the present invention;

FIG. 54 shows an example of an estimation information format sent from the print site to the photo site in the embodiment of the present invention;

FIG. 55 shows an example of a firm order format sent from the photo site to the print site in the embodiment of the present invention;

FIG. 56 shows an example of an order content confirmation dialog in the embodiment of the present invention;

FIG. 57 shows an example of a service item data list at the print site in the embodiment of the present invention;

FIG. 58 shows an example of a bonus list at the print site in the embodiment of the present invention;

FIG. 59 shows an example of an e-mail message which is sent upon placing a print order in the embodiment of the present invention;

FIG. 61 shows an example of an album notification mail message in the embodiment of the present invention;

FIG. 63 is a list that shows the relationship between buttons of a portable phone and alphabetical letters that can be input by these buttons in the embodiment of the present invention;

FIG. 68 shows the display contents of a re-estimation in the embodiment of the present invention;

FIG. 76 shows an example of an orderer information/shipping address information format that the print site acquires from the photo site in the other embodiment of the present invention;

FIG. 77 shows the contents of an orderer information/shipping address information table managed at the photo site in the other embodiment of the present invention;

DETAILED DESCRIPTION OF THE PREFERRED EMBODIMENTS

Preferred embodiments of the present invention will be described hereinafter with reference to the accompanying drawings.

Schematic Arrangement and Operation Example of Service System of This Embodiment (Example of System Arrangement)

Figure 1:
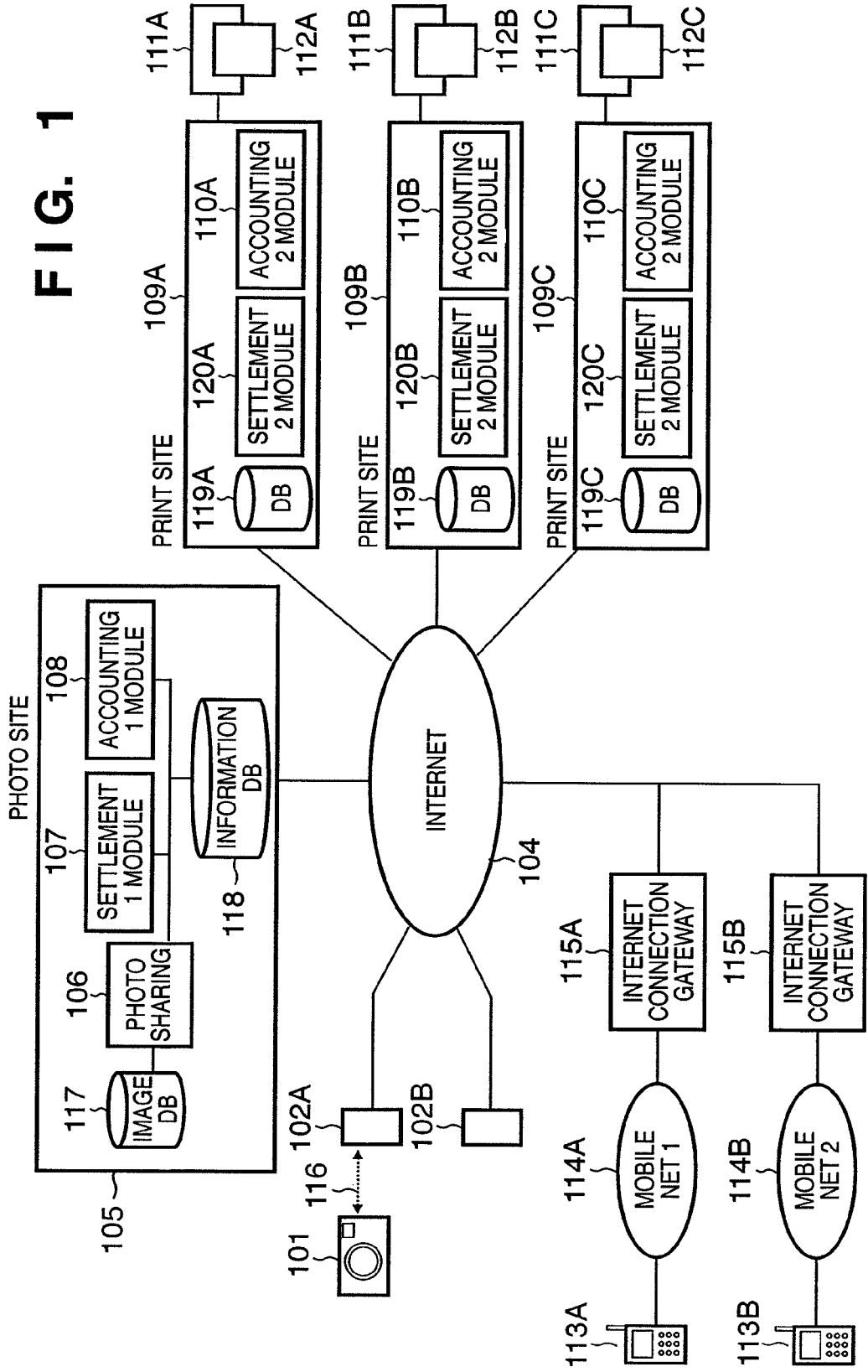
FIG. 1 is a diagram of the overall system that shows the connection relationship among a user who possesses images, a photo site which saves images, and print sites which print images, according to an embodiment of the present invention.

FIG. 1 shows the arrangement of a system that provides services for storing image data received from a user, allowing the user or a third party designated by the user to browse stored image data, and placing a print order of stored image data in an embodiment of the present invention.

Reference numeral 101 denotes an image input device such as a digital still camera, digital video camera, scanner, or the like. The image input device converts an optical image as image information into an electrical signal, executes a predetermined image process, and then records/plays back the image as digital information. Reference numeral 102A denotes a user's personal computer (to be referred to as a user PC hereinafter).

Reference numeral 116 denotes a data transfer interface for transferring image data stored in the image input device 101 to a storage device of the user PC 102A. The data transfer interface 116 can adopt either a wired interface represented by USB and IEEE1394, or a wireless interface represented by IrDA and Bluetooth. Reference numeral 102B denotes a personal computer of a third party designated by the user (to be referred to as a third party PC hereinafter).

In this embodiment, 102A and 102B will be explained as personal computers. Alternatively, portable information terminals such as a portable phone, PDA (Personal Digital Assistance), and the like may be used. Also, an image input device such as a digital still camera, digital video camera, scanner, copying machine, or the like, which comprises a communication function and display function, may be used.

Reference numeral 105 denotes a photo site which provides services for storing image data received from the user PC 102A, allowing the user or a third party designated by the user to browse stored image data, and placing a print order of stored image data. The photo site 105 includes an image database (to be referred to as an image DB hereinafter) 117 for storing image data received from the user PC, an information database (to be referred to as an information DB hereinafter) 118 for string property information of the user who has registered in the photo site 105, that of image data, that of a print site 109 (to be described later), and the like, a photo sharing module 106 for making control upon making a third party browse user's image data stored in the image DB 117, and the like.

Reference numeral 109 denotes a print site which provides a service for printing user's image data stored in the photo site 105. FIG. 1 illustrates a plurality of print sites 109, but the number of print sites is not particularly limited. The print site 109 includes a module (not shown) for receiving a print order from the user via the photo site 105, and is connected to a printer 111 that prints on the basis of image data received from the photo site 105. A printed commodity 112 is shipped to the user or an address designated by the user.

Reference numeral 104 denotes the Internet. The user PCs 102A and 102B, photo site 105, and print sites 109 communicate with each other via the Internet 104. Reference numerals 113A and 113B denote portable information terminals which establish connection to the Internet 104 via mobile nets (networks) 114A and 114B and Internet connection gateways 115A and 115B, and can access the photo site 105.

(System Operation Example)

Figure 2:
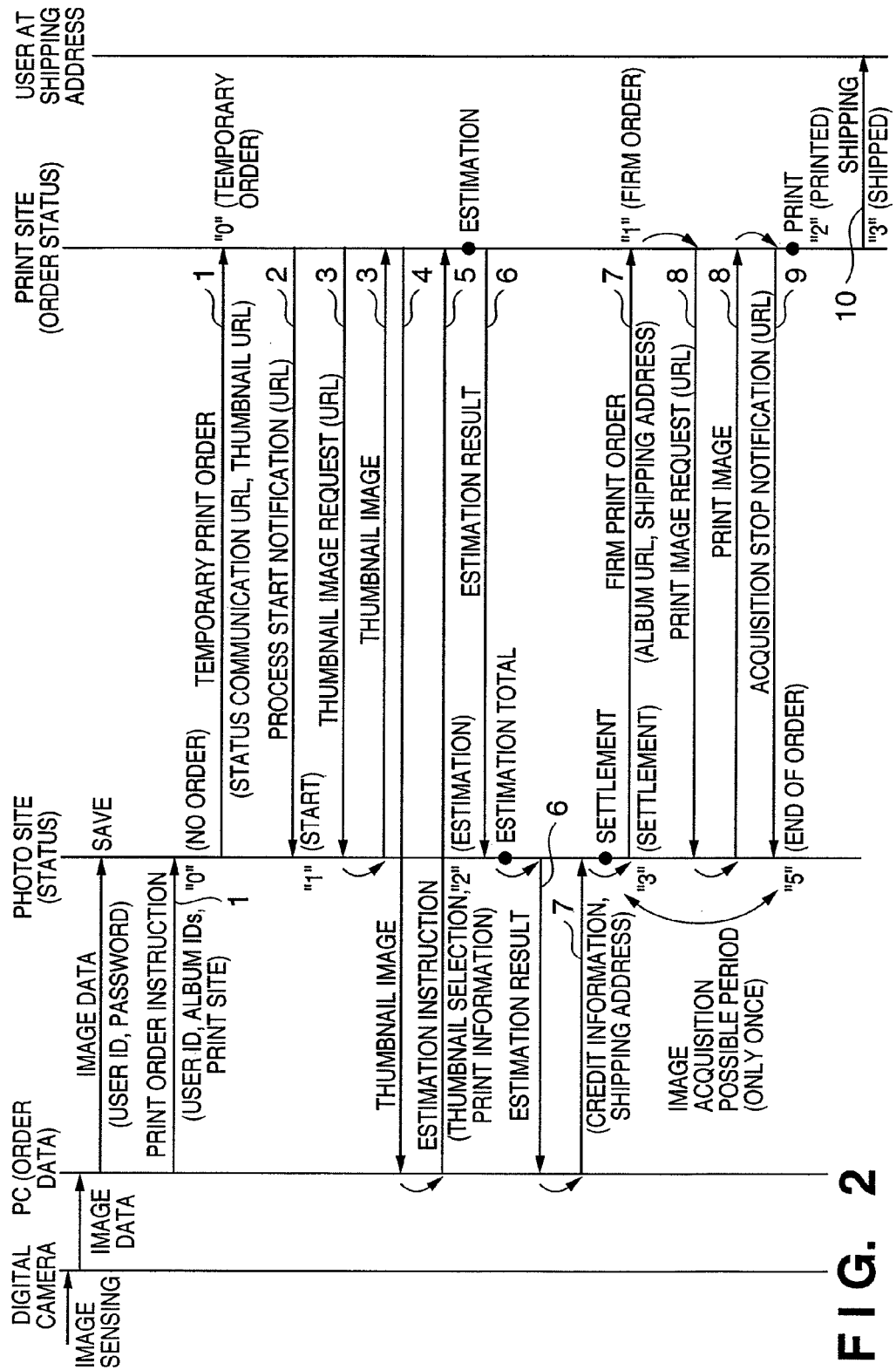
FIG. 2 is a chart showing an outline of an operation example of the system according to the embodiment of the present invention.

FIG. 2 shows a schematic operation example of the service system. In FIG. 2, each thin arrow indicates command information to be sent, and each bold arrow indicates image data to be sent. Also, "n" described in the photo site and print site indicates the status number of an order information table (to be described later using FIG. 9) of the photo site, and the order status number of an order information table (to be described later using FIG. 15) of the print site. In this example, the photo site makes settlement. Alternatively, the print site may make settlement, and may notify the photo site of the result. Note that FIG. 2 shows operations until an output order of image data which is saved in the photo site by the user PC is placed from that user PC to the print site via the photo site, and a printout is shipped to the designated shipping address, but does not show a browse process of a third party and a browse/print order process from a portable information terminal. However, these processes can be easily understood if the operation sequence of FIG. 2 can be understood.

Image data sensed by a digital camera is fetched by the user PC via a storage medium or direct interface. The image data is transferred to and saved in the photo site via the Internet. Upon saving, the user inputs the user ID and password, and the photo site issues an album ID (a unit of saved images will be referred to as an album hereinafter).

(1) A print order instruction is sent from the user PC to the photo site that saves the image data. This print order instruction contains the user ID and information of a selected print site if a plurality of print sites are available. Upon reception of the print order instruction, an order information table is generated in the photo site, and status is set to "0" (no order).

The photo site sends, to the print site, a temporary print order which contains a status notification URL used to access a status communication CGI, and a thumbnail URL used to access a thumbnail of an album to be printed. Upon reception of the temporary print order, an order information table is generated in the print site, and order status is set to "0" (temporary order).

(2) The print site notifies the photo site of the start of processing using the received status notification URL. The photo site sets status of the order information table to "1" (start) upon reception of the processing start notification.

(3) The print site requests the photo site to send a thumbnail image of each album using the received thumbnail URL, and acquires a thumbnail image as a reply to that request.

(4) The print site sends, to the user PC, a dialog used to display the acquired thumbnail image and to prompt the user to input detailed print information (print quantity, paper size, and the like) required for print estimation.

(5) The user PC selects a thumbnail image corresponding to an album to be printed and sends print information in accordance with a user's instruction, and also sends an estimation instruction to the print site.

(6) After estimation, the print site sends the estimation result to the photo site. Upon reception of the estimation from the print site, the photo site re-calculates an estimation by adding its discount or extra amount, and sends the estimation to the user PC. Upon reception of the estimation from the print site, the photo site sets status of the order information table to "2" (estimation). Note that the print site also sends information that pertains to the thumbnail image selected by the user.

(7) The user examines execution of a print process by checking the estimation, and then submits information that contains credit information and a shipping address to the photo site. Upon receiving settlement information such as credit information or the like, the photo site makes settlement. Upon normal termination of settlement, the photo site sends a firm print order which contains an album URL used to access an album to be printed, and the shipping address to the print side. Upon completion of settlement, status of the order information table of the photo site is set to "3" (settlement). On the other hand, upon receiving the firm print order, order status of the order information table of the print site is set to "1" (firm order).

(8) The print site requests the photo site to send a print image using the received album URL, and the photo site sends back the print image to the print site.

(9) Upon reception of the print image, the print site sends an acquisition stop message to the photo site using the status notification URL. The photo site receives the acquisition stop message, and sets status of the order information table to "5" (end of order).

(10) The print site prints the received print image, and sets order status of the order information table to "2" (printed). Furthermore, upon completion of shipping to the shipping address, the print site sets order status of the order information table to "3" (shipped).

Note that a period from when status of the order information table in the photo site is set to "3" (settlement) until it is set to "5" (end of order) is an applicable image acquisition period. In FIG. 2, the processes for one album have been explained. Since order information tables are generated in correspondence with print requests of respective albums and uniquely undergo the aforementioned status transition, image acquisition and print processes are repeated until all the selected albums are printed.

Upon placing a print order from a portable terminal, the processes of the user PC after (1) the print order instruction are done from the portable terminal. Not that a browse process will be described later. The aforementioned sequences will be described in more detail hereinafter.

(Saving Example of Image Data)

Image data which is sensed by the image input device 101 and is stored as digital information is transferred to a storage area of an information storage device such as an HDD or the like of the user PC 102A via the data transfer interface 116.

As for image data transfer from the image input device 101 to the user PC 102A, image data stored in the information storage device in the image input device 101 are simultaneously transferred in response to a command from an OS or dedicated software installed in the user PC 102A, or the OS or dedicated software which runs on the user PC 102A assures a data recording area on an information recording unit of the user PC 102A and transfers image data to that area. Image data which is transferred to the user PC 102A in this way is uploaded to the photo site server 105 connected to the Internet 104 in the following sequence.

A browser, which runs on the user PC 102A and has a standard protocol capable of information transfer on the Internet 104, accesses the photo site server 105 using a standard protocol such as an http protocol or the like, and displays Web information, which is created using a description language such as HTML, XML, or the like, and links with multimedia information such as image data, audio data, and the like managed by a server PC of the photo site server 105. With this operation, the user PC 102A can receive services which are provided by the photo site server 105 using the Internet 104 as the communication infrastructure.

Image data, which is sensed by the image input device 101 and stored in the information storage area of the user PC 102A, is transferred to the photo site server 105 in response to a user's request from the user PC 102A (this transfer will be referred to as image upload hereinafter). Image upload includes a case wherein image data to be transferred is selected from the aforementioned browser and is transferred in synchronism with a user's image upload request action, and a case wherein image data is selected using image upload dedicated software or the like, and is directly transferred from the image upload dedicated software. Both the cases are implemented based on a protocol such as http, ftp, or the like, which can be used on the Internet. A module that implements a series of operations at the photo site server 105 is the photo sharing module 106.

The photo sharing module 106 checks if the uploaded image data is data that the photo site server 105 can use. If it is determined that the photo site server 105 can use the uploaded data, the module 106 stores the uploaded image in the image database 117, and stores its property information or the like in the database 118. In this process, the photo sharing module 106 notifies the user PC 102A that image data is uploaded normally. The database 118 simultaneously manages various data such as data of user property information registered in the photo site server 105, property information of a print service provider (to be referred to as a print site hereinafter) to which a printout request of the uploaded image data is to be sent, and the like, in addition to the property information of image data. In this manner, the user of the user PC 102A designates the uploaded image data via the Web browser, and can browse images. Upon browsing images, a plurality of uploaded image data may be managed as one unit, i.e., an album.

(Print Service Example of Saved Image Data)

The flow of a print order of uploaded image data will be described in turn. The user of the user PC can browse image data uploaded by himself or herself via the Web browser of those uploaded to the photo site server 105. At this time, as means for selecting images to be browsed, the user may select individual images to be browsed one after another, or the user may register a plurality of images as one album, as described above, select an album to be browsed from a plurality of albums, and then select and browse individual images managed by the selected album.

The photo site server 105 sends a print order request of image data uploaded from the user to a print site that provides printouts of image data as a solution. This print provider corresponds to print sites 109A, 109B, and 109C. FIG. 1 shows three print sites in terms of its limited page space. However, four or more print sites may be connected, and the number of print sites is not limited. The user of the user PC 102A selects image data to be printed out as commodities from a browse dialog of uploaded images. The user of the user PC 102A then selects a print site that he or she wants to place an order from the print sites 109A, 109B, and 109C to which the photo site 105 can provide a service. The user selects a print site that he or she wants to place an order in consideration of the services, prices, delivery dates, and the like of respective print sites.

In the following description, assume that the user has selected the print site 109A for the sake of simplicity. However, the basic information flow remains the same independently of the print site 109B or 109C selected by the user. The user who wants to place a print order selects image data to be printed from the browse dialog, and notifies the photo site server of the selected image data. The photo site server 105 generates a temporary print order associated with the image data corresponding to the printout request, and sends an estimation request to the print site 109A via the Internet 104.

Upon reception of the temporary print order from the photo site server 105, the print site 109A calls the URL of a print status notification CGI of the photo site server 105, which is registered in advance in the print site 109A, together with required arguments, thereby notifying the photo site server 105 of the start of an order process. The print site 109A acquires thumbnail images by accessing the thumbnail image data acquisition URL of respective image data described in the temporary print order. Using these thumbnail images, the print site 109A makes the user PC 102A display Web information used to designate details of an order (print size, quantity, and the like).

When the user of the user PC 102A inputs detailed information and makes an operation for starting estimation, an accounting 2 module 110A as an accounting means calculates a price on the basis of the contents of the temporary print order and detailed setup contents, and notifies the photo site server 105 of the estimated price via the Internet 104. The photo site server 105 receives information of this estimated price in real time, and transfers it as Web information to the user PC 102A, thus dynamically presenting the price offered by the print site 109A to the user who placed the print order. Upon offering the estimated price, an accounting 1 module of the photo site server 105 can reflect an additional charge, discount, and the like at the photo site server 105 on the estimated price.

When the user, who placed the print order, of the user PC 102A approves the purchase at the offered price, and returns an approval action to the photo site server 105, a settlement means 107 accepts this action, and makes a settlement process. Upon completion of settlement, the photo site server 105 sends a firm print order to the print site 109A. The print site 109A accepts this firm print order and calls the URL of a CGI designated in the print order, so as to acquire image data to be printed out from the database of the photo site server 105. Also, the print site 109A calls the URL of the print status notification CGI of the photo site server 105, which is registered in advance in the print site 109A, together with required arguments, thus notifying the photo site of the end of order data acquisition.

Image data acquired in this way are printed out using a print means 111A of the print site 109A, and are output as prints 112A. The printouts 112A are delivered to the shipping address designated by the user of the user PC 102A who issued the printout request by some transportation means.

The browse and print order services of the photo site server 105, which are provided upon uploading image data sensed by the image input device 101 via the user PC 102A, have been explained. In this embodiment, the photo site server 105 makes settlement. Alternatively, the accounting 2 module 110A of the print site 109A may execute an accounting process, and a settlement 2 module 120A may make settlement. In this case, the print site 109A calls the URL of the print status notification CGI of the photo site server 105, which is registered in advance in the print site 109A, together with required arguments, thus notifying the photo site server 105 of the end of settlement.

(Browse Service Example of Saved Image Data to Third Party)

A mechanism that allows a user other than the user who uploaded image data sensed by the image input device 101 via the Internet 104 to browse image data, which are uploaded to the photo site server 105 and are stored in the database 117, will be explained hereinafter.

The photo site server 105 provides browse and print order services to a third party designated by the upload user for each "uploaded image" and each "album that manages a plurality of uploaded images as one archive". The user who uploaded image data from the user PC 102A to the photo site server 105 via the Internet 104 notifies the photo site server 105 of property information such as the name and the like and e-mail address of a user (to be referred to as a browse user hereinafter) to which he or she grants a permission to browse via the Web browser. Upon publishing images and albums to the browse user, the photo site server 105 generates a URL required to publish them. At this time, a unique address which uses a random number or the like that cannot be uniquely estimated is assigned to the URL to be generated. Such URL will be referred to as a random URL:

http://○○○.com/PhotoSite/Album/
AlbumEntry.cgi?AlbumID=AJNWDMF

The photo site server 105 sends information of the URL generated in this way to the browse user as an e-mail message via the Internet 104 while appending password information if required. Upon reception of the e-mail message, the browse user can browse images or albums designated by the user who uploaded images by accessing the Internet 104 from the user PC 102, and inputting the URL address described in the e-mail message to the Web browser.

(Print Service Example of Saved Image Data by Third Party)

A mechanism that allows the browse user who uses the user PC 102B and is ready to browse images to place a print order of uploaded image data will be explained below.

The photo site server 105 sends a printout order request of image data from the browse user to a print site that provides printouts of image data as a solution. This print provider corresponds to print sites 109A, 109B, and 109C. FIG. 1 shows three print sites in terms of its limited page space. However, four or more print sites may be connected, and the number of print sites is not limited. The browse user of the user PC 102B selects image data to be printed out as commodities from a browse dialog. The browse user who uses the user PC 102B then selects a print site that he or she wants to place an order from the print sites 109A, 109B, and 109C to which the photo site 105 can provide a service. The user selects a print site that he or she wants to place an order in consideration of the services, prices, delivery dates, and the like of respective print sites.

In the following description, assume that the user has selected the print site 109B for the sake of simplicity. However, the basic information flow remains the same independently of the print site 109A or 109C selected by the user, and a description thereof will be omitted. The browse user who wants to place a print order selects image data to be printed from the browse dialog, and notifies the photo site server of the selected image data. The photo site server 105 generates a temporary print order associated with the image data corresponding to the printout request, and sends an estimation request to the print site 109B via the Internet 104. Upon reception of the temporary print order from the photo site server 105, the print site 109B calls the URL of a print status notification CGI of the photo site server 105, which is registered in advance in the print site 109B, together with required arguments, thereby notifying the photo site server 105 of the start of an order process.

The print site 109B acquires thumbnail images by accessing the thumbnail image data acquisition URL of respective image data described in the temporary print order. Using these thumbnail images, the print site 109B makes the user PC 102B display Web information used to designate details of an order (print size, quantity, and the like). When the user of the user PC 102B inputs detailed information and makes an operation for starting estimation, an accounting 2 module 110B as an accounting means calculates a price on the basis of the contents of the temporary print order and detailed setup contents, and notifies the photo site server 105 of the estimated price via the Internet 104. The photo site server 105 receives information of this estimated price in real time, and transfers it as Web information to the user PC 102B, thus dynamically presenting the price offered by the print site 109B to the browse user who placed the print order. Upon offering the estimated price, the accounting 1 module of the photo site server 105 can reflect an additional charge, discount, and the like at the photo site server 105 on the estimated price.

When the browse user, who placed the print order, approves the purchase at the offered price, and returns an approval action to the photo site server 105, the settlement means 107 accepts this action, and makes a settlement process. Upon completion of settlement, the photo site server 105 sends a firm print order to the print site 109B. The print site 109B accepts this firm print order and calls the URL of a CGI designated in the print order, so as to acquire image data to be printed out from the database of the photo site server 105. Also, the print site 109B calls the URL of the print status notification CGI of the photo site server 105, which is registered in advance in the print site 109B, together with required arguments, thus notifying the photo site of the end of order data acquisition.

Image data acquired in this way are printed out using a print means 111B of the print site 109B, and are output as prints 112B. The printouts 112B are delivered to the browse user of the user PC 102B who issued the printout request by some transportation means.

In this embodiment, the photo site server 105 makes settlement. Alternatively, the accounting 2 module 110B of the print site 109B may execute an accounting process, and a settlement 2 module 120B may make settlement. In this case, the print site 109B calls the URL of the print status notification CGI of the photo site server 105, which is registered in advance in the print site 109B, together with required arguments, thus notifying the photo site server 105 of the end of settlement.

(Browse Service Example of Saved Image Data to Portable Terminal)

The photo site server 105 can provide browse notification, browse function, and print order services of images (or albums) to an owner of a portable terminal designated by the user who uploaded images. Such owner can receive an e-mail message that contains a URL required to browse an album at his or her portable terminal, and can browse the images and albums or can place an print order of them from the portable terminal (the user who accesses the photo site server 105 from the portable terminal will be referred to as a portable browse user hereinafter).

The user who uploaded image data from the user PC 102A to the photo site server 105 via the Internet 104 notifies the photo site server 105 of property information such as the name and the like and e-mail address of a portable browse user to which he or she grants a permission to browse via the browser. Upon publishing images and albums to the portable browse user, the photo site server 105 generates a URL required to publish them. At this time, a unique address which uses a random number or the like that cannot be uniquely estimated is assigned to the URL to be generated. Such URL will be referred to as a random URL:

http://○○○.com/PhotoSite/Album/
AlbumEntry.cgi?AlbumID=AJNWDMF

The photo site server 105 sends information of the URL generated in this way to the portable terminal 113A of the portable browse user as an e-mail message via the Internet 104 while appending password information if required. This e-mail message is transferred to the portable browse user along the following route. That is, the e-mail message is sent from a mail server of the photo site server 105 to the mobile network 114A that can exchange various data with the portable terminal 113A via the Internet 104 and Internet connection gateway 115A, and is then transferred to the portable terminal 113A. Upon reception of the e-mail message, the portable browse user accesses the photo site server 105 via a route of mobile network 114A→Internet connection gateway 115A→Internet 104 by inputting the URL address described in the e-mail message at a dedicated browser of the portable terminal 113A.

The photo site server 105 has browser information dedicated to a portable terminal, which is created by resizing image data to a size that the portable terminal 113A can display, and using a description language such as WML, CompactHTML, or the like dedicated to the portable terminal, in addition to Web information for browsing image data, which is created using a description language such as HTML, XML, or the like that can be displayed on the Internet 104. The photo site server 105 discriminates the model of the portable terminal 113A in accordance with a request from the portable terminal 113A, and outputs information that can be displayed by the portable terminal 113A. As a matter of course, the photo site server 105 is compatible to various formats to prepare portable terminal environments that can be browsed not only by the portable terminal 113A but also by the portable terminal 113B which uses a different communication protocol specification, information description language, and mobile network environment.

For the sake of simplicity, the number of available portable terminal models is two in FIG. 1, but three or more portable terminal models may be used. A browse request from the portable terminal 113B is sent from the mobile net 114B as a mobile environment that the portable terminal 113B can use to the Internet connection gateway 115B, and undergoes protocol conversion. The converted browse request is then delivered to a server of the photo site server 105 connected to the Internet 104. The photo site server 105 has browser information dedicated to a portable terminal, which is created by resizing image data to a size that the portable terminal 113B can display, and using a description language such as WML, CompactHTML, or the like dedicated to the portable terminal, in addition to Web information for browsing image data, which is created using a description language such as HTML, XML, or the like that can be displayed on the Internet 104. The photo site server 105 discriminates the model of the portable terminal 113B in accordance with a request from the portable terminal 113B, and outputs information that can be displayed by the portable terminal 113B.

(Print Service Example of Saved Image Data to Portable Terminal)

A mechanism that allows the portable browse user as the user of the portable terminal 113A or 113B to select image data to be printed from those that he or she browsed and to place a print order will be described below. An information transfer route between the photo site server 105 and portable terminal 113A to be described below is photo site server 105→Internet 104→Internet connection gateway 115A→mobile net 114A→portable terminal 113A, and a description thereof will be omitted for the sake of simplicity.

The portable browse user selects image data to be printed from those which are allowed to browse by accessing the URL described in the previously received e-mail message, and notifies the photo site server 105 of the selected image data. The photo site server 105 sends a printout order request of image data from the portable browse user to a print site that provides printouts of image data as a solution. This print provider corresponds to print sites 109A, 109B, and 109C. FIG. 1 shows three print sites in terms of its limited page space. However, four or more print sites may be connected, and the number of print sites is not limited. The portable browse user of the portable terminal 113A selects image data to be printed out as commodities from a browse dialog.

The portable browse user then selects a print site that he or she wants to place an order from the print sites 109A, 109B, and 109C to which the photo site 105 can provide a service. The portable browse user selects a print site that he or she wants to place an order in consideration of the services, prices, delivery dates, and the like of respective print sites. In the following description, assume that the user has selected the print site 109C for the sake of simplicity. However, the basic information flow remains the same independently of the print site 109B or 109A selected by the user, and a description thereof will be omitted.

The portable browse user who wants to place a print order selects image data to be printed from the browse dialog, and notifies the photo site server 105 of the selected image data. The photo site server 105 generates a temporary print order associated with the image data corresponding to the printout request, and sends an estimation request to the print site 109C via the Internet 104. Upon reception of the temporary print order from the photo site server 105, the print site 109C calls the URL of a print status notification CGI of the photo site server 105, which is registered in advance in the print site 109C, together with required arguments, thereby notifying the photo site server 105 of the start of an order process. The print site 109C acquires thumbnail images by accessing the thumbnail image data acquisition URL of respective image data described in the temporary print order. Using these thumbnail images, the print site 109C makes the portable terminal 113A display Web information used to designate details of an order (print size, quantity, and the like).

When the user of the portable terminal 113A inputs detailed information and makes an operation for starting estimation, an accounting 2 module 110C as an accounting means calculates a price on the basis of the contents of the temporary print order, and notifies the photo site server 105 of the estimated price via the Internet 104. The photo site server 105 receives information of this estimated price in real time, and transfers it as Web information to the portable terminal 113A, thus dynamically presenting the price offered by the print site 109C to the portable browse user who placed the print order. Upon offering the estimated price, the accounting 1 module of the photo site server 105 can reflect an additional charge, discount, and the like at the photo site server 105 on the estimated price.

When the portable browse user, who placed the print order, approves the purchase at the offered price, and returns an approval action to the photo site server 105, the settlement means 107 accepts this action, and makes a settlement process. Upon completion of settlement, the photo site server 105 sends a firm print order to the print site 109C. The print site 109C accepts this firm print order and calls the URL of a CGI designated in the print order, so as to acquire image data to be printed out from the database of the photo site server 105. Also, the print site 109C calls the URL of the print status notification CGI of the photo site server 105, which is registered in advance in the print site 109C, together with required arguments, thus notifying the photo site of the end of order data acquisition.

Image data acquired in this way are printed out using a print means 111C of the print site 109C, and are output as prints 112C. The printouts 112C are delivered to the portable browse user as the user of the portable terminal 113A who issued the printout request by some transportation means.

The flow of information required to provide services that allow a third party user, who is designated by the user who uploaded images, and receives an image or album browse message, to browse image data and to place a print order on the basis of information received from the photo site server 105 has been explained. In this embodiment, the photo site server 105 makes settlement. Alternatively, the accounting 2 module 110C of the print site 109C may execute an accounting process, and a settlement 2 module 120C may make settlement. In this case, the print site 109C calls the URL of the print status notification CGI of the photo site server 105, which is registered in advance in the print site 109C, together with required arguments, thus notifying the photo site server 105 of the end of settlement.

As examples of photo services implemented by the aforementioned system, this embodiment will mainly explain details of the following services.

(1) User registration: This service allows the user PC 102A to make registration required to access the photo site server 105, and issues a user ID.

(2) Image upload: This service transfers images from the user PC 102A to the photo site server 105.

(3) Print order: This service allows the user PC 102A to issue an image print instruction to the photo site server 105, and prints images via the print site 109A.

(4) Album notification: This service sends an e-mail message to allow another user to browse an album which is created in the photo site server 105 by the user PC 102A.

(5) Album browsing: This service allows the user PC 102B to browse an album in the photo site server 105.

(6) Album browsing from portable phone: This service allows the portable terminal 113A to browse an album in the photo site server 105.

Note that the aforementioned services will be described in detail later. Of course, services and functions implemented by the photo service system of this embodiment are not limited to those described above.

Configuration Example of Database Used in this Embodiment (Configuration Example of Database Managed by Photo Site Server 105)

FIGS. 3 to 13 show the contents of the database 118 managed by the photo site server 105 in this embodiment.

FIG. 3 shows a data table associated with customer information managed by the photo site server 105 in this embodiment.

When the user executes user registration, a customer information data table 400 is generated for one record, and is registered in and managed by the database 118. A user ID is uniquely defined for the user who has made user registration, and customer information is managed by the customer information table 400 using a user ID 401 as a key. Information managed as customer information includes a notification destination mail address 402, login name 403, password 404, name (last name) 405, name (first name) 406, furigana name (last name) 407, furigana name (first name) 408, postal codes (1, 2) 409 and 410, prefecture code 411, address lines (1, 2) 412 and 413, phone numbers (1, 2, 3) 414, 415, and 416, and user registration state 417. In the user registration state 417, "1" indicates a registered, access-permitted state, and "0" indicates an access-inhibited state.

FIG. 4 shows a customer state table used to manage information that represents the current state of the user who accesses the photo site server 105 in this embodiment.

When the user executes user registration, a customer state data table 500 is generated for one record, and is registered in and managed by the database 118. Setting values in this record are updated as needed in accordance with user's operations during access to the photosite. For this reason, when the user logs on the system, the customer state data table 500 stores the last used state of the user. This customer state data table 500 stores an album ID 502 of an album that the user displayed lastly, a disk use upper limit size 503, and points 504 accumulated upon placing print orders, using a user ID 501 as a key. Note that user ID 501 stores the same value as the user ID 401 in case of an identical user.

FIG. 5 shows a customer album data table managed by the photo site server 105 in this embodiment.

When the user creates a new album upon access to the photo site, a customer album data table 600 is generated for one record, and is registered in and managed by the database 118. This recorded is deleted from the database 118 when the user deletes the corresponding album. The customer album data table 600 stores an ID 602 of an album created by the user, and a display order number 603 of that album using a user ID 601 of the registered user as a key. Note that user ID 601 stores the same value as the user ID 401 in case of an identical user.

FIG. 6 shows an album information data table managed by the photo site server 105 in this embodiment.

When the user creates a new album upon access to the photo site, an album information data table 700 is generated for one record accordingly, and is registered in and managed by the database 118. This recorded is deleted from the database 118 when the user deletes the corresponding album. The album information data table 700 manages an album name 702, a file path 703 to a comment to an album, an album publication availability flag 704, a password availability flag 705, an album password 706, a print availability flag 707, an original image display availability flag 708, and a display mode number 709 using an album ID 701 as a key.

If the album publication availability flag 704 is "1", it indicates that publication is permitted; if it is "0", it indicates that publication is inhibited; and if it is "−1", it indicates that publication is inhibited by a site manager. If the password availability flag 705 is "1", it indicates that a password is set; if it is "0", it indicates that a password is not set. If the password availability flag 705 is "1", a password is saved in the album password 706. If the print availability flag 707 is "1", it indicates that the album can be printed; if it is "0", it indicates that the album cannot be printed. If the original image display availability flag 708 is "1", it indicates that display is permitted; if it is "0", it indicates that display is inhibited. If the display mode number is "1", it indicates a list display mode; if it is "0", it indicates a detailed display mode. Note that the album IDs 701 and 602 store the same ID in an identical album.

FIG. 7 shows an album image data table managed by the photo site server 105 in this embodiment.

When the user uploads an image onto an album, an album image data table 800 is generated for one record per image, and is registered in and managed by the database 118. This record is deleted from the database 118 when a corresponding image is deleted. The album image data table 800 manages an image ID 802 of an image stored in an album with an album ID 801, and an image display number 803 indicating the display position of that image in the album. Note that the album IDs 801 and 701 store the same ID in an identical album.

FIG. 8 shows an image information table managed by the photo site server 105 in this embodiment.

When the user uploads an image onto an album, an image information data table 900 is generated for one record per image, and is registered in and managed by the database 118. This recorded is deleted from the database 118 when a corresponding image is deleted. The image information table 900 saves a user ID 902 of the user who possesses that image, an image name 903, a file path 904 to an original image, a path 905 to a thumbnail file, a file path 906 to a preview image, a path 907 to a comment file to an image, an image browse count 908, and an image print count 909, using an image ID 901 as a key. Note that the image IDs 901 and 802 store the same ID for an identical image, and the user IDs 902 and 401 store the same ID for an identical user.

FIG. 9 shows an order information table managed by the photo site server 105 in this embodiment.

When a print order of an album is placed, an order information table 1000 is generated for one record per order, and is registered in and managed by the database 118. The order information table 1000 stores an orderer ID 1002, shipping-address name 1003, shipping-address postal codes (1, 2) 1004 and 1005, shipping-address prefecture code 1006, shipping address lines (1, 2) 1007 and 1008, shipping-address phone numbers (1, 2, 3) 1009, 1010, and 1011, print site ID 1012, order date 1013, and status 1014, using an order number 1001 issued for each print order as a key. The status 1014 indicates the progress state of an order process, and "0" means [no order]; "1", [start]; "2", [estimation]; "3", [settlement]; "4", [wait]; "5", [end of order]; and "6", [shipped].

FIG. 10 shows an order image data table managed by the photo site server 105 in this embodiment.

Upon receiving an album print order, records of an order image data table 1100 are generated in correspondence with the number of images that the photo site server 105 notifies the print site 109A in the print order, and are registered in and managed by the database 118. The order image data table 1100 manages a receipt number 1102 at the print site 109A, an image number 1103 which is managed for each print order, file paths 1104, 1105, and 1106 to a thumbnail image, original image, and preview image, which are copied for the print order, a print quantity 1107, a print size 1108, a print type 1109, an image ID 1110, a lock flag 1111 used to control acquisition from the print site 109A, an acquired flag 1112 used to manage the acquisition state of the print site 109A, and an acquisition count 1113 used to record the acquisition count by the print site 109A, using an order number 1101 as a key.

In the print size 1108, "1" means an L size; "2", a 2 L size; "3", a postcard size; "4", an unofficial postcard size; and "5", an A4 size. In the print type 1109, "0" means borderless print;

and "1", border print. Note that the order numbers 1101 and 1001 store the same number in an identical order. The image ID 1100 is an image ID before copy, and holds the same value as the image ID 901. The lock flag 1111 indicates whether or not an image with the image ID 1110 can be acquired in association with the order number 1101: "0" means that the image can be acquired (unlock state), and "1" means that the image cannot be acquired (lock state). The acquired flag 1112 indicates whether or not an image with the image ID 1110 has already acquired from the print site 109A: "0" means that the image is not acquired, and "1" means that the image has already been acquired. The acquisition count 1113 indicates the number of times that the image ID 1110 is acquired from the print site 109A.

FIG. 11 shows an order settlement data table managed by the photo site server 105 in this embodiment.

Upon reception of an album print order, an order settlement data table 1200 is generated for one record per order, and is registered in and managed by the database 118. The order settlement data table 1200 stores a settlement method 1202, total amount 1203, print charge 1204, print charge bonus 1205, print charge tax 1206, shipping charge 1207, shipping charge tax 1208, photo site bonus 1209, and status 1210, using an order number 1201 as a key. In the settlement method, "1" means transfer; "2", cash on delivery; and "3", credit settlement. In this embodiment, the flow only in the case of credit settlement will be explained. In the status 1201, "0" means the end of settlement, and "1" means that an unsettled order is pending. Note that the order numbers 1201 and 1001 store the same number in an identical order.

FIG. 12 shows an orderer data table managed by the photo site server 105 in this embodiment.

Upon receiving an album print order, an orderer data table 1300 is generated for one record per order, and is registered in and managed by the database 118. The orderer data table 1300 manages a user ID 1302, notification destination mail address 1303, name (last name) 1304, name (first name) 1305, furigana name (last name) 1306, furigana name (first name) 1307, postal codes (1, 2) 1308 and 1309, prefecture code 1310, address lines (1, 2) 1311 and 1312, and phone numbers (1, 2, 3) 1313, 1314, and 1315, using an orderer ID 1301 as a key. If a print orderer is not a registered user of the photo site, "0" is substituted in the user ID 1302. Note that the orderer IDs 1301 and 1002 store the same ID in an identical order. When the orderer is a member of the photo site, the user IDs 1302 and 401 for an identical orderer store the same ID. In this case, user information values are set in the fields 1303 to 1315 by copying those input to the corresponding user information fields of the customer information table 400 having the same user ID 401.

FIG. 13 shows a print site data table managed by the photo site server 105 in this embodiment.

When a new print site that can be connected to the photo site server 105 is established, a new record of a print site data table 1400 is generated accordingly, and is registered in and managed by the database 118. The print site data table 1400 manages a provider name 1402, a URL 1403 to a temporary order notification CGI, a URL 1404 to a firm order notification CGI, and a URL 1405 to a CGI upon canceling an order, using a print site ID 1401 as a key.

(Configuration Example of Database Managed by Print Site)

FIGS. 14 to 17 show the contents of databases 119A, 119B, and 119C managed by the print sites 109A, 109B, and 109C in this embodiment. Since the configurations of the print sites 109B and 109C are the same as that of the print site 109A, the following explanation will be given taking the print site 109A as an example.

FIG. 14 shows the contents of a database of the print site 109A, which manages information of the photo site 105, in this embodiment.

When a photo site that can place an order to the print site 109A is established, a new record of a photo site data table 1500 is generated, and is registered in the database 119A. The photo site data table 1500 manages a photo site ID 1501, a photo site name 1502, a URL 1503 to an estimation notification CGI, a URL 1504 to an exceptional process notification CGI (e.g., cancel of an order, a change in price, and the like), and a URL 1505 to a print status notification CGI.

FIG. 15 shows the contents of an order information table of the print site 109A in this embodiment.

An order information table 1600 of the print site 109A is generated for one record every time a temporary order is placed from the photo site server 105, and is registered in and managed by the database 119A. This record is deleted from the database 119A upon receiving an order cancel request from the photo site server 105. The order information table 1600 of the print site 109A manages a receipt number 1601, a photo site ID 1602 of the photo site server 105 which placed an order, an order number 1603 of the photo site server 105, a temporary order date 1604, a 15, firm order date 1605, order status 1606, and a print type 1607, print charge 1608, print site bonus charge 1609, print tax 1610, shipping charge 1611, shipping charge tax 1612, and total amount 1613 upon a print order. If the order status 1606 is "0", it indicates a temporary order; if it is "1", it indicates a firm order (not printed); if it is "2", it indicates a firm order (printed); if it is "3", it indicates that an order has been shipped; and if it is "4", it indicates charge paid. Also, in the print type 1607, "0" means borderless print; and "1", border print.

FIG. 16 shows the contents of a print image information table of the print site 109A in this embodiment.

When the photo site server 105 places a temporary print order, records of a print image information table 1700 of the print site 109A are generated in correspondence with the number of images contained in that order, and are registered in and managed by the database 119A. These records are deleted from the database 119A upon receiving an order cancel request from the photo site server 105. The print image information table 1700 of the print site 109A manages a receipt number 1701, an image number 1702, a URL 1703 on the photo site required to acquire a print image file, a URL 1704 on the photo site required to acquire a preview image file, a URL 1705 on the photo site 105 required to acquire a thumbnail image file to be displayed on a print order dialog upon placing a temporary order, a print quantity 1706, a print size 1707, print status 1708, and a print unit price 1709. The image number 1702 stores a number which is assigned to each of images sent from the photo site 109A upon a temporary order to have "1" as the first image. In the print size 1707, "1" means an L size; "2", a 2 L size; "3", a postcard size; "4", an unofficial postcard size; and "5", an A4 size. In the print status 1708, "0" means that this image is not printed yet, and "1" means that this image has already been printed. Note that the receipt numbers 1701 and 1601 store the same number in an identical print order.

FIG. 17 shows the contents of an order shipping table of the print site 109A.

An order shipping table 1800 of the print site 109A is generated for one record upon receiving a firm order from the photo site server 105, and is registered in and managed by the database 119A. The order shipping table 1800 of the print site manages an order number 1801, a shipping-address name 1802, shipping-address postal codes (1, 2) 1803 and 1804, shipping-address prefecture code 1805, shipping address lines (1, 2) 1806 and 1807, shipping-address phone numbers (1, 2, 3) 1808, 1809, and 1810, shipping date 1811, and status 1812. In the shipping status 1812, "0" indicates that an order is not shipped yet, and "1" indicates that an order has been shipped.

Service Example of Photo Site of This Embodiment

The operation sequences of the photo site 105 and print site 109A in association with services that the photo site 105 of this embodiment provides to the user PC and portable terminal will be explained below. Note that the photo site 105 and print site 109A comprise versatile or special computers, but a description of their hardware arrangement will be omitted, since they are known to those who are skilled in the art. Note that the aforementioned tables are stored in a RAM, disk, or the like, and are referred to by a corresponding CPU. Also, programs corresponding to the flow charts to be described below are loaded from a ROM or an external storage device such as a disk, memory card, or the like onto a RAM, and are executed by the corresponding CPU.

FIG. 18 shows an example of a dialog displayed at the beginning of a server service of the photo site server 105 in this embodiment.

A dialog 1900 has a user registration button 1901, input fields 1902 and 1903 of a login name and password required when the registered user accesses the photo site 105, a login button 1904, an album ID input field 1905 required to browse an album, an album browse button 1906, and a print order ID input field 1907 and print order confirmation button 1908 used upon confirming print order status.

Processes executed upon depression of respective buttons on the dialog of FIG. 18 will be explained below.

(Processing Sequence Example of User Registration)

Figure 19:
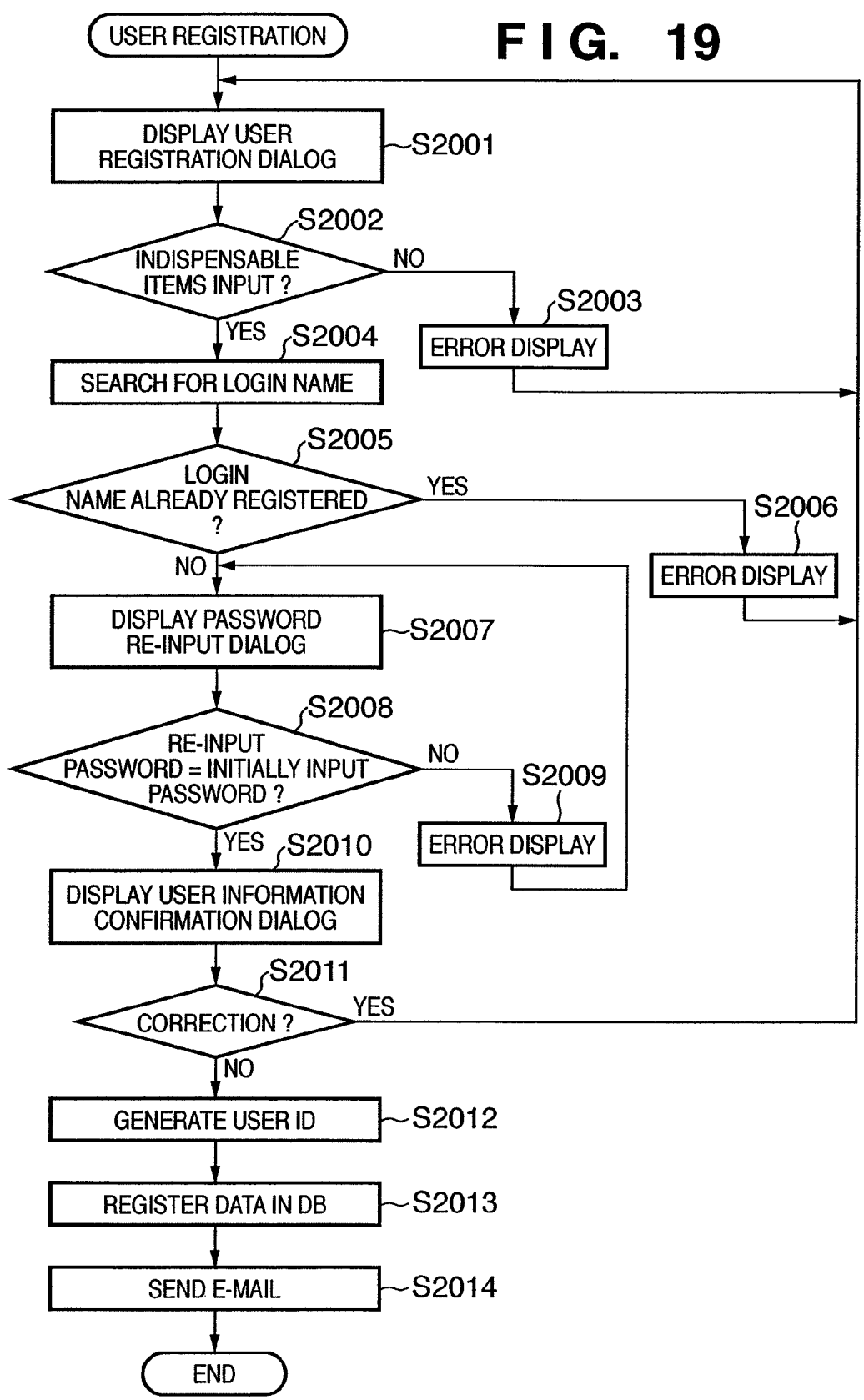
FIG. 19 is a flow chart showing the process of a photo site server upon user registration in the embodiment of the present invention.

FIG. 19 is a flow chart showing the process of the photo site server 105 upon user registration.

Upon depression of the user registration button 1901 on the dialog 1900, a dialog 2100 shown in FIG. 20 is displayed, and a user registration process starts (S2001).

The dialog 2100 shown in FIG. 20 is used to make user registration of this embodiment, and has an input field 2101 of a notification destination mail address of a user to be registered, an input field 2102 of a login name of the user, a password input field 2103, name input fields 2104 and 2105 and their furigana name input fields 2106 and 2107, postal code input fields 2108 and 2109 of the user to be registered, a prefecture select field 2110, address input fields 2111 and 2112, and phone number input fields 2113, 2114, and 2115. When a cancel button 2117 is pressed, the user registration process is skipped (not shown in FIG. 19), and the dialog 1900 is displayed again.

If the user has pressed a registration button 2116, it is checked in step S2002 if indispensable items are input. In this embodiment, if the mail address field 2101, login name field 2102, password field 2103, name fields (2104, 2105), and phone number fields 2113, 2114, and 2115 have entries, it is determined that the indispensable items are input.

Figure 21:
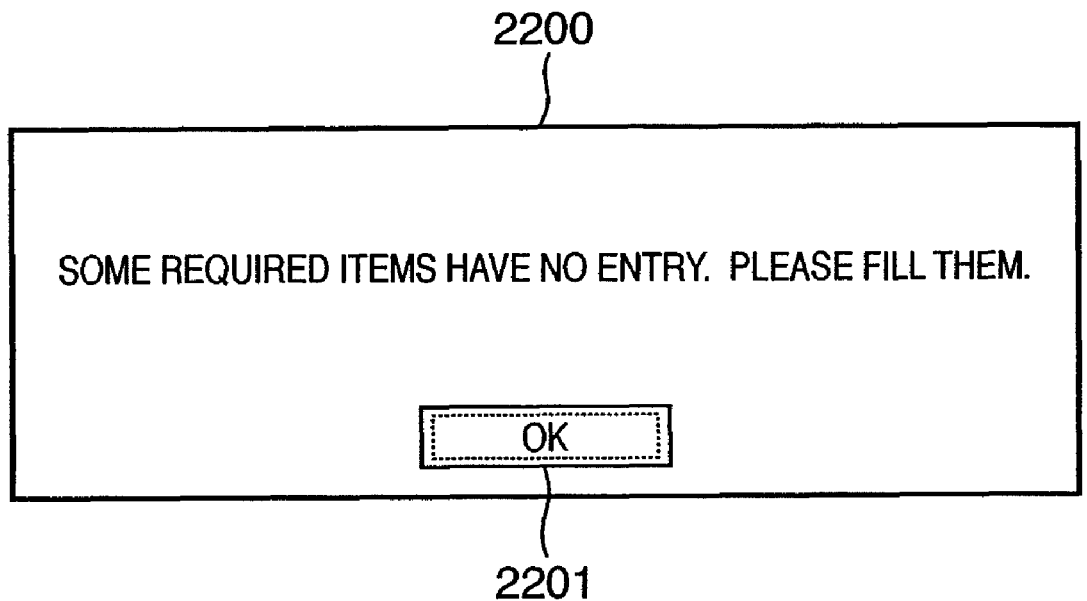
FIG. 21 shows an error dialog displayed when at least one indispensable field has no entry upon user registration at the photo site in the embodiment of the present invention.

If the photo site server 105 determines that some indispensable items are not input, an error dialog is displayed in step S2003. FIG. 21 shows a dialog 2200 displayed at that time. Upon depression of an OK button 2201, the dialog 2100 is displayed again.

If it is determined in step S2002 that the indispensable items are input, the photo site server 105 searches the customer information data table in the database 118 (S2004) to see if the login name input to the input field 2102 has already been used (S2005).

Figure 22:
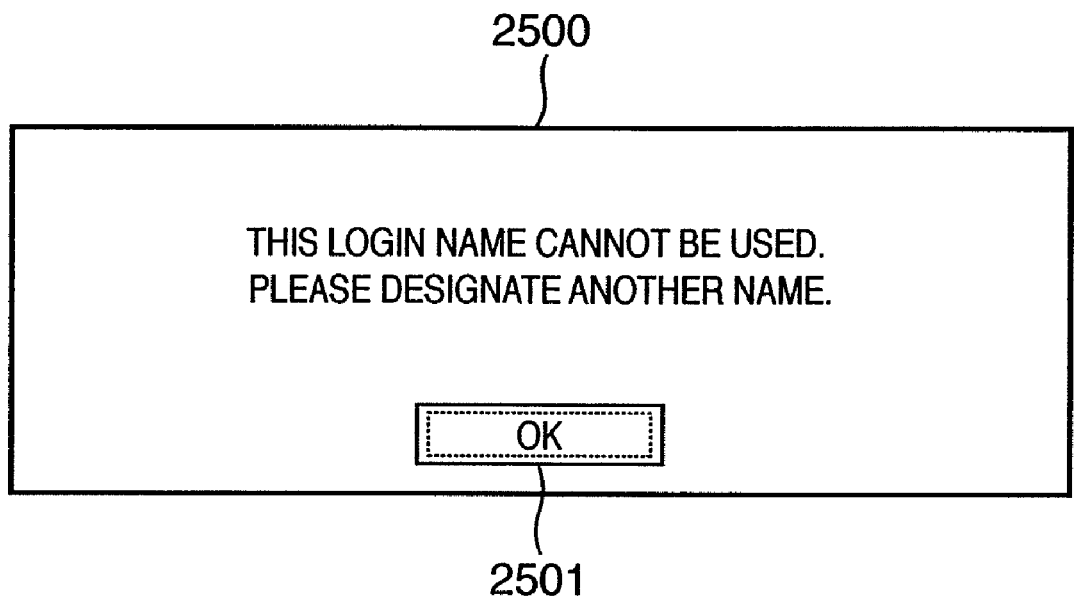
FIG. 22 shows an error dialog displayed when a given login name has already been registered upon user registration at the photo site in the embodiment of the present invention.

If the login name input to the input field 2102 has already been used, an error dialog is displayed in step S2006. FIG. 22 shows a dialog 2300 displayed at that time. Upon depression of an OK button 2301, the dialog 2100 is displayed again.

Figure 23:
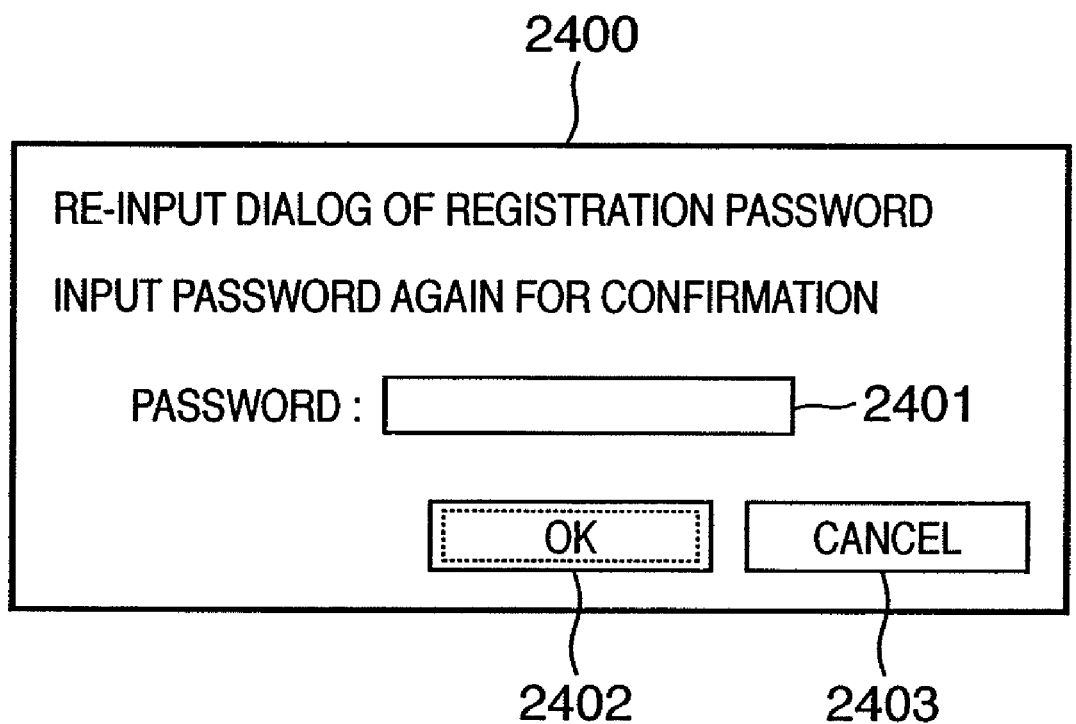
FIG. 23 shows a dialog that prompts the user to re-input a password upon user registration at the photo site in the embodiment of the present invention.

If the login name input to the input field 2102 is not found from the database 118, a dialog 2400 shown in FIG. 23 is displayed to prompt the user to re-input the password (S2007). If the user has pressed a cancel button 2403, the registration process is canceled (not shown in FIG. 19), and the dialog 2100 is displayed again.

If the user has pressed an OK button 2402, it is checked if the password input to a password input field 2401 is the same as that input to the password input field 2103 on the dialog 2100 (S2008).

Figure 24:
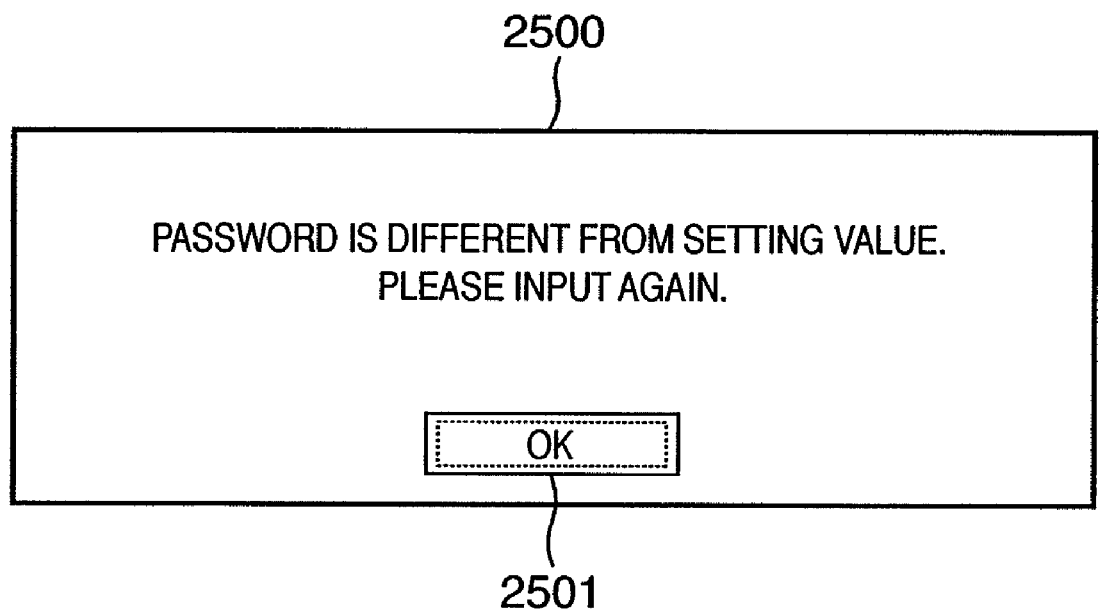
FIG. 24 shows an example of an alert dialog displayed when a wrong password is input upon password confirmation in the embodiment of the present invention.

If it is determined in step S2008 that the input password is not the same as that input on the dialog 2100, an error dialog 2500 shown in FIG. 24 is displayed (S2009) If the user has pressed an OK button 2501 on this dialog, the dialog 2400 is displayed again.

If it is determined in step S2008 that the input password is the same as that input on the dialog 2100, a user information confirmation dialog 2600 shown in FIG. 25 is displayed (S2010). Information displayed on this dialog is that input by the user on the dialog 2100. If the user has pressed a correction button 2602 on this dialog, the dialog 2100 is displayed again, and the user can edit the input information.

Upon depression of a confirmation button 2601, a maximum value of the user IDs that have been issued previously is acquired from the database 118. A value obtained by adding "1" to the acquired value becomes a user ID of the user to be registered (S2012).

In step S2013, the contents of information input on the dialog 2100 are registered in the customer information table 400 using the user ID obtained in step S2012. As the registered contents, the contents of the input fields 2101, 2102, 2103, 2104, 2105, 2106, 2107, 2108, 2109, 2110, 2111, 2112, 2113, 2114, and 2115 are respectively transcribed to the fields 402, 403, 404, 405, 406, 407, 408, 409, 410, 411, 412, 413, 414, 415, and 416, and the user registration state is set to be "1".

In the user new registration state, there are no albums and upload images created by the user. Hence, the customer album table 600 and album information data table 700 may be created for one record each and may be registered in the database 118 upon new registration. In this case, the album ID 602 is set to be (maximum number+1) of the album IDs issued so far in the database 118, the album display number 603 is set to be "1", and the album name 702 is set to be "My Album" in this embodiment as a temporary album name generated by the system. In other album information data tables, initial values determined by the photo site server 105 are set.

Upon completion of registration to the database, an e-mail document that describes the same contents as those displayed on the dialog 2600 is created, and an e-mail message is sent to the e-mail address registered in the customer information table 400 (S2014). FIG. 26 shows an example of the contents of the e-mail message sent at that time.

(Edit Example of Image Data at Photo Site)

Figure 27:
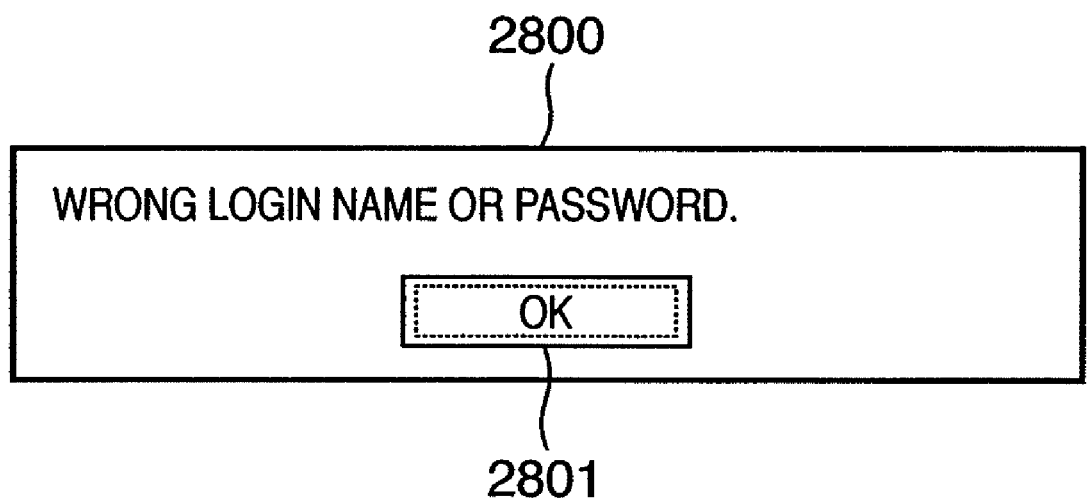
FIG. 27 shows an example of a dialog displayed when the user has failed login on a server service start dialog of the photo site in the embodiment of the present invention.

When the user inputs the login name and password to the login name input field 1902 and password input field 1903 on the dialog 1900 and presses the login button 1904, the photo site server 105 searches the customer information table in the database 118. When the input login name is not found from the customer information table, and when a password in the found record does not match a character string input to the password input field 1903, an alert dialog 2800 shown in FIG. 27 is displayed. At this time, when the user presses a button 2801, the dialog 1900 is displayed again.

Note that all user images are managed for respective folders named "album" in this embodiment.

Figure 28:
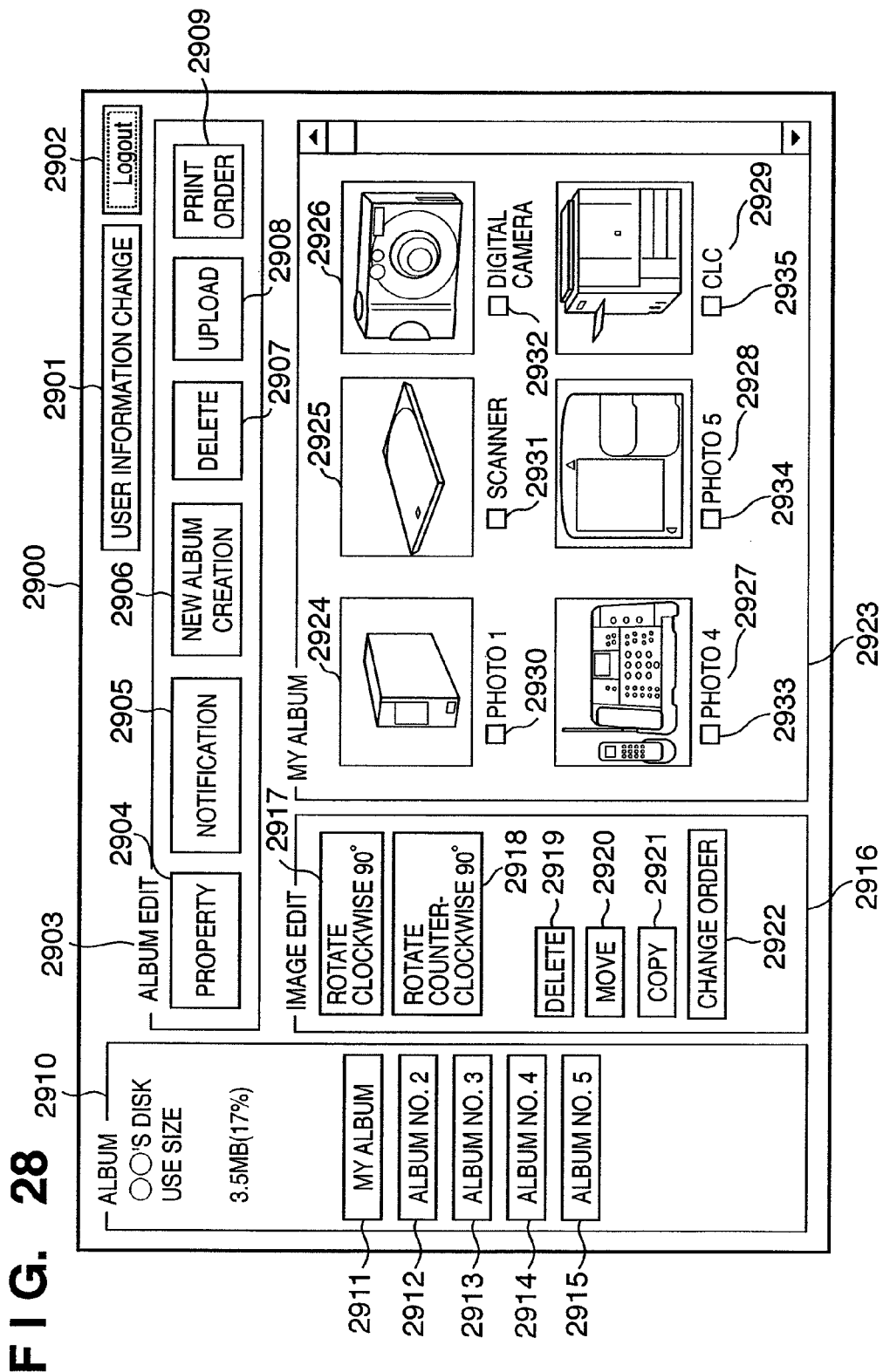
FIG. 28 shows a dialog displayed when the user is normally authenticated by the login process to the photo site in the embodiment of the present invention.

When the password of the found record matches the character string input to the input field 1903, it is determined that the photo site access user has been normally authenticated, and a dialog 2900 shown in FIG. 28 is displayed.

On the dialog 2900, a button 2901 is used to change user information. A button 2902 is a logout button. On a field 2903, buttons used to edit an album displayed on this dialog are laid out. A button 2904 is used to set the property of an album. A button 2905 is an album notification button. A button 2906 is used to create a new album. A button 2907 is used to delete an album. A button 2908 is used to upload an image. A button 2909 is a print order button.

On a field 2910, buttons used to select an album are displayed. At the head of this field, the total size of images that the user saves on the photo site server, and the ratio of that total size to the allowable use size are displayed. Below such information, buttons corresponding in number to albums created by the user are laid out. In FIG. 28, it is confirmed by buttons 2911 to 2915 that the user created five albums. Upon depression of each of these buttons, the photo site server updates images displayed on an album display field 2923 in accordance with the selected album, and displays the album name of that album at the upper left corner position of the album display field.

On a field 2916, buttons used to edit images in the album are laid out. Upon depression of each of buttons 2917 to 2922, an edit process corresponding to the pressed button is done for images which are displayed within the field 2923 and have checked check boxes. The field 2923 is an album image display field. On this field, images stored in the album are displayed in turn, and check boxes are laid out in correspondence with the images. When the user presses each image, a property setup dialog of that image is displayed.

Figure 29:
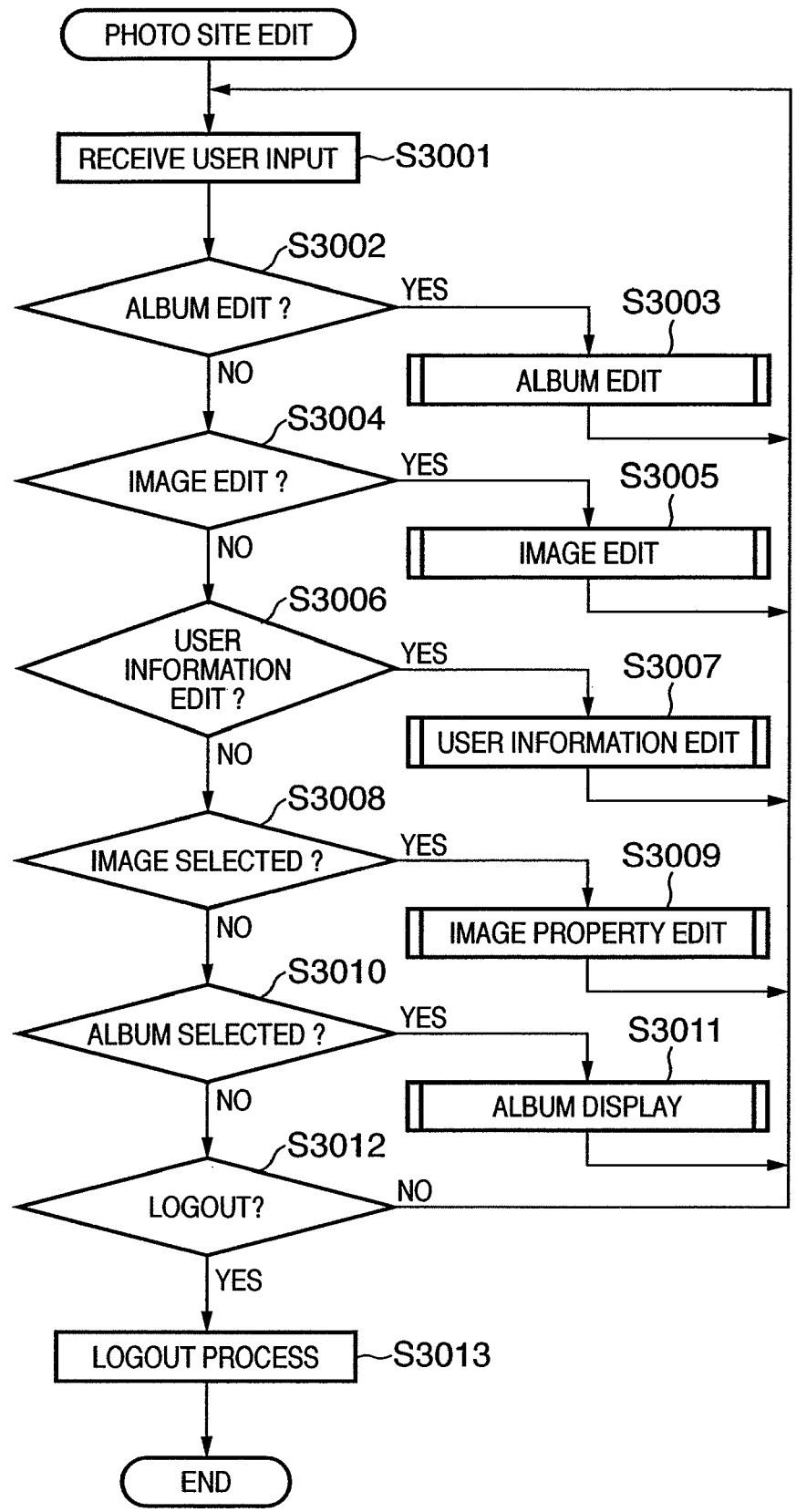
FIG. 29 is a flow chart showing a processing method associated with user's edit operation at the photo site in the embodiment of the present invention.

FIG. 29 is a flow chart showing a processing method associated with user's edit operation after the dialog in FIG. 28 is displayed, and the following processes are done in accordance with user's operations on the dialog shown in FIG. 28.

In step S3001, a user input is accepted. It is checked in step S3002 if the user input is album edit. When the user has pressed one of the buttons in the field 2903, album edit is determined, and in such case, the flow advances to step S3003 to execute an album edit process.

If it is determined in step S3002 that the user input is not album edit, it is checked in step S3004 if the user input is image edit. When the user has pressed one of the buttons in the field 2916, image edit is determined, and the flow advances to step S3005.

If it is determined in step S3004 that the user input is not image edit, it is checked in step S3006 if the user input is edit of user information. When the user has pressed the button 2901 on the dialog 2900, edit of user information is determined. Upon depression of this button, the dialog 2100 shown in FIG. 20 is displayed in step S3007, and the user can change the registered information.

If it is determined in step S3006 that the user input is not edit of user information, it is checked in step S3008 if the user input is image selection. When the user has selected an arbitrary image by, e.g., clicking a mouse button on that image within the field 2923 on the dialog 2900, it is determined that image selection has been made, and the flow advances to step S3009 to execute an image property edit process.

If it is determined in step S3008 that the user input is not image selection, it is checked in step S3010 if the user input is album selection. When the user has pressed one of buttons within the field 2910 on the dialog 2900, it is determined that album selection has been made, and an album display process is executed in step S3011. The album display process will be described later.

If it is determined in step S3010 that the user input is not album selection, it is checked in step S3012 if the user input is logout. When the user has pressed the button 2902 on the dialog 2900, it is determined that the user input is logout, and the flow advances to step S3013.

If it is determined in step S3012 that the user input is not logout, the flow returns to step S3001 to wait for the next user input.

In step S3013, a logout process is executed. Upon executing the logout process, the photo site server 105 updates the last display album ID 502 in the user state data table 500 in the database 118 by registering the currently displayed album ID. And then, the display gogoes back to the dialog 1900.

Details of steps S3003 (album edit) and S3011 (album display) will be explained, but a detailed description of steps S3005 (image edit) and S3009 (image property edit) will be omitted. Also, a detailed description of step S3007 (user information edit) will be omitted since it has already been described in (user registration). Unlike in user registration, the contents of information registered by the user are displayed as initial values upon displaying the dialog, the dialog 2900 is displayed upon depression of the registration button 2116 or cancel button 2117, and the user information contents are registered in the database not newly but to update the existing user information.

(Edit Example of Album at Photo Site)

Figure 30:
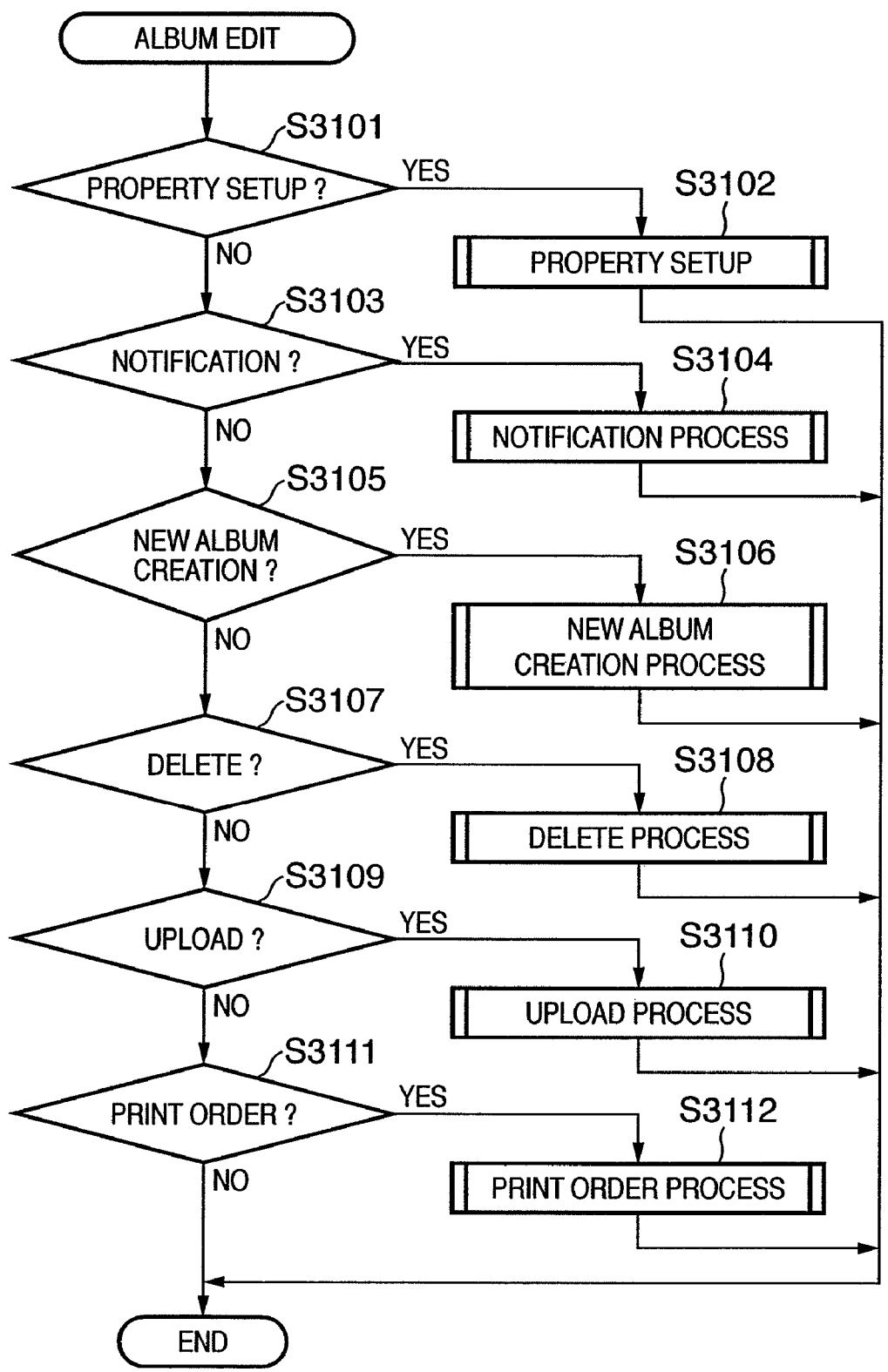
FIG. 30 is a flow chart showing the sequence of an album edit process at the photo site server in the embodiment of the present invention.

FIG. 30 is a flow chart showing the sequence of the album edit process at the photo site server.

Figure 31:
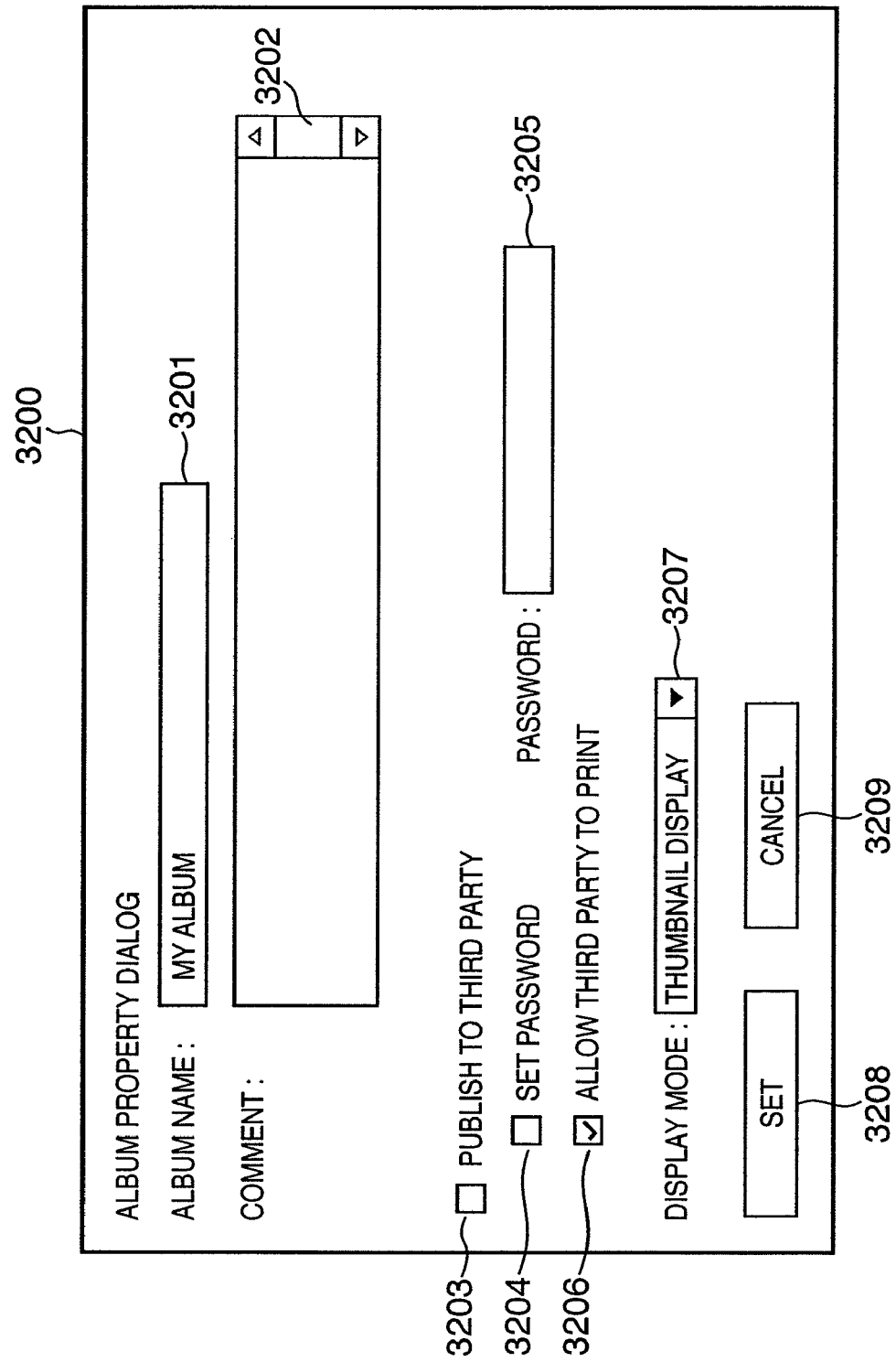
FIG. 31 shows an album property setup dialog at the photo site in the embodiment of the present invention.

It is determined in step S3101 whether or not a property setup has been selected. When the user has pressed the button 2904 on the dialog 2900, it is determined that the property setup has been selected, and the flow advances to step S3102. Upon depression of the button 2904, a dialog 3200 shown in FIG. 31 is displayed, and various properties associated with the album which is currently being displayed and edited can be made. A detailed description of this process will be omitted.

Figure 32:
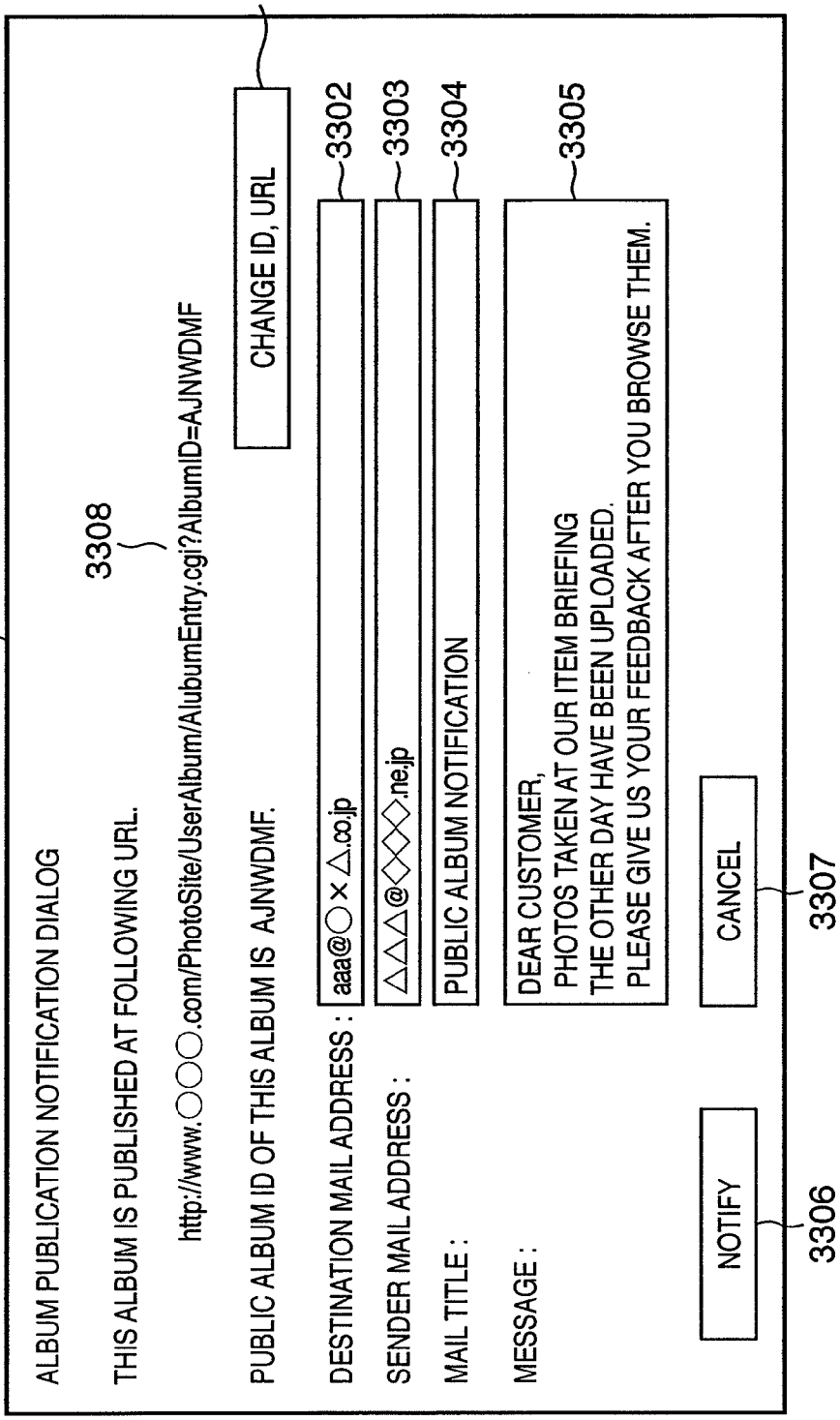
FIG. 32 shows an album e-mail notification setup dialog at the photo site in the embodiment of the present invention.

If it is determined in step S3101 that the property setup has not been selected, it is checked in step S3103 if album notification has been selected. When the user has pressed the button 2905 on the dialog 2900, it is determined that the album notification has been selected, and the flow advances to step S3104. Upon depression of the button 2905, a dialog 3300 shown in FIG. 32 is displayed, and a setup required to notify a browsing method of the album which is currently being displayed and edited via e-mail can be made. Details of this process will be described later.

If it is determined in step S3103 that album notification has not been selected, it is checked in step S3105 if new album creation has been selected. When the user has pressed the button 2906 on the dialog 2900, it is determined that new album creation has been selected, and the flow advances to step S3106. Upon depression of the button 2096, the dialog 3200 shown in FIG. 31 is displayed to allow the user to set the properties of a new album to be created. A new album is created after the properties are set, but a detailed description of this process will be omitted.

Figure 33:
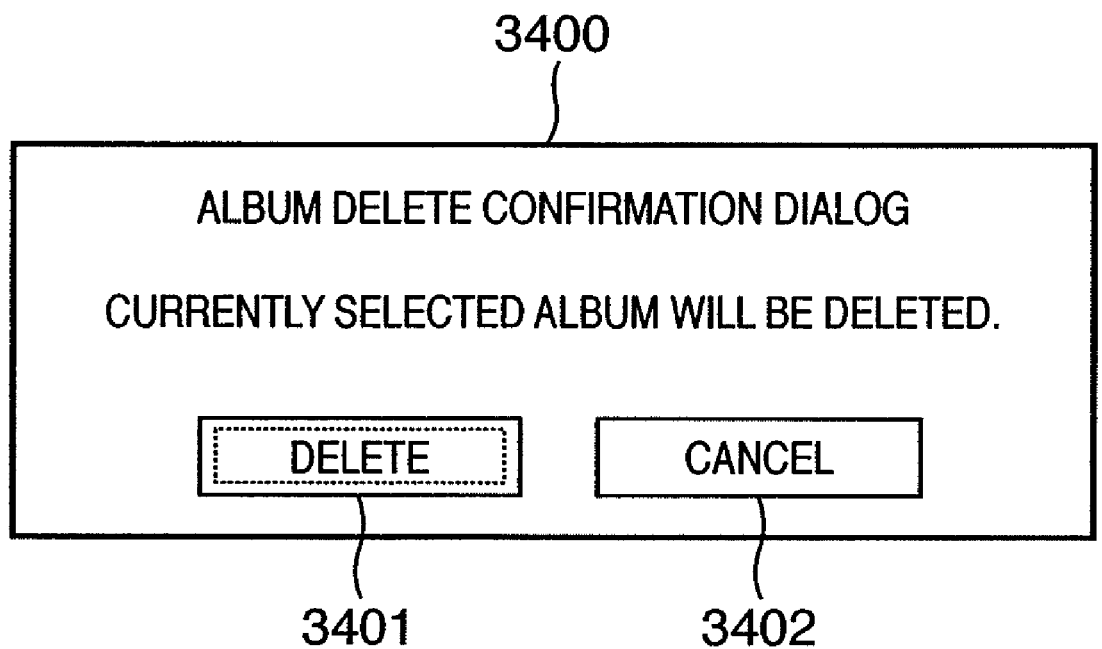
FIG. 33 shows an album delete confirmation dialog at the photo site in the embodiment of the present invention.

If it is determined in step S3105 that new album creation has not been selected, it is determined in step S3107 whether or not album deletion has been selected. When the user has pressed the button 2907 on the dialog 2900, it is determined that album deletion has been selected, and the flow advances to step S3108. Upon depression of the button 2907, a dialog 3400 shown in FIG. 33 is displayed, and the user can delete the album which is currently being displayed and edited. A detailed description of this process will be omitted.

If it is determined in step S3107 that album deletion has not been selected, it is checked in step S3109 if image upload to the album which is currently being displayed and edited has been selected. When the user has pressed the button 2908 on the dialog 2900, it is determined that image upload has been selected, and the flow advances to step S3110. Details of this process will be described later.

If it is determined in step S3109 that image upload has not been selected, it is checked in step S3111 if album print order has been selected. When the user has pressed the button 2909 on the dialog 2900, it is determined that album print order has been selected, and the flow advances to step S3112. Details of this process will be described later.

(Selection/display Example of Album at Photo Site)

Figure 34:
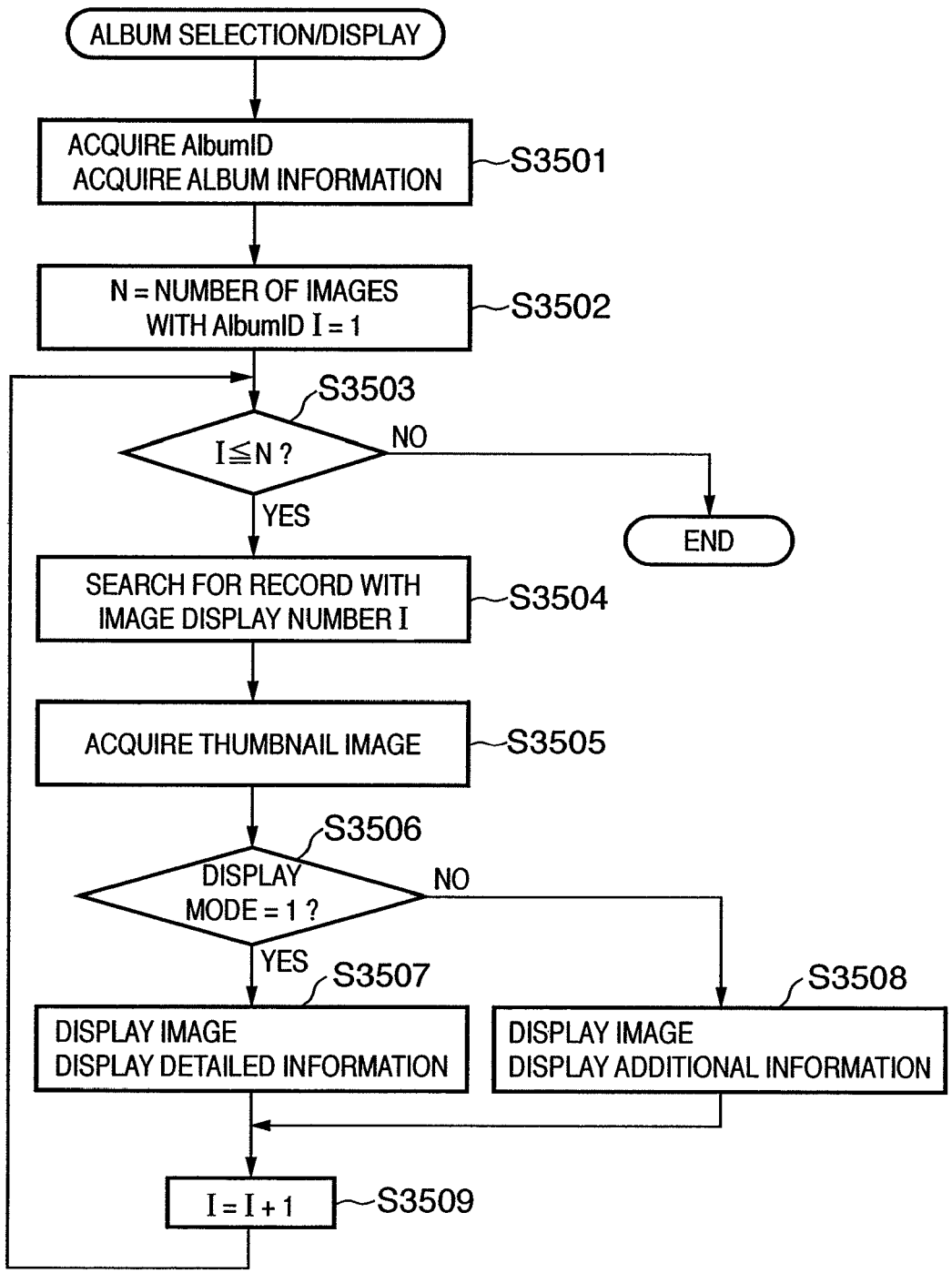
FIG. 34 is a flow chart showing an album selection/display process upon depression of one of album select buttons at the photo site in the embodiment of the present invention.

FIG. 34 is a flow chart showing the process association with selection and display of an album upon depression of one of the album select buttons 2911 to 2915 displayed within the album select field 2910 on the dialog 2900.

The number of the pressed button from the head one is examined in step S3501, and the customer album data table in the database 118 is searched for the Album ID of an album which has that number as the album display order number. Also, the album information data table in the database 118 is searched for album information having that Album ID.

In step S3502, the album image data table 800 in the database 118 is searched for all records each having the obtained Album ID as the album ID 801. The number of records found by search is set in N, and "1" is substituted in image count work variable I.

It is checked in step S3503 if I≦N. While I≦N, processes in steps S3504 to S3509 are repeated to display images in the album.

In step S3504, the records retrieved in step S3502 are searched for a record which has I as the image display number 803, and the image ID of that image is obtained. After the image ID is obtained, the image information data table 900 in the database 118 is searched for a record which has that image ID as the image ID 901.

In step S3505, a path to a thumbnail file of the image is acquired from the record retrieved in step S3504.

It is checked in step S3506 based on the album information data table 700 acquired in step S3501 if the value of the display mode number 709 is "1". In this embodiment, if this value is "0", it indicates thumbnail display; if it is "1", it indicates detailed display.

Figure 35:
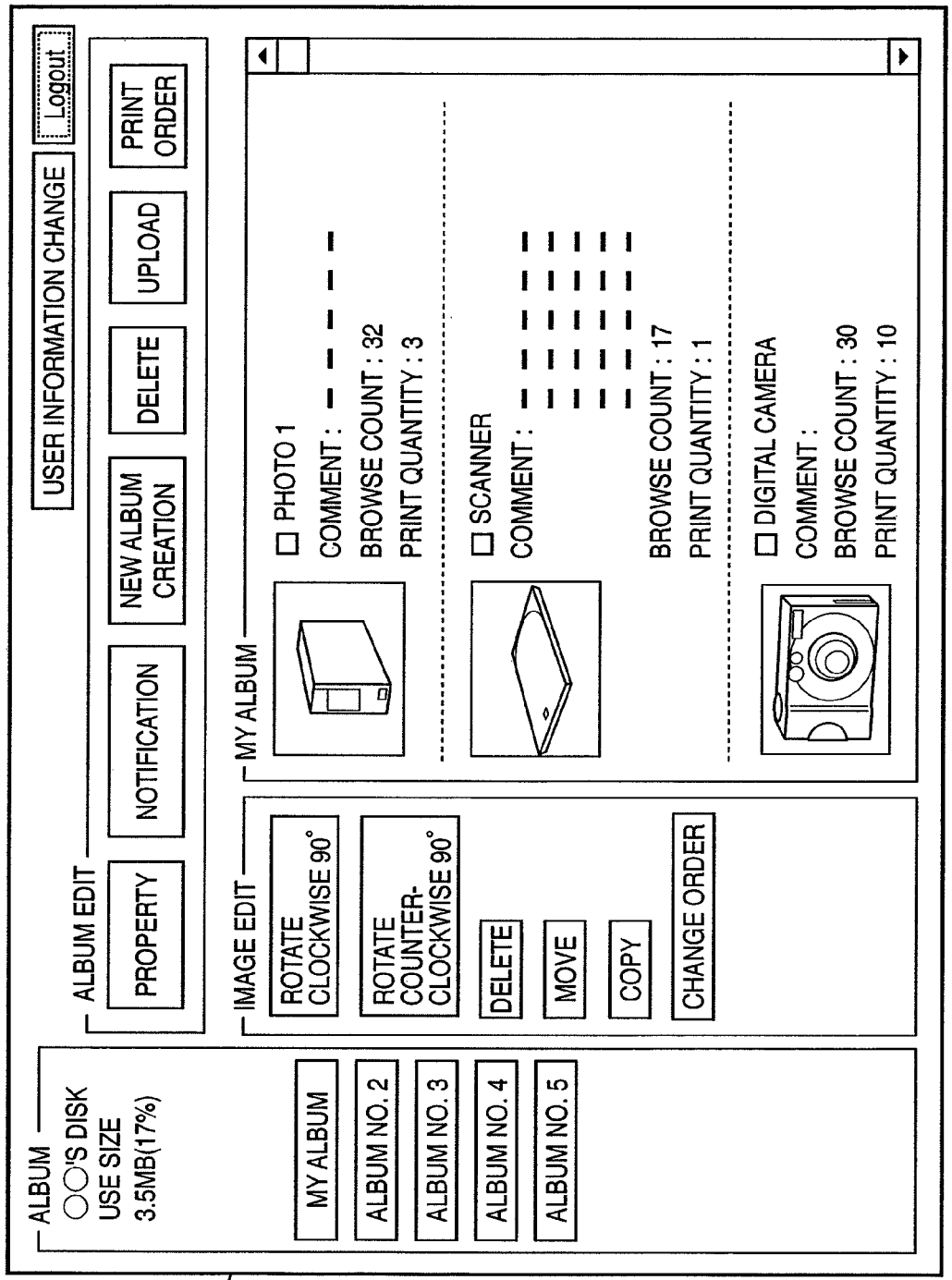
FIG. 35 shows an example of an album details display dialog at the photo site in the embodiment of the present invention.

If it is determined in step S3506 that the display mode is "1", a thumbnail image and detailed information of the image are displayed in step S3507. In this embodiment, an image name, comment, browse count, and print count extracted from the image information data table 900 are displayed as the detailed information, and an image edit check box is displayed together. A dialog 3600 shown in FIG. 35 shows an example of album display in the detailed display mode. Since this dialog is substantially the same as the dialog 2900 except for the display method of the image display field 2923, a detailed description thereof will be omitted.

If it is determined in step S3506 that the display mode is not "1", a thumbnail image, image name, and image edit check box are displayed in step S3508. The dialog 2900 shown in FIG. 28 is also an example in such display mode.

If I>N in step S3503, since all images in the album are displayed, the process ends.

In this embodiment, only two display modes are explained. However, three or more display modes may be prepared.

(Image Upload Process Example)

Figure 36:
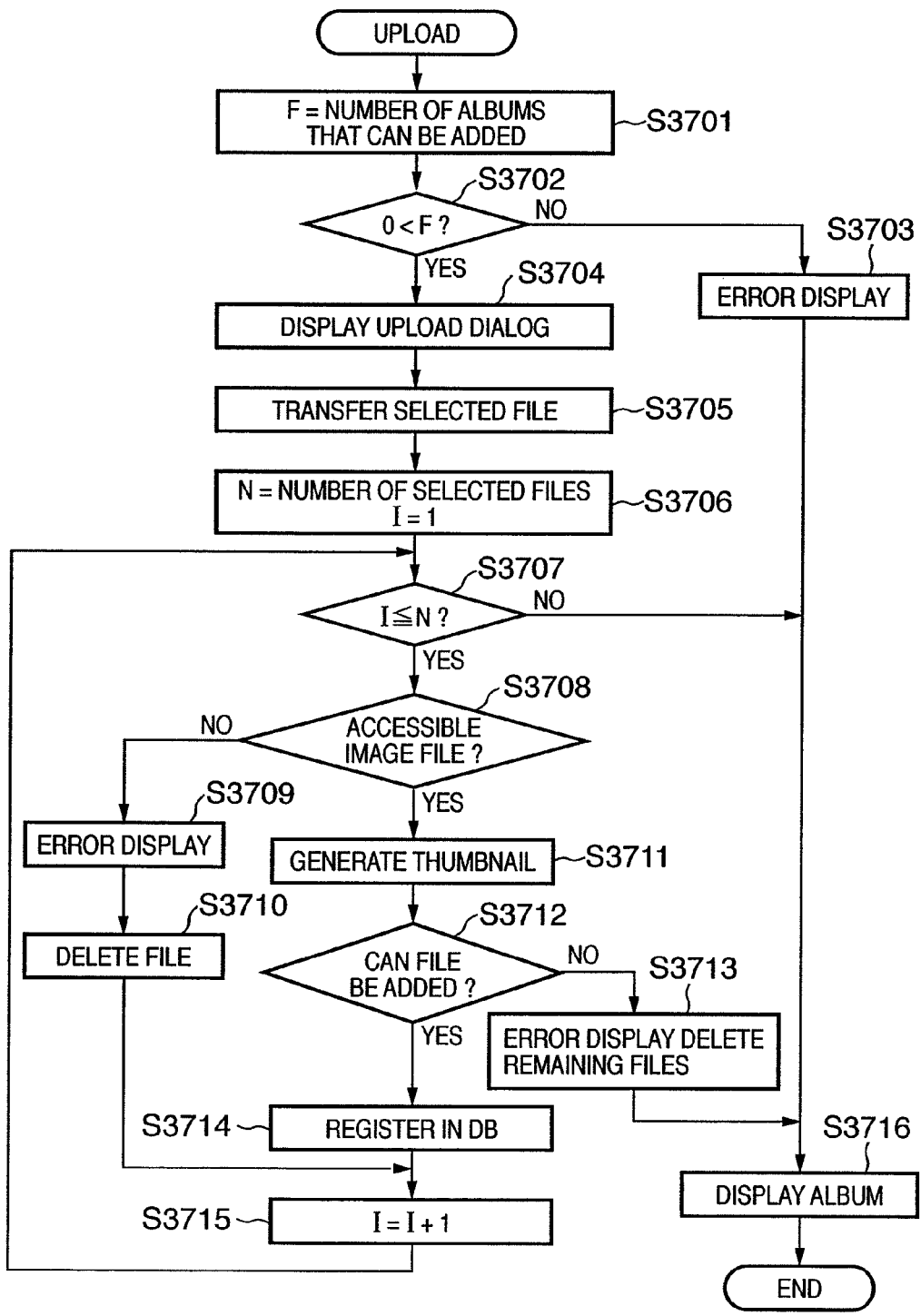
FIG. 36 is a flow chart showing the sequence executed upon uploading an image to an album which is now being displayed and edited at the photo site in the embodiment of the present invention.

FIG. 36 is a flow chart showing the sequence upon uploading an image to an album which is currently being displayed and edited.

Figure 38:
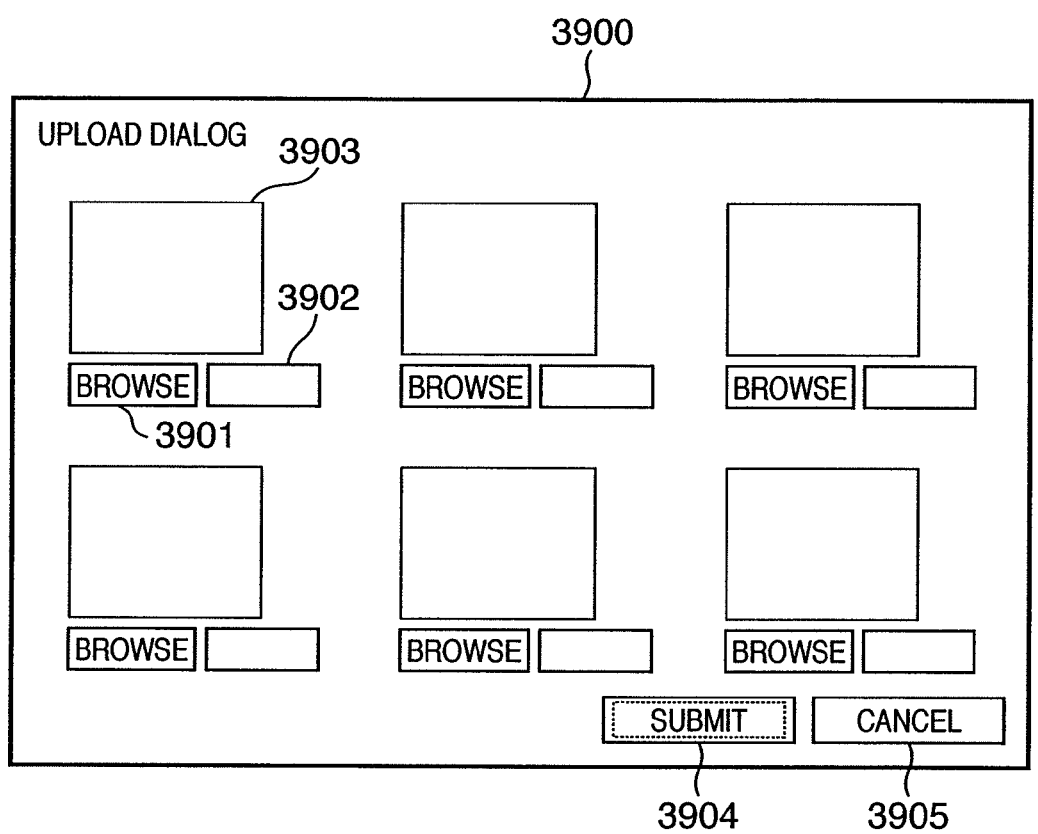
FIG. 38 shows a select dialog of upload images in the embodiment of the present invention.

When the user has pressed the upload button 2908 on the dialog 2900, a dialog 3900 shown in FIG. 38 is displayed, and an image can be transferred from the client PC 102A of the user to the album, which is currently being displayed and edited. Upon depression of the button 2908 on the dialog 2900, the photo site server 105 calculates the number (F) of files that can be added in step S3701. This process will be described later.

Figure 37:
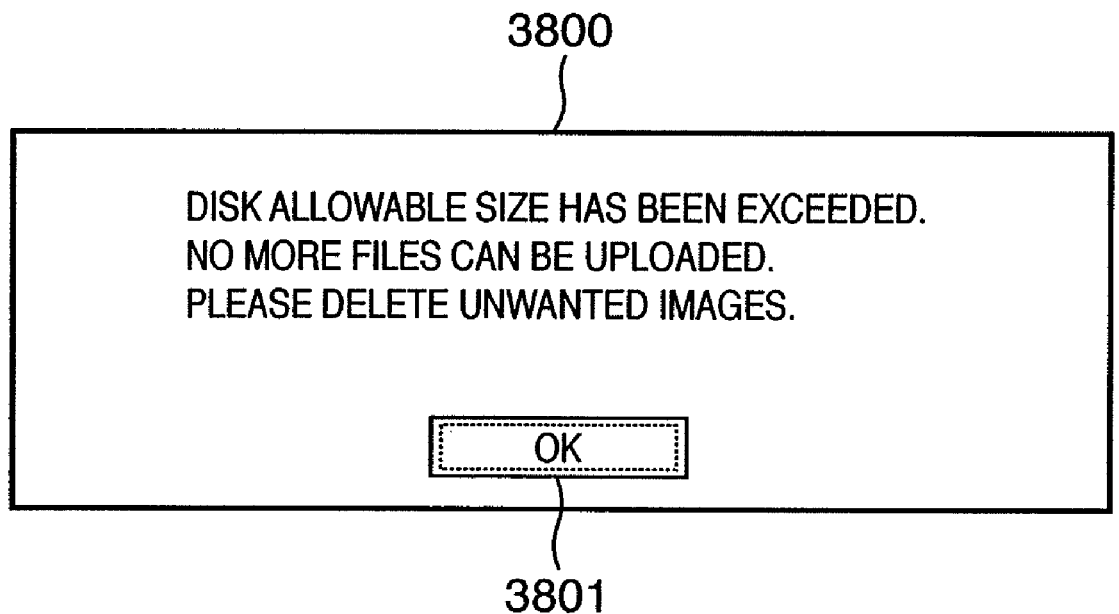
FIG. 37 shows an alert dialog indicating that no more images can be uploaded at the photo site in the embodiment of the present invention.

It is checked in step S3702 if upload is enabled. This checking process is done by seeing if F is a positive number. If F<1, it is determined that upload is disabled, and a dialog 3800 shown in FIG. 37 is displayed (S3703). Upon depression of an OK button 3801 on the dialog 3800, the dialog 2900 is displayed.

If F≧1, the upload dialog 3900 shown in FIG. 38 is displayed in step S3704. On this dialog, browse buttons 3901 used to select a file on the client PC, input fields 3902 used to input a file path, and preview display fields 3903 used to display a thumbnail of the selected image are displayed in correspondence with the value (=F) calculated in step S3701. Upon depression of a submit button 3904, file transfer of an image file selected in step S3705 from the client PC to the server starts. Upon depression of a cancel button 3905, the upload process is canceled, and the dialog 2900 is displayed (not shown in FIG. 36).

The image file transferred to the server is saved on a hard disk (database 117) on the server. Let N be the number of transferred files. Also, "1" is set in work variable I (S3706).

It is checked in step S3707 if I≦N. If I>N, the dialog 2900 is displayed in step S3716, and the process ends.

Figure 39:
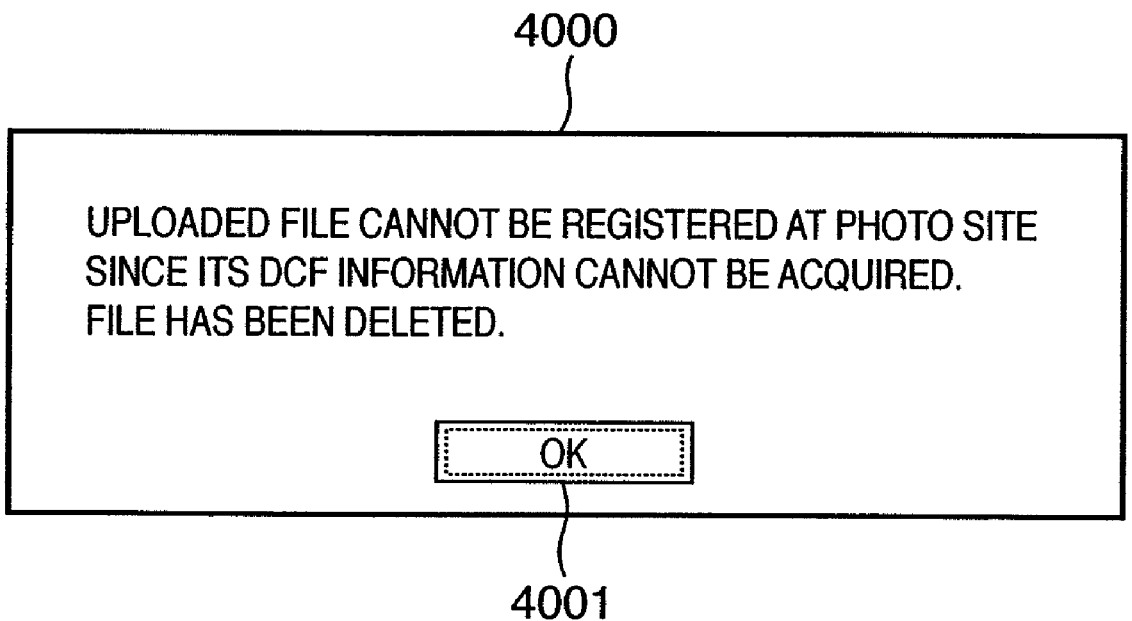
FIG. 39 shows an alert dialog when a non-image file is uploaded in the embodiment of the present invention.

If I≦N in step S3707, it is checked in step S3708 if the transferred I-th file is an image file that the photo site server 105 can handle. In this embodiment, only when an uploaded image is a JPEG file and digital camera image sensing information in a DCF format can be extracted from its header field, it is determined that the photo site server 105 can use that file; otherwise, a dialog 4000 shown in FIG. 39 is displayed in step S3709 to delete the file of interest placed on a work area in step S3710. Note that DCF information is used to make color correction and the like for a print process using the shutter speed, use/non-use of an electronic flash, and the like. Upon depression of an OK button 4001, the flow advances to step S3715 to start a process for uploading the next process.

If it is determined in step S3708 that the uploaded file is an image file, a thumbnail image and a preview image of this image file are generated in step S3711, and are saved on the hard disk.

It is determined in step S3712 whether or not a file can be added. That is, whether or not the disk use upper limit exceeds in the event that the currently processed file is added is determined in this process. Since the calculation method is the same as that which will be described using FIG. 40, a description thereof will be omitted. If it is determined in step S3712 that a file cannot be added, the dialog 3800 shown in FIG. 37 is displayed, and all image files which have not been registered in the DB are deleted. The dialog 2900 is then displayed in step S3716.

If it is determined in step S3712 that a file can be added, image information is registered in an information DB in step S3714. That is, the image information table 900 in which a maximum image ID registered so far +1 is set as the image ID 901 of this image, file paths to the generated new thumbnail image and preview image are respectively set in the thumbnail file path 905 and preview image file path 906, "0" is set in the browse count 908, and "0" is set in the print count 909, is generated and registered in correspondence with the uploaded image file. Also, the album image table in which the album ID of the currently displayed album is set in the album ID 801, the image ID is set in the image ID 802, and the number of images in the album +1 is set in the image display number 803 is registered.

In step S3715, I is incremented by "1", and the flow returns to step S3707.

While I<N, the uploaded image files are registered on the database by repeating the processes in steps S3707 to S3715.

(Calculate Number of Files)

Figure 40:
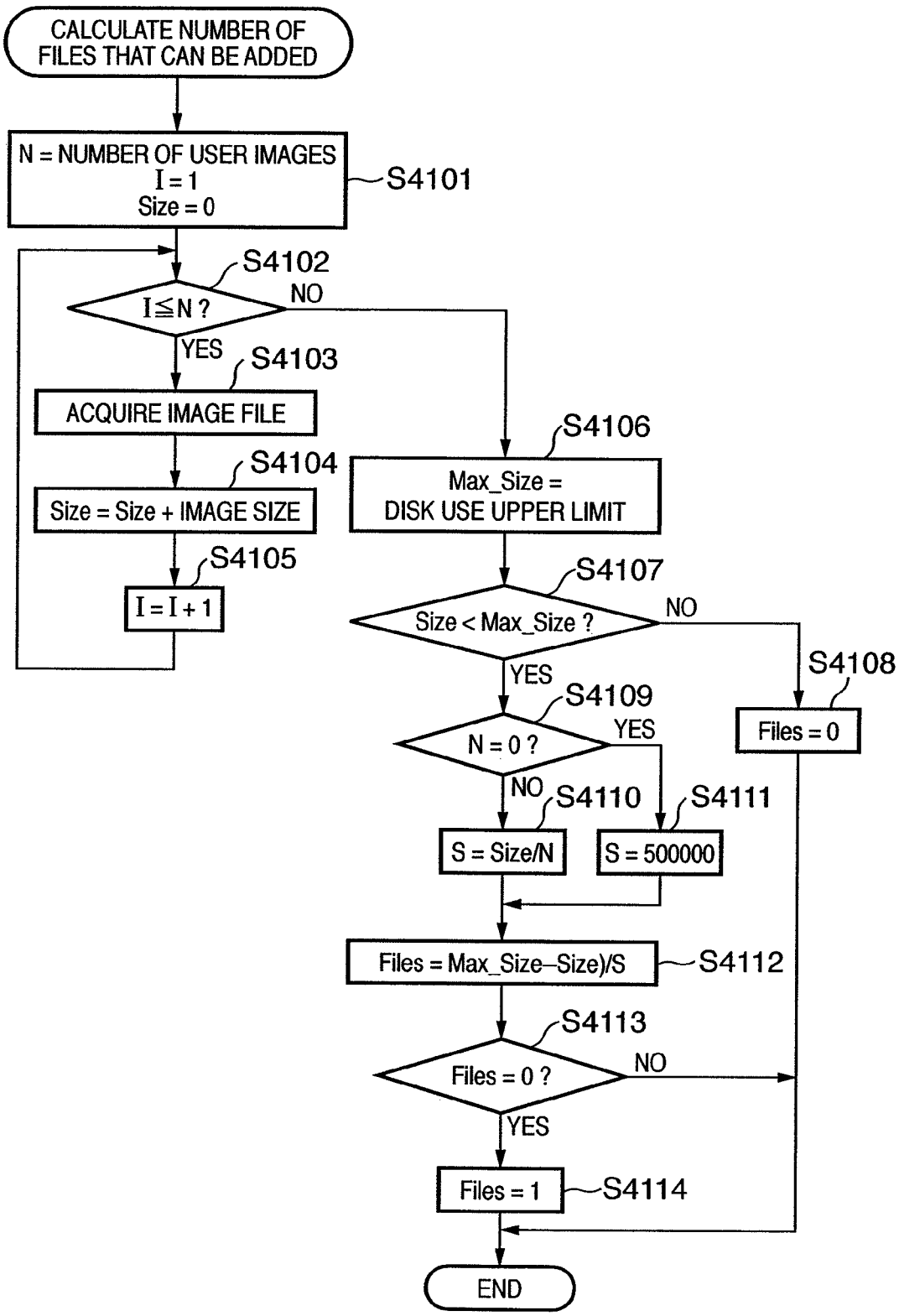
FIG. 40 is a flow chart showing a processing method for calculating the number of files that can be added in the embodiment of the present invention.

FIG. 40 is a flow chart showing a processing method for calculating the number of files that can be added.

In step S4101, the image information data table 900 in the database is searched to extract records each of which has the user ID of the user who is now making operations. Let N be the number of extracted records. "1" is substituted in work variable I associated with an image record, and "0" is substituted in work variable Size used to calculate the used image size of the user.

It is checked in step S4102 if I≦N. While I≦N, an image file is acquired based on the original image file path of the I-th record retrieved in step S4101 (S4103).

In step S4104, the size of the acquired file is added to Size. In step S4105, I is incremented by "1".

By repeating processes from steps S4103 to S4105 while I≦N, the disk use size (Size) of the user who is now accessing can be calculated.

In step S4106, the user state data table 500 in the database is searched using the user ID of the user who is now accessing for that user's record, and the disk use upper limit size 503 is set to Max_Size.

It is checked in step S4107 if Size<Max_Size. If Size≧Max_Size, since no usable disk area is available for this user, Files=0 is set in step S4108.

If Size<Max_Size in step S4107, it is checked in step S4109 if N="0". If N≠"0", an average file size S per file of the user is calculated in step S4110 by:

$$S=Size/N$$

If N="0", an average file size of an image sensed using the average number of pixels of a digital camera which is currently prevalent in the market is substituted in S in step S4111. In this embodiment, 500K (500,000) bytes are used as the average image size sensed by a digital camera having 2,000,000 pixels.

In step S4112, the user's disk remaining size is divided by the average file size to calculate the number (Files) of albums that can be added.

$$Files=(Max\_Size-Size)/S$$

It is checked in step S4113 if Files=0. If Files=0, Files=1 is set instead in step S4114.

In steps S4109 and S4110, as the file size that the user may use, the average of the sizes of image files that the user has already uploaded is used, and if no user image is available, the average file size of an image sensed using the average number of pixels of a digital camera which is currently prevalent in the market is used. Alternatively, the average file size of an image sensed using the average number of pixels of a digital camera which is currently prevalent in the market may always be used. In this case, step S4109 may be omitted.

(Print Order Process Example)

FIG. 41 shows the flow of a print order process among the client PC 102A, photo site server 105, and print site 109A when the user places a print order using the photo site 105.

The user can place a print order of a printed matter of an image in an album upon depression of the print order button 2909 on the dialog 2900.

In step S4201, the user issues an album browse request.

In step S4202, the photo site 105 displays album images. That is, the photo site 105 displays, on the field 2923, images of an album corresponding to the selected album select button in the album select field 2910 on the dialog 2900. Since the album selection and display processes have already been explained, a description thereof will be omitted.

In step S4203, the user issues a print order instruction. The print order instruction is issued when the user presses the print order button 2909 on the dialog 2900.

Figure 42:
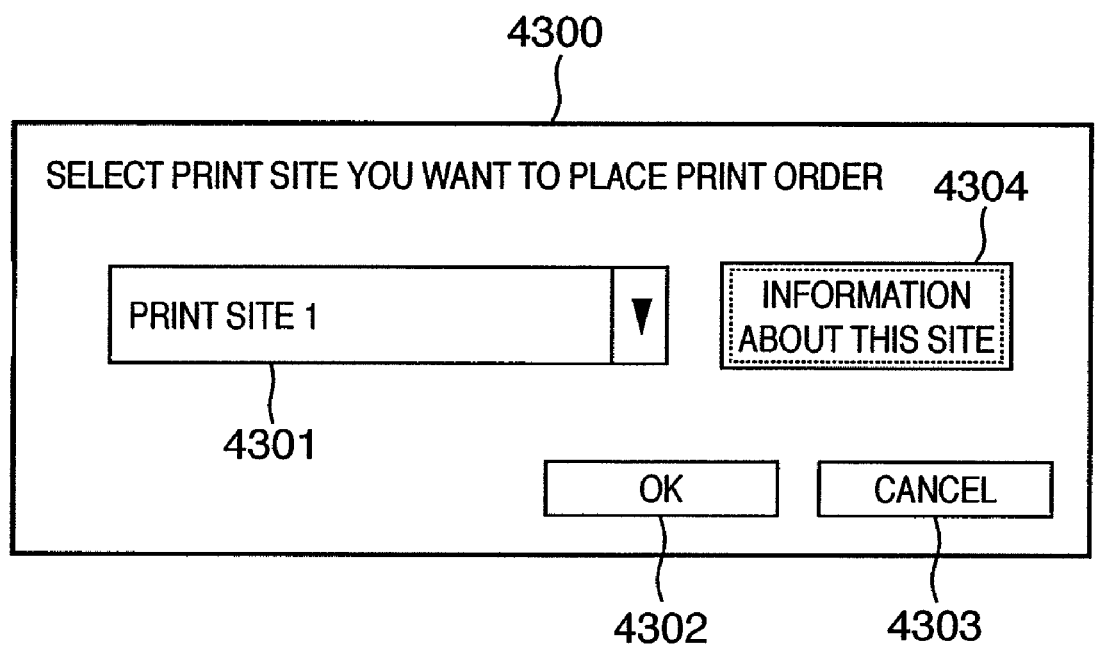
FIG. 42 shows a select dialog of a print site in the embodiment of the present invention.

If the print order instruction is issued, the photo site server 105 displays a select dialog 4300 of print sites 109 shown in FIG. 42 in step S4204.

In step S4205, the user selects a desired print site from a print site select field 4301, and presses an OK button 4302. In step S4206, the photo site server 105 places a temporary order to the print site 109A selected by the user in step S4205. FIG. 53 shows an example of data of the temporary order placed to the print site.

If the user presses a cancel button 4303 in step S4205, the print order process is canceled, and the photo site server 105 displays the currently selected album on the dialog 2900 again (not shown in FIG. 41). Also, upon depression of an information button 4304, information that pertains to the currently selected print site 109 is displayed, but a detailed description thereof will be omitted.

The process for placing the temporary order from the photo site server 105 to the print site 109A in step S4206 will be described later.

Upon receiving the temporarily order placed by the photo site 105 in step S4206, the print site 109A executes an order start process in step S4222. In the order start process, the URL 1505 to the print status notification CGI of the photo site server 105, which is registered in advance in the photo site data table 1500 of the print site 109A, is called together with required arguments (print order ID, status (1)). In this way, the print site 109A notifies the photo site server 105 of the start of an order process.

The photo site server 105 confirms in step S4223 that the print site 109A has normally started an order process. The photo site server 105 sends an order start confirmation end message to the print site 109A as a return value of the called print status notification CGI. The photo site server 105 updates the value of the status 1014 of a record corresponding to the temporary order in the order information data table 1000, which is generated by a temporary order placement process (to be described later) to "1" (start).

Figure 43:
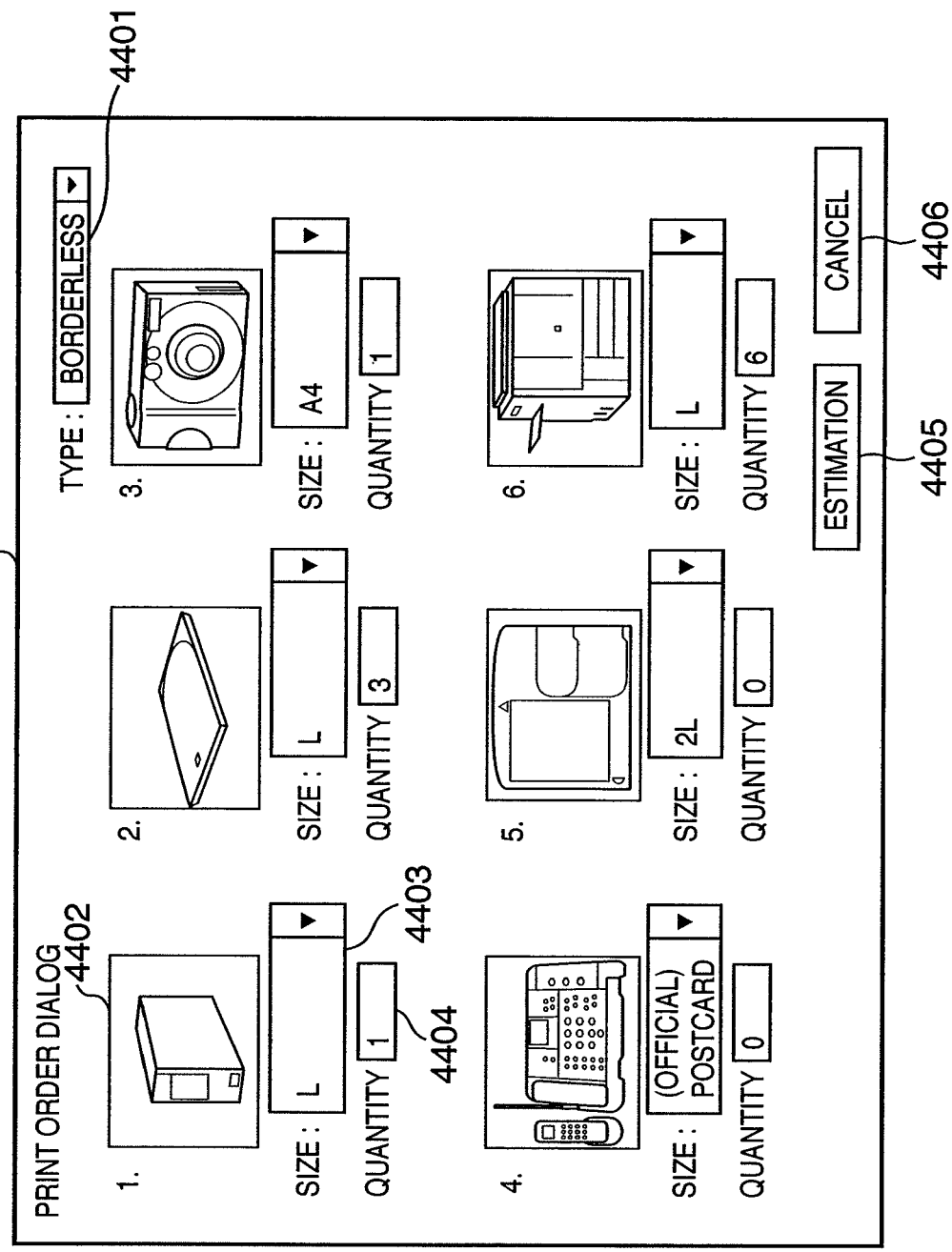
FIG. 43 shows an image print order dialog in the embodiment of the present invention.

Upon receiving the order start confirmation end message as the return value of the print status notification CGI, the print site 109A acquires a thumbnail image from the photo site server 105 in step S4224. Note that the thumbnail image is acquired by accessing a thumbnail image acquisition URL designated in the format of the temporary order shown in FIG. 53. After the thumbnail image is acquired, the print site 109A displays an image select dialog 4400 shown in FIG. 43 in step S4207.

In this embodiment, the print site 109A accesses the thumbnail image acquisition URL to acquire a thumbnail image. Alternatively, the user PC 102A may access the thumbnail image acquisition URL to directly display a thumbnail image.

The dialog 4400 is a print order image select dialog of the print site 109A. The print order image select dialog 4400 has a select field 4401 used to select the print type (with border, borderless) upon photo print, a field 4402 used to display a thumbnail image in an album acquired from the photo site, a select field 4403 used to select a print size, an input field 4404 used to designate a print quantity, an estimation request button 4405, and a cancel button 4406. Note that the thumbnail image display field 4402, size select fields 4403, and print quantity input field 4404 are displayed in correspondence with the number of image data contained in the temporary order.

After the user selects image data, a print order of which is to be placed, and inputs their sizes and quantities on the order dialog 4400, if he or she presses the estimation button 4405 in step S4208, the print site 109A executes an estimation calculation process in step S4209. Details of the estimation calculation process will be described later. The print site 109A notifies the photo site server 105 of the estimation calculation process result (estimation data) in step S4209. This estimation process and notification process will be described in detail later.

If the user does not issue any estimation request, i.e., presses the cancel button 4405 on the dialog 4400 in step S4208, the print site 109A cancels the temporary order in step S4220. The print site 109A notifies the photo site server 105 of that the print order process has been canceled. In step S4221, the photo site server 105 cancels the print order process, and displays the dialog 2900.

Upon reception of the estimation data from the print site 109A, the photo site server 105 adds/subtracts added-value information to/from the estimated price in step S4210, and displays the result to the user. FIG. 44 shows an estimation dialog displayed at this time. Also, upon reception of the estimation data from the print site 109A, the photo site server 105 updates the status 1014 of the record, corresponding to the temporary order, of the order information data table 1000 to "2" (estimation).

After the estimation dialog is displayed, the user makes a purchase review process in step S4211. Upon purchase review, an input process of information associated with an orderer such as credit information and the like, as shown in FIG. 45, and an input process of information associated with the shipping address, as shown in FIG. 46 are executed between the photo site server 105 and user PC 102A. If a cancel button 4503, 4602, or 4702 is pressed during purchase review, the flow advances to step S4218 to execute an order cancel approval process.

Since a shipping charge is flat in this embodiment, the aforementioned flow is used. However, if the shipping charge varies depending on the shipping addresses, a shipping area input process is done at the print site 109A upon executing the estimation calculation process in step S4209.

If the user approves the contents of the estimation dialog and places a firm print order in step S4211, the photo site server 105 executes a settlement process of the print order (S4212). The photo site server 105 updates the status 1014 of the record in the order information data table 1000 corresponding to the temporary order to "3" (settlement). Also, the photo site server 105 sets the lock flag 1111 corresponding to each image data used in a print process in the order image data table 1100 to "0" (unlock state). The photo site 105 generates a firm print order (firm order), and issues the firm order to the print site 109A in step S4213.

Details of the processes of the photo site server 105 in steps S4210 to S4213 will be described later.

Upon receiving the firm order, the print site 109A executes an order reception process in step S4214. In step S4215, the print site 109A acquires image data from the photo site 105. Each image data is acquired by calling the URL of each image data acquisition CGI designated in the temporary order.

Upon completion of acquisition of image data, the print site 109A calls the URL 1505 to the print status notification CGI of the photo site server 105, which is registered in advance in the print site 109A, together with required arguments (print order ID, status (5)). In this way, the print site 109A notifies the photo site server 105 of the end of the image data acquisition process.

Upon receiving the image data acquisition process end notification from the print site 109A, the photo site server 105 updates the status 1014 in the record, corresponding to the print order, of the order information data table to "5" (end of image acquisition).

The print site 109A executes a print process of the acquired image data in step S4216. Furthermore, the print site 109A issues a shipping instruction in step S4217, thus ending the process.

Upon execution of processes in steps S4214 to S4217, the print site 109A notifies of the status of a process which is underway (not shown in FIG. 41). The status data sent from the print site 109A is saved in the database on the photo site 105.

If the photo site server 105 approves a user's print order cancel in step S4218, it requests the print site 109A to delete the temporary order. The print site 109A deletes the temporary order according to the request from the photo site 105 in step S4219.

(Temporary Order Placement Process Example at Photo Site)

Figure 47:
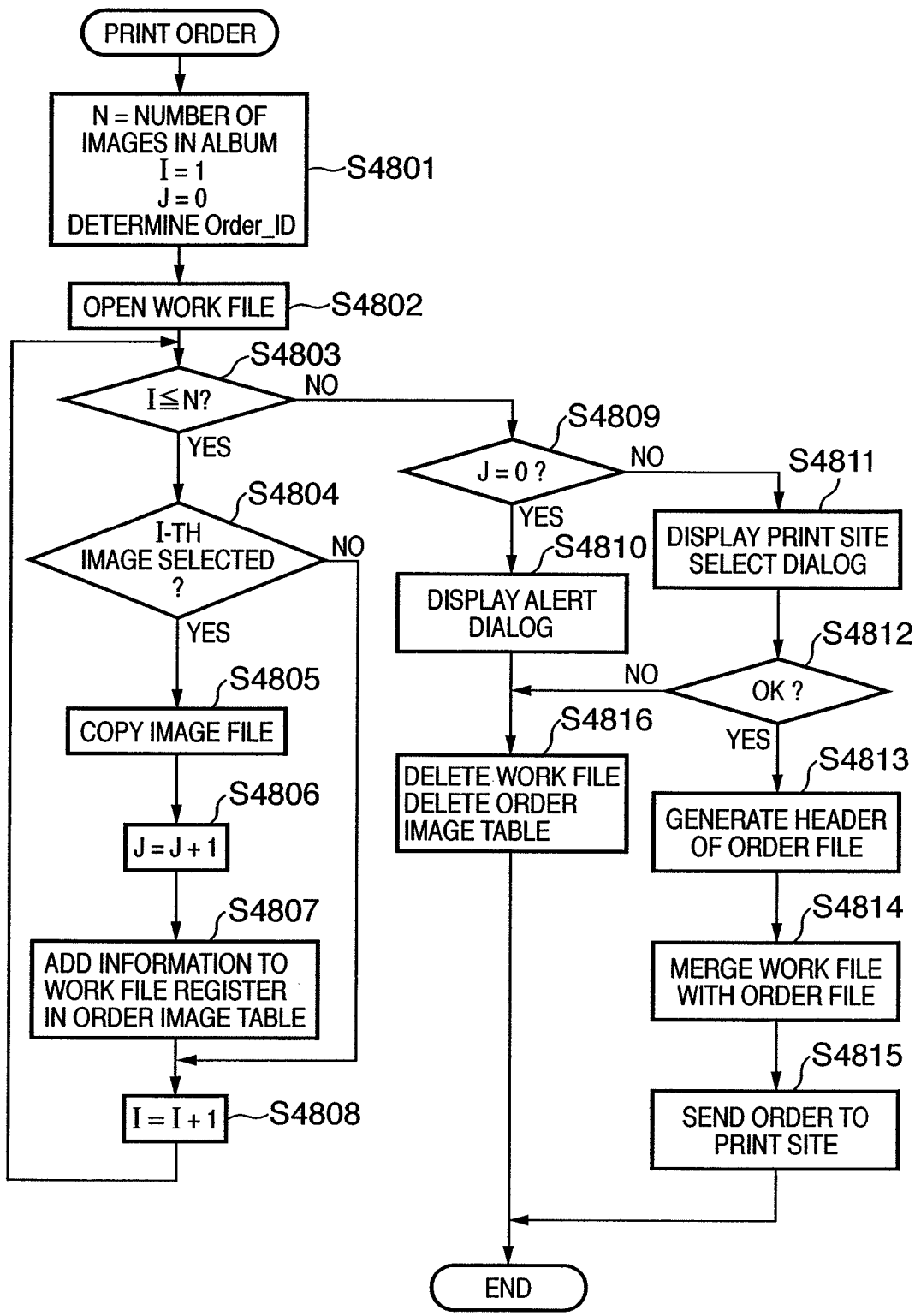
FIG. 47 is a flow chart showing the contents of a temporary order placement process at the photo site in the embodiment of the present invention.

FIG. 47 is a flow chart showing the contents of the temporary order placement process at the photo site, which is executed in steps S4203 to S4206. FIG. 53 shows an example of the format of a temporary order placed by this process.

If the user has pressed the print order button 2909 on the dialog 2900, the photo site server 105 searches the image album data table 800 to acquire the number N of images of the currently displayed album in step S4801. Also, "1" is substituted in preview image work counter I, and "0" is substituted in selected image work counter J. Furthermore, the maximum order number issued so far is acquired from the orderer data table 1300 in the database 118, and a value obtained by adding "1" to that maximum order number is set to order number Order_ID of the current temporary order.

In step S4802, a work file used to generate a temporary order is opened.

It is checked in step S4803 if I≦N. By repeating processes in steps S4804 to S4808 while I≦N, elements bounded between <estimateitem> and </estimateitem> tags of temporary order XML data are generated.

It is checked in step S4804 if the I-th image is selected. If the user has checked a check box associated with the I-th image of check boxes 2930 to 2935 in the dialog 2900, it is determined that the image has been selected, and the flow advances to step S4805.

In step S4805, the album image data table 800 in the database 118 is searched for a record with the image display number=I, so as to acquire the image ID of that image. Furthermore, the image information data table is searched for a record of image information with that image ID. The file path 904 to an original image, the file path 905 to a thumbnail image, and the file path 906 to a preview image are acquired from the retrieved record of the image information data table 900, and respective images are copied to a folder that the print site can access.

In step S4806, selected image counter J is incremented by "1".

In step S4807, the current selected image number J, the image name 903 acquired from the image information data table 900, URLs required to access the thumbnail image and preview image copied in step S4805 from the print site, and the URL of the CGI required to acquire the original image are described in the work file. Also, a new record is generated and registered in the order image data table 1100. At this time, Order_ID obtained in step S4801 is set in the order number 1101, J is set in the image number, the file paths to the three copied images are set in the fields 1104 to 1106, the lock flag 1111 is set to "1" (lock state), the acquired flag is set to "0" (not acquired), and the acquisition count is set to "0". Since the remaining information fields in the record are set upon receiving an estimation from the print site, "0" is substituted in all these fields.

In step S4808, I is incremented by "1". On the other hand, if it is determined in step S4804 that no image is selected, the flow jumps to step S4808. After that, the flow returns to step S4803.

If I>N in step S4803, it is determined that the print order selection check process for all images in the album is complete, and the flow advances to step S4809 to check if J=0, i.e., to see if at least one image has been selected.

If J=0 in step S4809, an alert dialog 4900 shown in FIG. 48 is displayed in step S4810. If the user has pressed an OK button 4901 on the dialog 4900, the work file is deleted, and all order image table records registered in step S4807 are deleted in step S4816. After that, the dialog 2900 is displayed.

If J≠0 in step S4809, the print site select dialog 4300 is displayed in step S4811. This process corresponds to step S4204 in the processing flow among sites shown in FIG. 41.

In step S4812, a user input is checked (the same as in S4205). If the user has pressed the OK button 4302 on the dialog 4300, a header field (before the <estimateitem> tag) of the order XML file is generated in step S4813. In the header field, the order number is substituted in PhotositeOrderid, and J is substituted in Count, but other values are fixed.

In step S4814, the work file is merged to the order XML file. Furthermore, by appending an order end tag, an XML file to be sent from the photo site server 105 to the print site 109A is completed.

In step S4815, the XML file generated up to step S4814 is sent to the print site 109A. A notification destination CGI is acquired from the URL 1403 to the temporary order notification CGI in the print site data table 1400.

If the user has pressed the cancel button 4303 on the print site select dialog 4300, since it is determined in step S4812 that he or she has not pressed an OK button, the work file is deleted in step S4816, and all order image table records registered in step S4807 are deleted in step S4816. After that, the dialog 2900 is displayed, and the process ends.

(Display Process Example of Print Image Select Dialog at Print Site)

Figure 49:
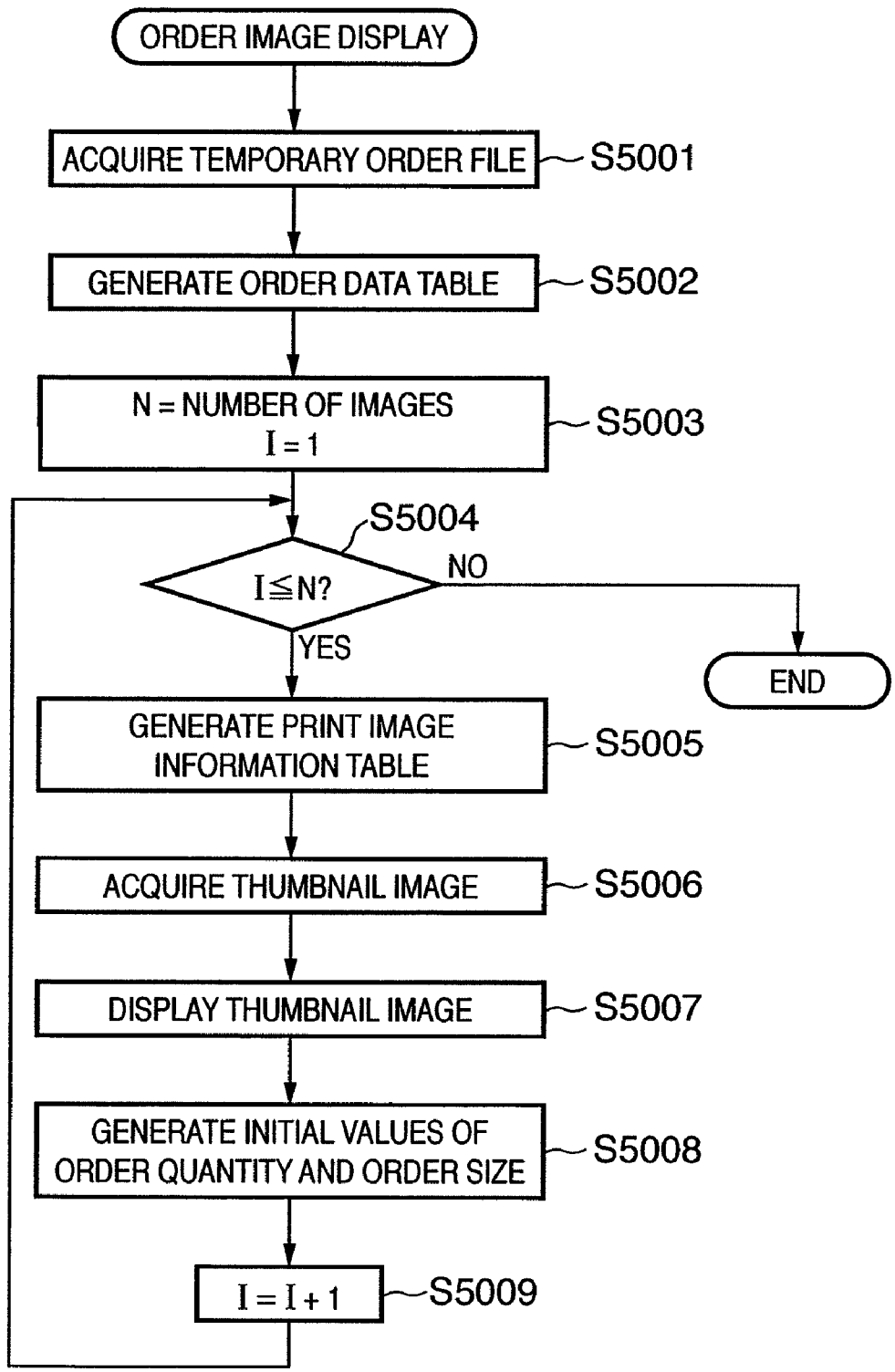
FIG. 49 is a flow chart showing the contents of a display process of a print image select dialog at the print site in the embodiment of the present invention.

FIG. 49 is a flow chart showing the contents of the display process of the print image select dialog at the print site in step S4207.

In step S5001, a temporary order file is acquired from the photo site server 105.

In step S5002, the order data table 1600 is generated and is registered in the database 119A. At this time, the receipt number 1601 is set with a value obtained by adding "1" to a maximum value issued so far in the order data table, and the photo site ID 1602 and photo site order number 1603 are acquired from the temporary order file acquired in step S5001. Also, the acquisition date of the temporary order file is set in the temporary order date 1604, and "0" (temporary order) is substituted in order status. Since the contents of the fields 1607 to 1613 of those in the order data table 1600 are registered upon issuing an estimation, "0" is set in all these fields.

In step S5003, the number of temporary order images is set in N, and "1" is substituted in work image counter I.

It is checked in step S5004 if I≦N. By repeating processes in steps S5005 to S5009 while I≦N, all images registered in the temporary order can be displayed on the order dialog.

In step S5005, the print image information table 1700 that pertains to the I-th image described in the temporary order file is generated. The same value as the receipt number 1601 in step S5001 is set in the receipt number 1701, and I is set in the image number 1702. Corresponding URLs are acquired from the temporary order file, and are set in the URLs 1703, 1704, and 1705. Since the contents of the fields 1705 to 1708 of those in the print image information data table 1700 are registered upon issuing an estimation, "0" is set in all these fields.

In step S5006, a thumbnail image is acquired from the photo site using the URL acquired in step S5005. In step S5007, the acquired thumbnail image is displayed as the I-th image.

In step S5008, the input fields of an order quantity and order size are generated, and "1" and "L size" are respectively set in these fields as initial values. Items to be selected in the order size input field are acquired from those of a service content data list 5800 shown in FIG. 57. The service content data list is used to set service contents and their prices at the photo site.

In step S5009, I is incremented by "1", and the flow returns to step S5004. If I>N in step S5004, the processing ends.

(Estimation Process Example at Print Site)

Figure 50:
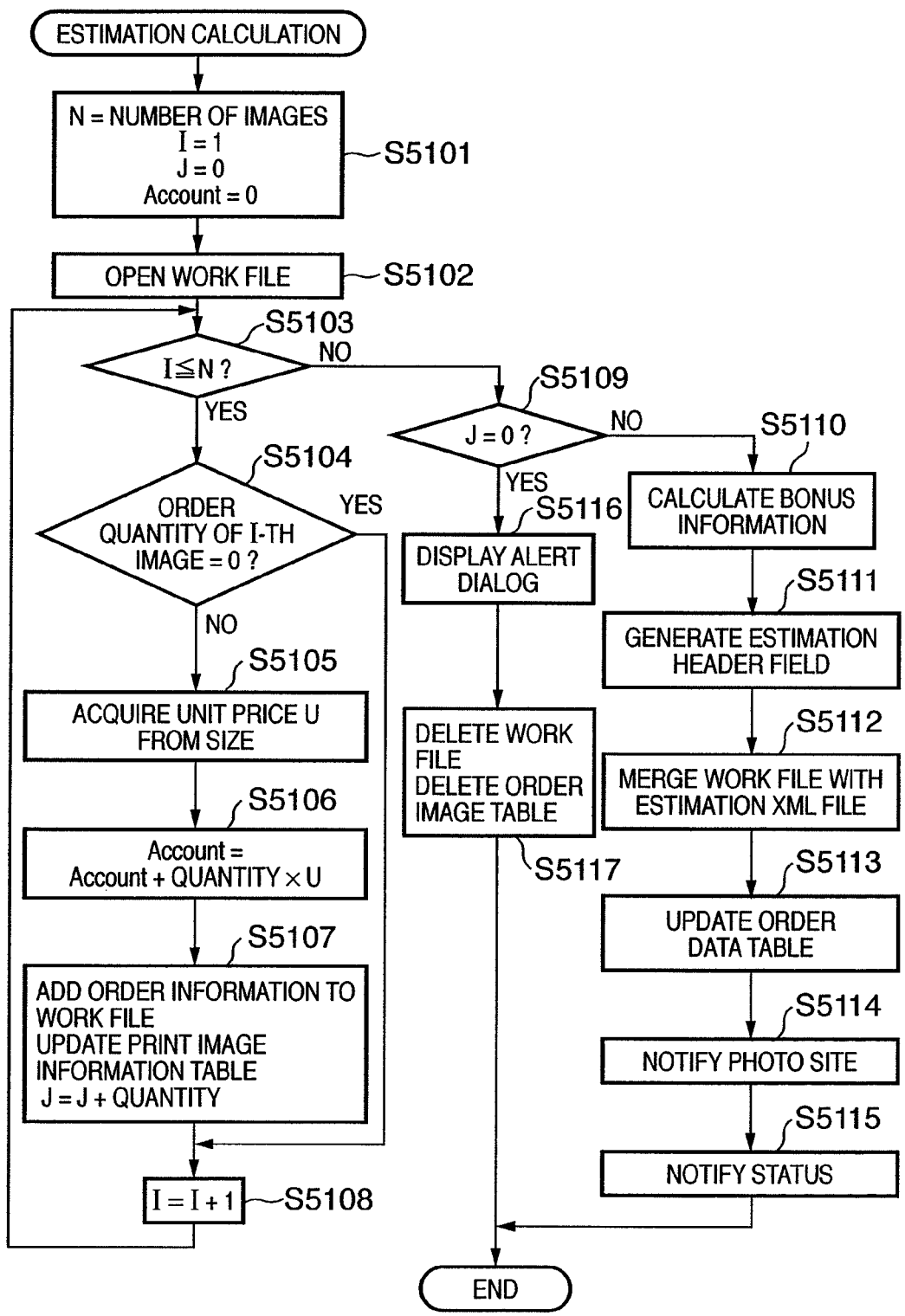
FIG. 50 is a flow chart showing the process for calculating an estimation and notifying the photo site of estimation information at the print site in the embodiment of the present invention.

FIG. 50 is a flow chart showing the estimation calculation process at the print site in step S4209 and the process for notifying the photo site of estimation information. FIG. 54 shows an example of estimation information, which is generated by the photo site 109A and is to be sent to the photo site 105.

In step S5101, the number of images displayed on the dialog 4400 is set in N, "1" is substituted in work image counter I, "0" is substituted in work order image count J, and "0" is substituted in work total amount Account.

In step S5102, a work file is created.

It is checked in step S5103 if I≦N. By repeating processes in steps S5104 to S5108 while I≦N, estimation information and the total amount for all images can be calculated.

In step S5104, the value of the quantity input field 4404 of the I-th image on the dialog 4400 is acquired, and it is checked if the acquired value is "0". If the value is not "0", information set in the size input field 4403 is acquired and unit price U corresponding to that size is acquired from a corresponding paper size in the service content data list 5800 in step S5105.

In step S5106, an amount obtained by multiplying the image print quantity by U is added to Account.

In step S5107, order estimation information associated with the I-th image is added to the work file. Furthermore, the print image information table 1700 in the database 119A is searched for a record which has the current print site receipt number in the receipt number 1701, and I in the image number 1702. The contents of the print quantity 1706 and print size 1707 of the retrieved record are updated by the current setting values, and the print unit price 1709 is updated by U. By adding the currently set print quantity to J, the number of images that has been print-ordered so far is held.

In step S5108, I is incremented by "1", and the flow returns to step S5103. If it is determined in step S5104 that the order quantity is "0", I is incremented by "1" In step S5108, and the flow returns to step S5103.

It is checked in step S5109 if J=0. If J=0, since it is determined no print image is selected, an alert dialog is displayed in step S5115. The alert dialog displayed at this time is the same as the dialog 4900. Upon depression of the OK button, the work file is deleted in step S5116, and the dialog 4400 is displayed again.

If J≠0 in step S5109, a charge of some bonus at the print site is calculated in step S5110 if such bonus is available. Note that the bonus information is acquired by searching a print site bonus list 5900 shown in FIG. 58. If a list corresponding to the size ID in the service content data list is present, a discount described in a price field is given in accordance with the quantity in a bonus unit field.

In step S5111, a header field (up to <resultitem> tag) of an estimation XML file is generated. PrintSiteOrderid is set by appending "pr-" to the receipt number of the print site, and J is input to count. Furthermore, a print charge, tax, shipping charge, and shipping charge tax are added.

In step S5112, the contents of the work file are merged with the estimation XML file. If a bonus is available at the print site, bonus information is added, and an estimation end tag is added to the end of the file, thus generating an estimation information file.

In step S5113, the order data table 1600 is searched for a record which has the current print site receipt number in the receipt number 1601. The print type 1607 of the retrieved record is updated by information input in the type input field 4401 on the dialog 4400, and Account is substituted in the print charge 1608. Also, the bonus charge and print tax are respectively input to the fields 1609 and 1610. Furthermore, the estimated shipping charge and shipping charge tax are input to the fields 1611 and 1612, and the sum total of the values set in the fields 1608 to 1612 is set in the total amount 1613, thus updating the record.

The print site 109A notifies the photo site server 105 of the generated estimation data in step S5114.

In step S5115, the print site 109A calls the URL 1505 to the print status notification CGI of the photo site server 105, which is registered in the photo site data table 1500 in advance, together with required arguments (print order ID, status (2)). In this way, the print site 109A notifies the photo site server 105 of completion of estimation.

Upon reception of that notification, the photo site server 105 updates the status value 1014 of the record corresponding to the temporary order, which is being processed, in the order information data table 1000 to "2" (estimation).

<About Firm Order Placement Process>

Figure 51:
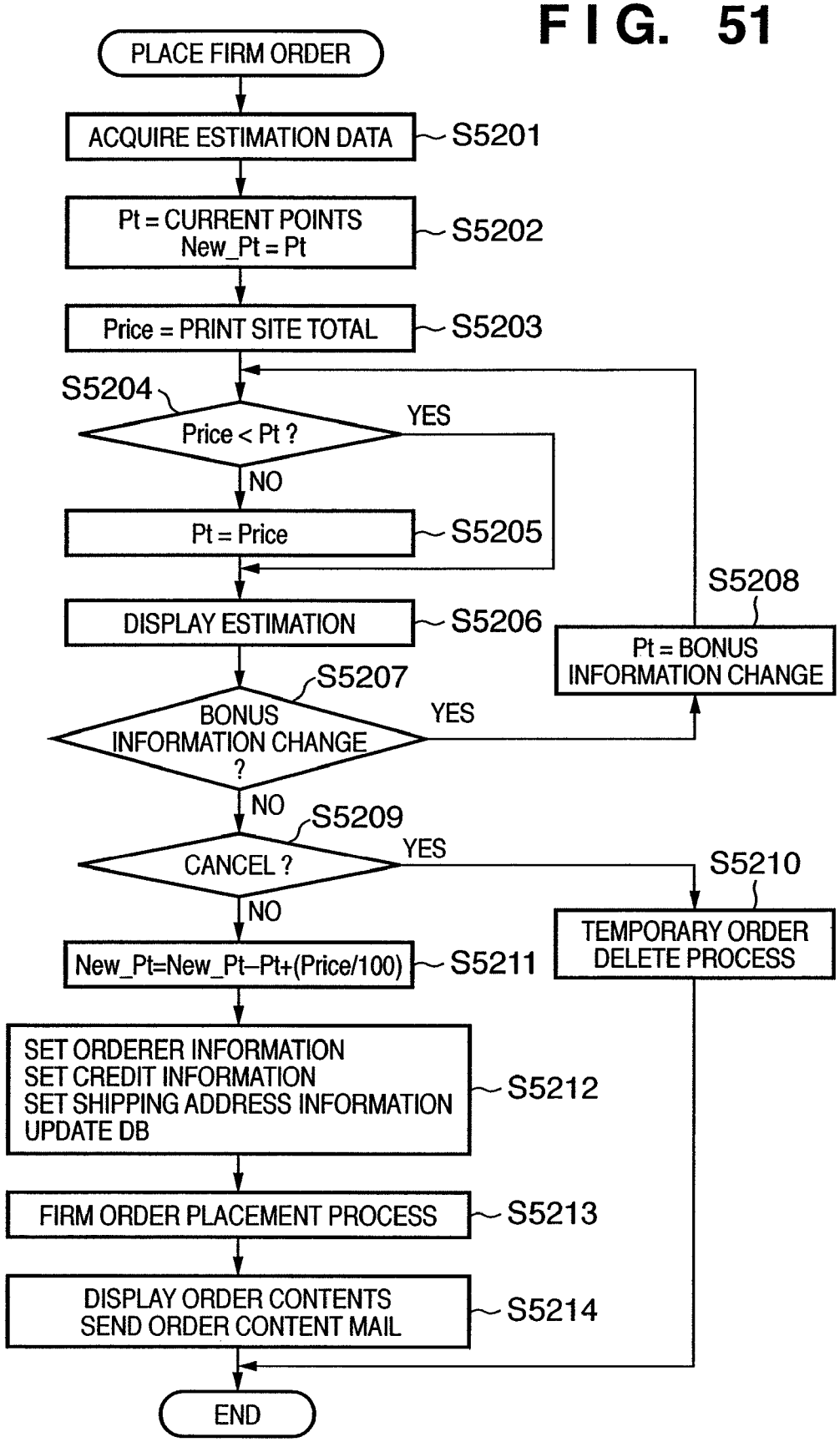
FIG. 51 is a flow chart showing the process of the photo site from when the estimation sent from the print site is acquired until a firm order is placed in the embodiment of the present invention.

FIG. 51 is a flow chart showing the process of the photo site server 105 from when the estimation data is acquired from the print site 109A until a firm order is placed.

In step S5201, the estimation data is acquired from the print site 109A.

In step S5202, the accumulated points 504 are acquired from the customer state data table 500, and are substituted in Pt. In this embodiment, the accumulated points are converted to 1 yen per point. Also, the value Pt is substituted in work variable New-Pt to calculate points after order completion.

In step S5203, the estimation total amount, which is acquired from the estimation data and is associated with the print process at the print site 109A, is substituted in Price.

It is checked in step S5204 if Price<Pt. If Price<Pt, Price is substituted in Pt.

In step S5206, the estimation is displayed. A dialog 4500 shown in FIG. 44 is an example of an estimation display dialog displayed at that time. An estimation display field 4504 displays print amounts for respective print paper sheets, and then displays bonus information at the print site. Furthermore, the total amount (print charge) to be paid for the print site, shipping charge, and shipping charge tax are summed up, and bonus information at the photo site are added to the sum, thus displaying the amount that the user must pay.

Figure 52:
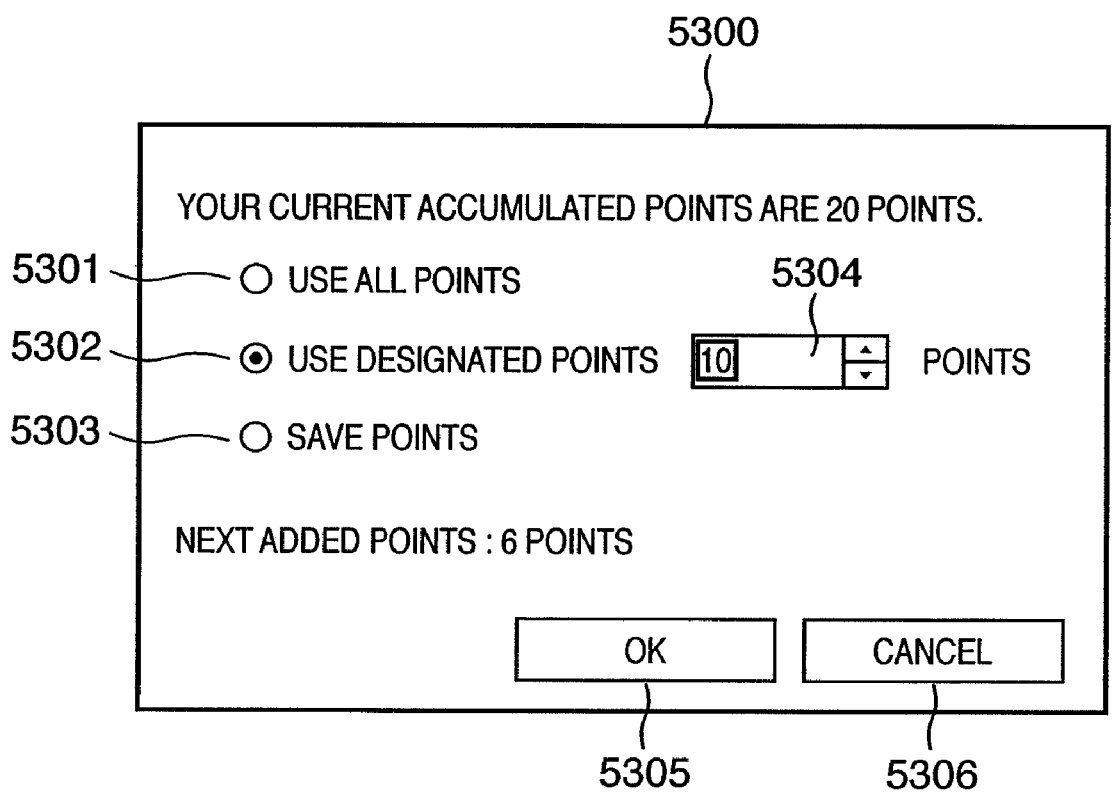
FIG. 52 shows a bonus information setup dialog at the photo site in the embodiment of the present invention.

When the user has pressed a bonus information button 4501, it is determined that a change in bonus information has been selected, and a bonus information setup dialog 5300 shown in FIG. 52 is displayed in step S5208, thus allowing the user to select whether or not he or she uses the bonus in the current payment (S5205). If the user has selected a radio button 5301, the current points can be used as a bonus; if the user has selected a radio button 5302, points input to a point input field 5304 can be used as a bonus. If the user has selected a radio button 5303, no bonus is reflected in the estimation. Upon depression of an OK button 5305, the flow returns to step S5204 to execute an addition process of added-value information again. Upon depression of a cancel button 5306, the flow returns to step S5206 to display the dialog 4500 (not shown in FIG. 51).

Upon depression of the cancel button 4503, the flow advances from step S5209 to step S5210 to execute a temporary order delete process. In this process, the records of the order image information table 1000 and image information data table 900, which are registered in the photo site server 105 and are associated with the print order, are deleted, and a temporary order delete message is sent to the print site 109A. Furthermore, the dialog 2900 is displayed.

If the user has pressed a credit information setup button 4502, the flow advances from step S5209 to step S5211. In step S5211, the points used in current payment are subtracted from the current points and points 1% of Price are added to the difference to obtain New_Pt.

In step S5212, a dialog 4600 shown in FIG. 45 is displayed, and the user sets information required to pay for the print order. Upon depression of an order button 4601 on the dialog 4600, a dialog 4700 shown in FIG. 46 is displayed, and the user inputs shipping address information. When the user has pressed an order button 4701 on the dialog 4700, the respective table contents in the DB are updated in the photo site server 105.

The points used in the current order are subtracted from the accumulated points 504 in the customer state table 500, and points added by the current print order are added to the difference. Order information of each image is acquired from the estimation information table acquired from the print site, and the print quantity 1107, print size 1108, print type 1109, lock flag 1111, acquired flag 1112, and acquisition count 1113 in the record in the order image data table 1100 of the corresponding image are updated. At this time, the lock flag 1111 is set to "0" (unlock state), the acquired flag 1112 is set to "0" (not acquired), and the acquisition count 1113 is set to "0".

A new record is generated in the order settlement data table 1200 on the basis of the current order number, and the contents displayed on the estimation display field 4504 of the dialog 4500 are registered in this record. "1" (settled) is substituted in status. Furthermore, a new record is generated in the orderer data table 1300, and information of the current orderer are acquired from the customer information data table 400 and is copied to that record. Finally, the shipping address information (1003 to 1011) input on the dialog 4700 is registered in the corresponding record of the order information data table 1000, and the status 1014 is updated to "3" (settlement).

In step S5213, the print site 109A is notified of a firm order. FIG. 55 shows an example of a data format notified at that time. Note that this notification data is substantially the same as the estimation data except that the shipping address information is appended and respective tag names are changed, and a description of its generation method will be omitted.

In step S5214, the order contents are displayed, and a mail message with the displayed contents is sent to the user PC 102A. FIG. 56 shows a display dialog 5700 of the order contents. Upon depression of a button 5701, the photo site server 105 displays the dialog 2900. FIG. 59 shows an example of a mail message sent upon placing a firm order.

(Example of Detailed Sequence of Order Reception Process S4214)

Figure 60:
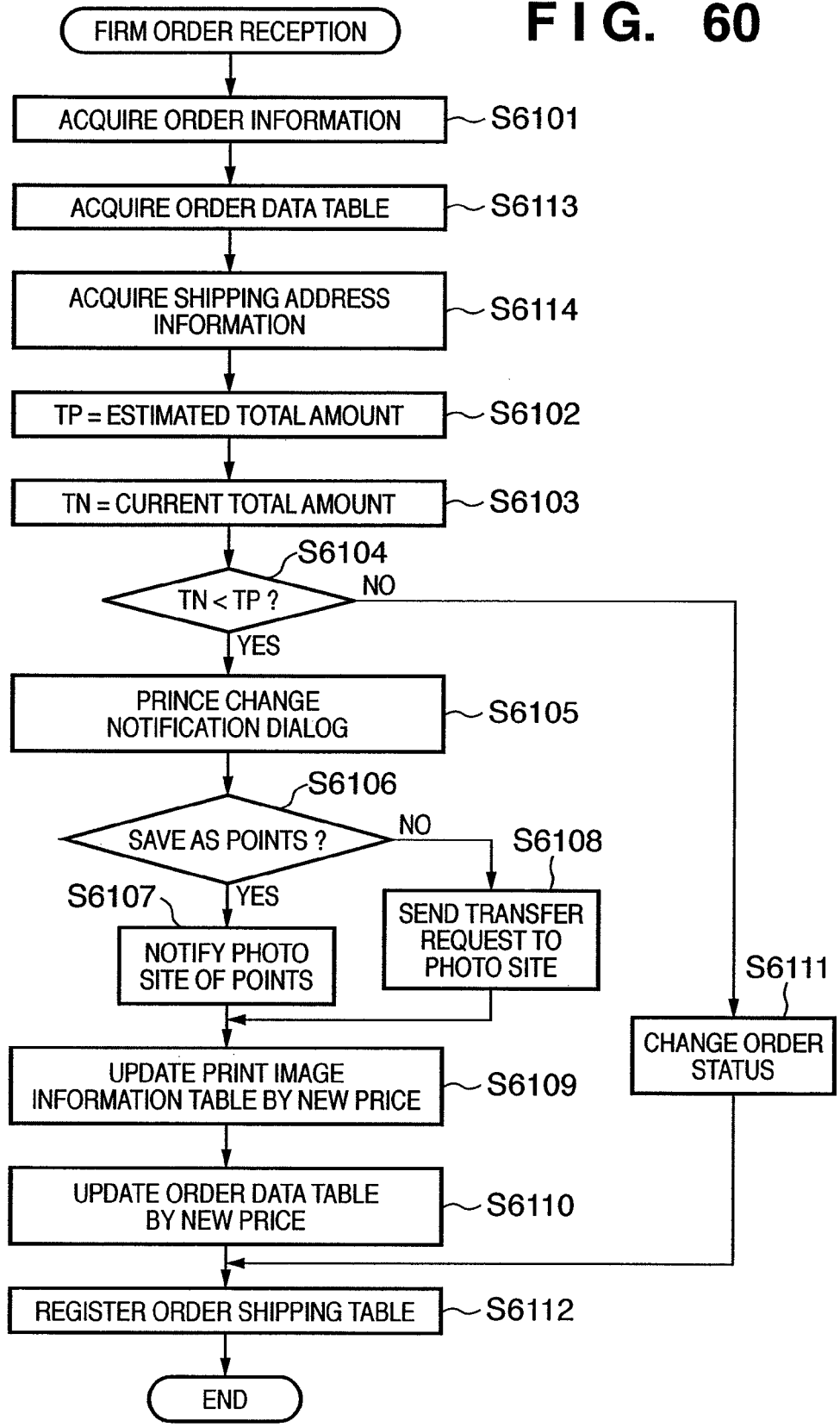
FIG. 60 is a flow chart showing details of a firm order accept process at the print site in the embodiment of the present invention.

FIG. 60 is a flow chart showing details of the order reception process in step S4214 in FIG. 41.

In step S6101, order information is acquired. In step S6113, the order number is acquired from the order information, and a record of the order data table 1600, which has that order number, is acquired. The order notification time is set in the firm order date in the order data table 1600. The shipping address information is acquired from the acquired order information in step S6114. In step S6102, the total amount upon estimation is acquired, and is substituted in TP. In step S6103, total TN of the current billing charges is calculated from the order images and shipping charge.

Figure 69:
FIG. 69 shows a dialog displayed when a price upon placing a firm order becomes lower than an estimated price in the embodiment of the present invention.

It is checked in step S6104 if TN<TP. If the current charge is lower than the estimated charge, a price change notification dialog 7100 shown in FIG. 69 is displayed in step S6105. If the user has pressed a point add button 7101 on the price change notification dialog 7100, the photo site server 105 is notified of the receipt number 1601 and difference (TP−TN) in step S6107.

Upon reception of this notification, the photo site server 105 displays a dialog 7000 shown in FIG. 68, searches the order image data table 1100 for a record which has the notified receipt number as the print site receipt number 1102, and acquires the order number 1101. Furthermore, the order information data table is searched for a record having that order number in the field 1101 to acquire the orderer ID 1002 from that record. After that, the customer state table is searched for a record which has the same number as the orderer ID 1002 as the user ID 501, and the difference notified from the print site 109A is added to its accumulated points 504.

Upon depression of a button 7102 on the dialog 7100, a difference transfer request is sent to the photo site in step S6108. In step S6109, the print unit price 1709 of each print image in the print image information table 1700 is updated by the new price. In step S6110, the print charge 1608, print site bonus charge 1609, print tax 1610, shipping charge 1611, shipping charge tax 1612, and total amount 1613 in the order data table 1600 are updated based on the new price. Also, the order status 1606 is changed to "1" that indicates a firm order (not printed).

If the current charge is not lower than the estimated charge in step S6104, since the old price described in the order information has already been set in the order information data table, the order status 1606 is changed to "1" that indicates a firm order (not printed) in step S6111.

In step S6112, a record is registered in the order shipping table 1800. The shipping status 1812 is set to "0" which indicates that the order is not shipped yet.

(Example of Detailed Sequence of Image Data Acquisition Process S4215)

Figure 78:
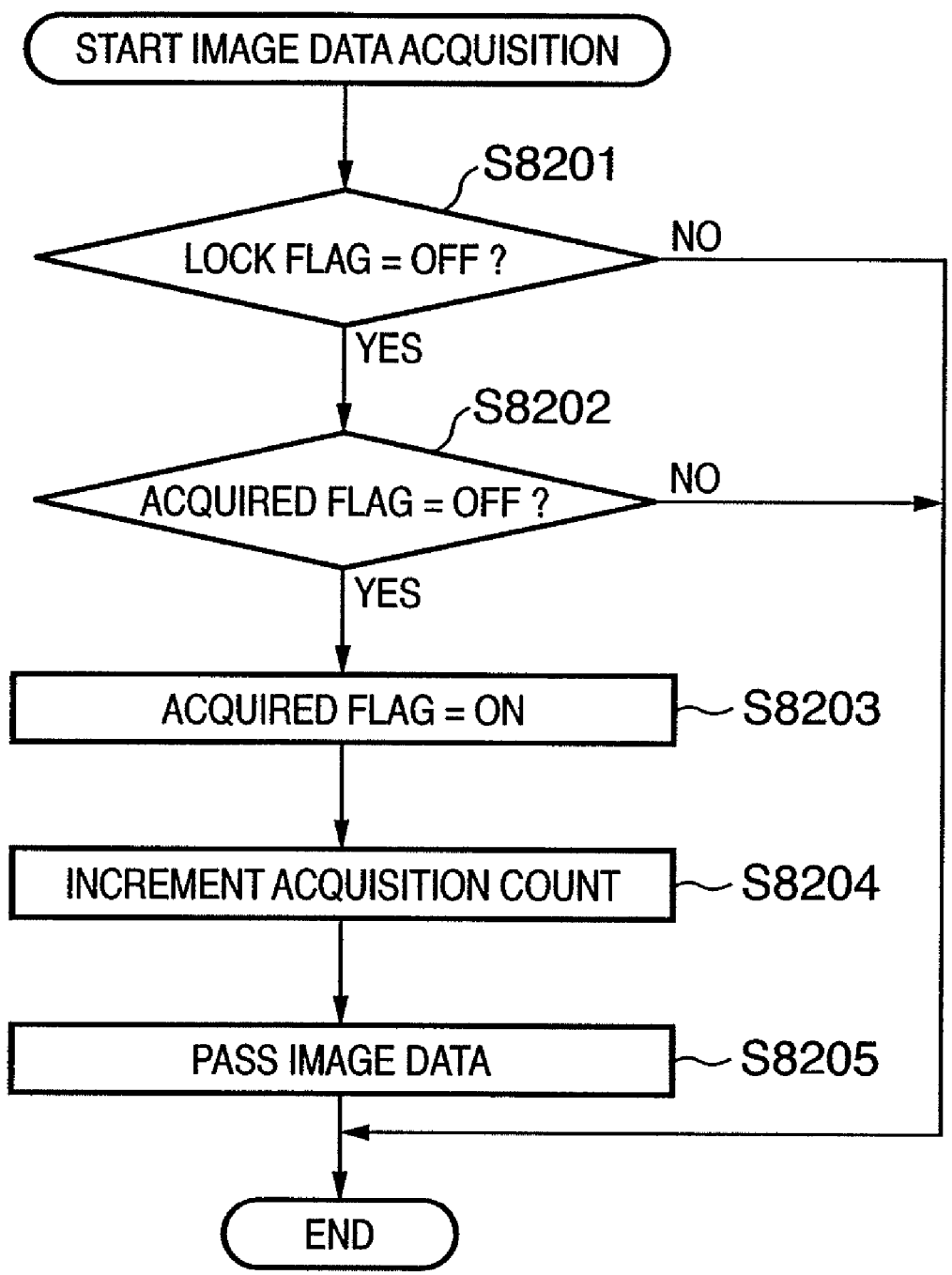
FIG. 78 is a flow chart showing the process of the photo site upon receiving an image data acquisition request from the print site in the embodiment of the present invention.

FIG. 78 is a flow chart showing details of the image data acquisition process in step S4215 in FIG. 41. Note that image data to be acquired means image data which is used in a print process at the print site 109A. Image data is acquired by calling the URL of the image acquisition CGI which is received by the print site 109A as temporary order data. The process of the photo site server 105 upon calling the URL of the image acquisition CGI will be explained below.

In step S8201, the lock flag 1111 of a record, corresponding to image data to be processed, in the order image data table 1100 in the photo site server 105 is looked up. If the lock flag is "0" (unlock state), the process proceeds. However, if the lock flag is "1" (lock state), the process ends, and an acquisition failure is sent to the print site 109A as a return value of the CGI.

In step S8202, the acquired flag 1112 of the record, corresponding to the image data to be processed, in the order image data table 1100 in the photo site server 105 is looked up. If the acquired flag is "0" (not acquired), the image acquisition process proceeds to allow the print site 109A to acquire that image data. However, if the acquired flag is "1" (acquired), since the print site 109A has already acquired that image data, the image acquisition process ends, and an acquisition failure is sent to the print site 109A as a return value of the CGI.

In step S8203, the acquired flag 1112 of the record, corresponding to the image data to be processed, in the order image data table 1100 in the photo site server 105 is set to "1" (acquired). In step S8204, the acquisition count 1113 of the record, corresponding to the image data to be processed, in the order image data table 1100 in the photo site server 105 is incremented by one. In step S8206, the image data to be processed is returned to the print site 109A as a return value of the CGI.

Although not shown in FIG. 41, upon receiving the acquisition failure upon calling the URL of the image acquisition CGI, the print site 109A notifies the photo site server and user of an image acquisition process failure by an additionally designated method (e.g., e-mail or the like).

When image data can be acquired by calling the URL of the image acquisition CGI, the print site 109A calls the URL 1505 to the print status notification CGI of the photo site server 105, which is registered in the photo site data table 1500 of the print site 109A in advance, together with required arguments (print order ID, status (5)), thus notifying the photo site server 105 of the end of the order process.

(Example of Detailed Sequence of Order End Process S4225)

Figure 79:
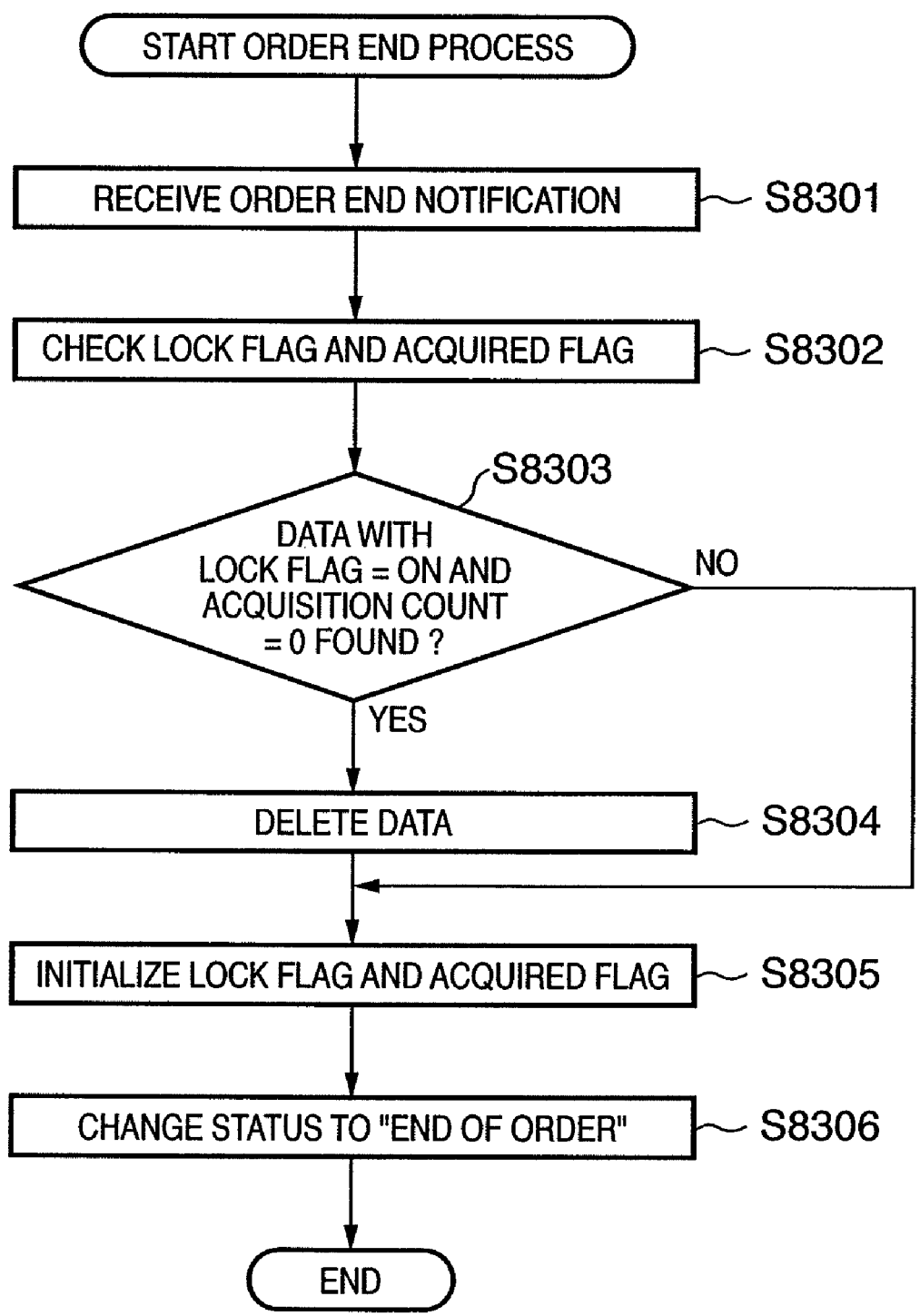
FIG. 79 is a flow chart showing an order end confirmation process in the embodiment of the present invention.

FIG. 79 is a flow chart showing details of the order end confirmation process in step S4225 in FIG. 41.

In step S8301, the photo site server 105 receives an order end notification from the print site 109A. In step S8302, the photo site server 105 checks the states of the lock flags 1111 and acquired flags 1112 of the corresponding records in the order image data table 1100 for all image data contained in the print order, which is specified by the print order ID contained in the order end notification.

If the lock flags 1111 are "0" (unlock state) and the acquired flags 1112 are "1" (acquired) for all the image data contained in the print order, an order end process is executed by setting the lock flags 1111 to "1". If a combination of the lock flag 1111="0" and acquired flag 1112="0" is found, since it is determined that the print site 109 has failed to acquire the corresponding image data, and any problem may occur, the photo site server 105 notifies the print site 109A of it as a return value of the CGI. The print site 109A confirms the notified contents, and if no problem is found in the process at the print site 109A, the process proceeds. If any problem is found at the print site 109A, it notifies the photo site server and user of that problem via e-mail.

The photo site server 105 confirms in step S8303 for all the image data contained in the print order, which is specified by the print order ID contained in the order end notification, whether or not the corresponding records in the order image data table 1100 include data of the lock flag="1" (lock state) and acquisition count 1113="0". If such data is found, it is determined that an image which is not required for the order is registered in the order image data table 1100 by mistake, and that data is immediately deleted from the order image data table 1100 in step S8304.

If no corresponding data is found in step S8303, and after the delete process in step S8304, the photo site server 105 initializes respective flags of the corresponding records in the order image data table 1100 for all the image data contained in the print order, which is specified by the print order ID contained in the order end notification (step S8305). In this case, the lock flag 1111 is reset to "1" (lock state), and the acquired flag 1112 is reset to "0" (not acquired), but the acquisition count 1113 remains unchanged.

If image data which has been acquired once (initialized image data) is illicitly acquired by the photo site 109, the acquisition count 1113 is incremented. Hence, the photo site server 105 can determine whether or not image data is illicitly acquired by the photo site 109 by examining if the value of the acquisition count 1113 of the image data is larger than a predetermined value or the like.

In step S8306, the photo site server 105 updates the status 1014 of the record, which has the order number 1001 of the same value as the print order ID contained in the order end notification, in the order information data table 1000 to "5" (end of order).

(Example of Sequence of Album Notification Process)

FIG. 32 shows a dialog displayed upon depression of the notification button 2905 on the dialog 2900.

After the user inputs a destination mail address 3302, sender mail address 3303, mail title 3304, and message 3305 on a dialog 3300, if he or she presses a notification button 3306, the photo site server 105 merges the above contents with a mail document generated by the photo site server, and sends an album notification mail message to the destination mail address.

Figure 74:
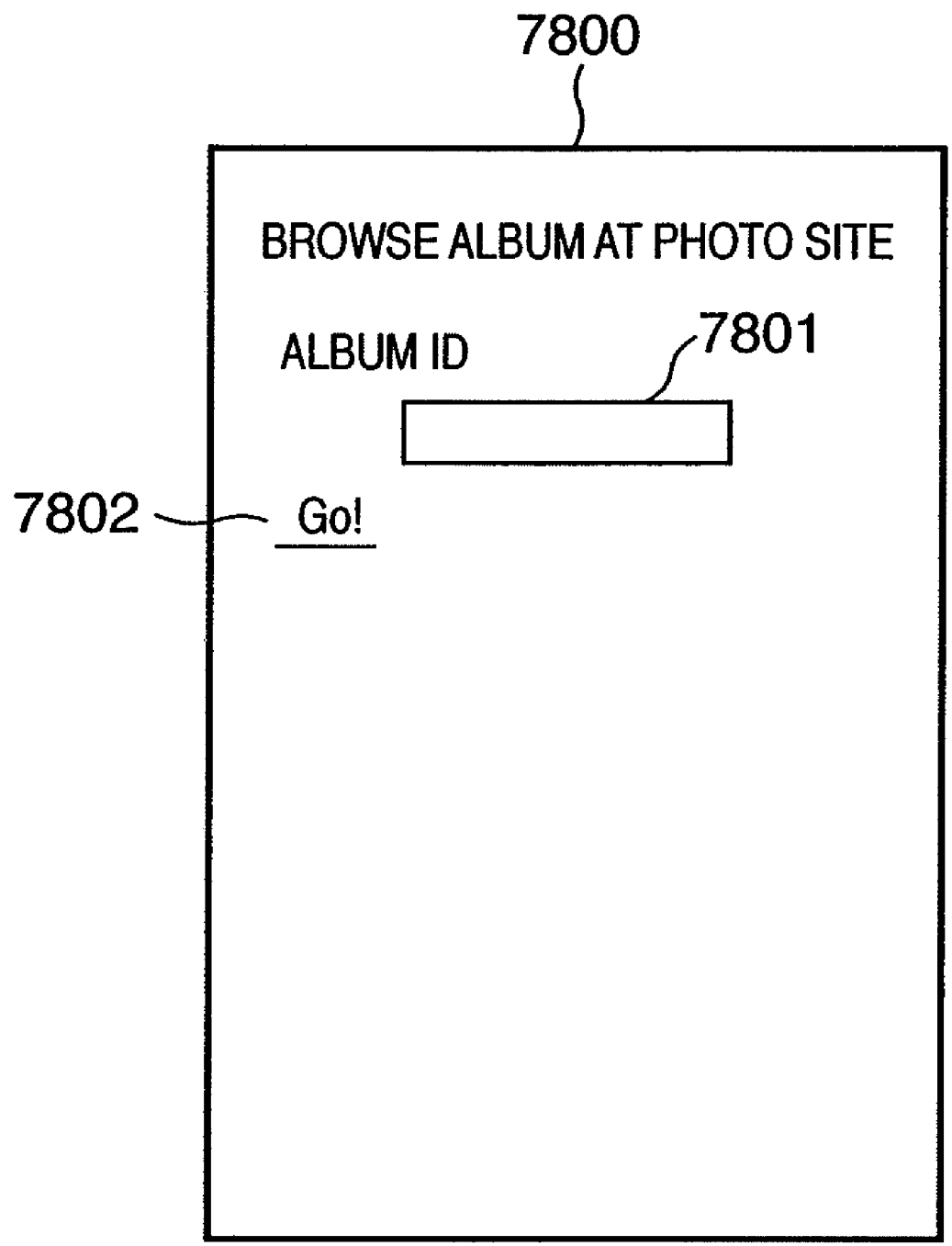
FIG. 74 shows the first dialog displayed upon browsing an album from a portable phone.

FIG. 61 shows an example of the album notification mail message. The URL and album ID contained in this notification mail message have the same contents displayed on a URL & public album ID display field 3308. Upon reception of the mail message, the user can browse an album by designating the URL described in that mail. Also, the user can browse the same album as that which can be browsed upon designating the URL when he or she inputs the album ID described in the mail message to the album ID designation field 1905 on the dialog 1900 and presses a GO! button 1906. The value of parameter AlbumID=described in the URL is the same as the album ID of a public album. A dialog 7800 shown in FIG. 74 is displayed when the user accesses an album from a portable phone that can establish connection to the Internet. By inputting the album ID in an input field 7801, the user can browse the album.

A sequence for generating the public album ID will be explained below. The public album ID consists of a part that encrypts the album ID 701, and a part that converts the encrypted character string into a character string which can be easily input by the portable phone, so as to prevent a third party from imagining the original album ID 701 from its number or character string, and from analogizing public album IDs of other albums.

Figure 62:
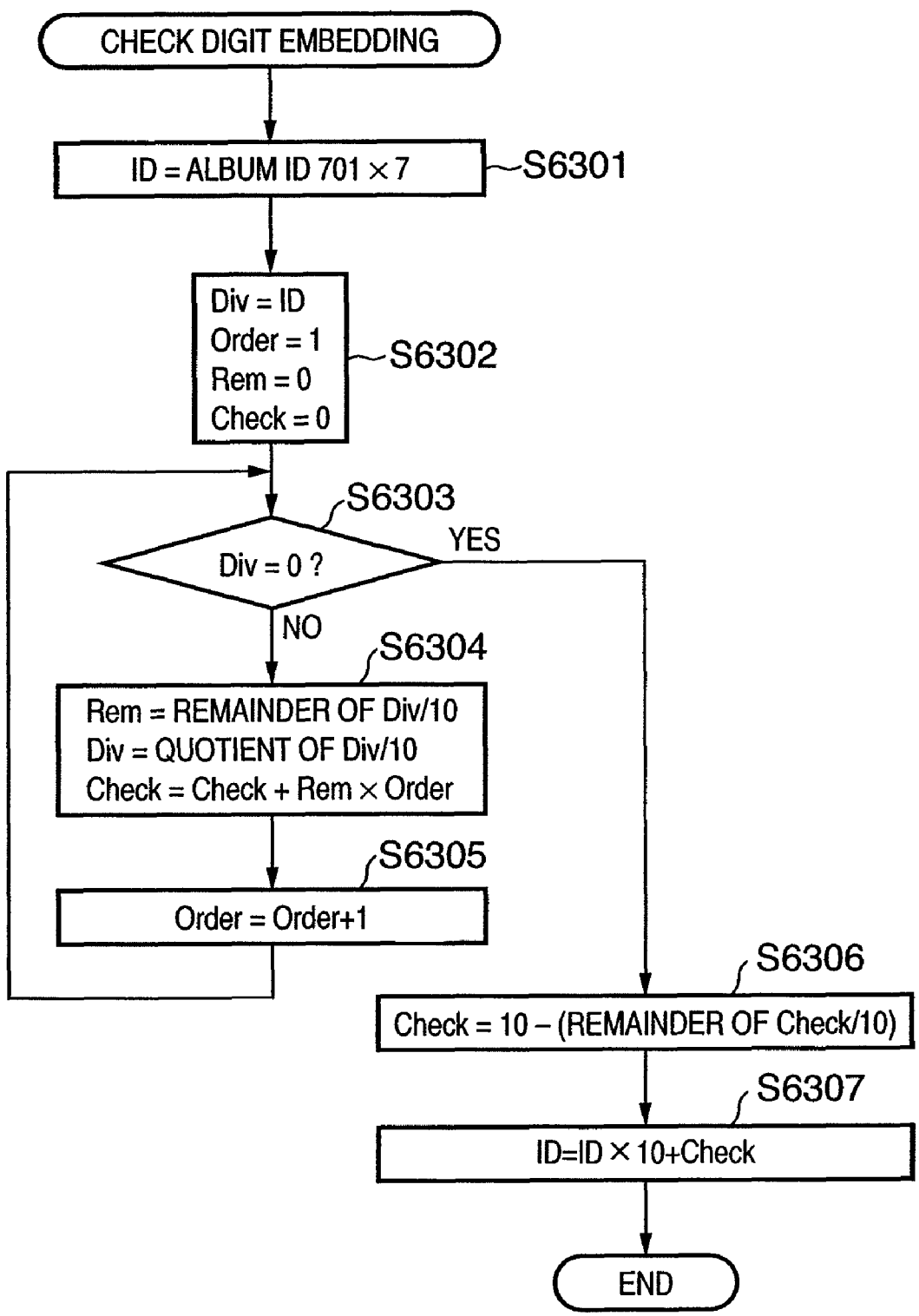
FIG. 62 is a flow chart showing a process for embedding a check digit which is used to prevent a third party from imagining an original album ID from a number or character string, and from analogizing public album IDs of other albums in the embodiment of the present invention.

FIG. 62 is a flow chart showing a process for embedding a check digit which is used to prevent a third party from imagining the original album ID 701 from its number or character string, and from analogizing public album IDs of other albums. In this embodiment, an ID is multiplied by 7, and the product is expressed by a decimal number. Numerical values at respective digits of the decimal number are multiplied by their digit numbers, and the sum total of these products is calculated. A complement to the numerical value at the one's digit is used as a check digit, respective numerical values of the ID are shifted up by one digit, and the check digit is appended to the one's digit to form a new ID.

In step S6301, the album ID 701 of an album to be currently notified is acquired, and the product of that album ID and 7 is substituted in ID. In step S6302, work variable Div used to save a quotient obtained upon sequentially dividing ID by 10 is reset to ID, work variable Order used to count the number of digits of ID is reset to "1", work variable Rem used to save a remainder obtained upon sequentially dividing ID by 10 is reset to "0", and work variable Check used to calculate a check digit is reset to "0".

It is checked in step S6303 if Div="0". By repeating processes in steps S6304 and S6305 until Div becomes "0", sum total Check of products of numerical values at respective digits of ID by their digit numbers is calculated. In step S6304, a remainder obtained upon dividing Div by 10 is substituted in Rem, a quotient obtained upon dividing Div by 10 is substituted in Div, and Rem×Order is added to Check. In step S6305, Order is incremented by "1".

If Div="0" in step S6303, a difference obtained by subtracting a remainder obtained by dividing Check by 10 from 10 is substituted in step S6306. In step S6307, the sum of the product of ID and 10, and Check is set as a new ID.

With the ID calculated in this way, even when a third party makes an attempt to search for an album using numerical values around that ID value, the photo site server 105 can determine that value as an illicit value and can deny album display.

A process for converting the ID embedded with the check digit in FIG. 62 into a character string which can be easily input by the portable phone will be explained below. This embodiment will explain a method of generating a character string in which letters (e.g., A and B) which are input by an identical ten-key button do not successively appear, with reference to a list 6400 which manages character codes corresponding to respective ten-key buttons of the portable phone.

The portable phone button/alphabetical letter list 6400 shown in FIG. 63 manages phone buttons Button, character codes Letters corresponding to each of these buttons, and the number AL of character codes corresponding to each button.

In the following description, AL[X] represents the number AL of character codes corresponding to button number X.

Figure 64:
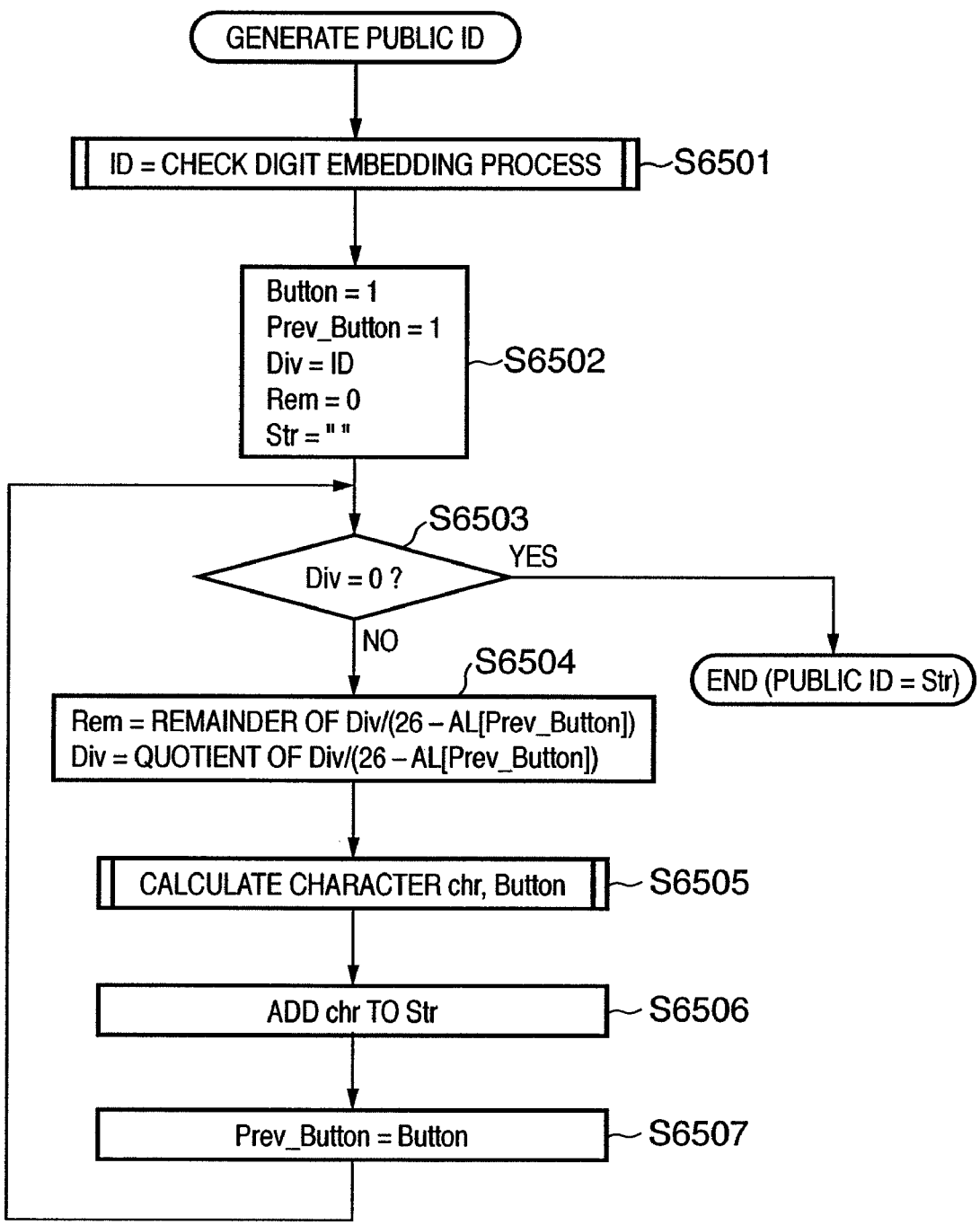
FIG. 64 is a flow chart showing a process for generating a character string in which letters corresponding to an identical button of a portable phone do not successively appear in the embodiment of the present invention.

FIG. 64 is a flow chart showing a process for generating a character string in which letters corresponding to an identical button of the portable phone do not successively appear. In this embodiment, A to Z are considered as 26-ary numbers assigned to 0 to 25, and if one letter is used, a 23-ary or 22-ary character string having A as zero initial point (D as an initial point if the previous letter is A, B, or C) is generated using alphabetical letters except for letters input by the same button as that letter.

In step S6501, the ID that has undergone the check digit embedding process is set in ID. This process has already been explained using FIG. 62. In step S6502, "1" is set in work variable Button indicating the currently pressed button, "1" is set in work variable Prev_Button indicating the previously pressed button, ID is set in work variable Div which indicates a quotient obtained upon dividing ID by the number of available letter types, "0" is set in work variable Rem which indicates a remainder obtained upon dividing ID by the number of available letter types, and a null character string is set as an initial value in character string Str to be finally formed.

It is checked in step S6503 if Div "0". By repeating processes in steps S6504 to S6507 until Div becomes "0", characters are added to character string Str one by one.

In step S6504, a remainder obtained by dividing Div by the number of currently available letters is set in Rem, and a quotient obtained by dividing Div by the number of currently available letters is set in Div. In the initial state, since Prev_Button is "1", and the value of AL[1] at that time is set with "0" in FIG. 63, 26 different letters are available and, after that, 22 or 23 different letters are available depending on the value of Button. In step S6505, character chr calculated from the remainder, and button number Button to which chr belongs are calculated on the basis of the values of Rem and Prev_Button. In step S6506, chr is added to Str. In step S6507, Button is set in Prev_Button, and the flow returns to step S6503.

If Div="0" in step S6503, the process ends, and character string Str that represents the album ID to be published is obtained.

Figure 65:
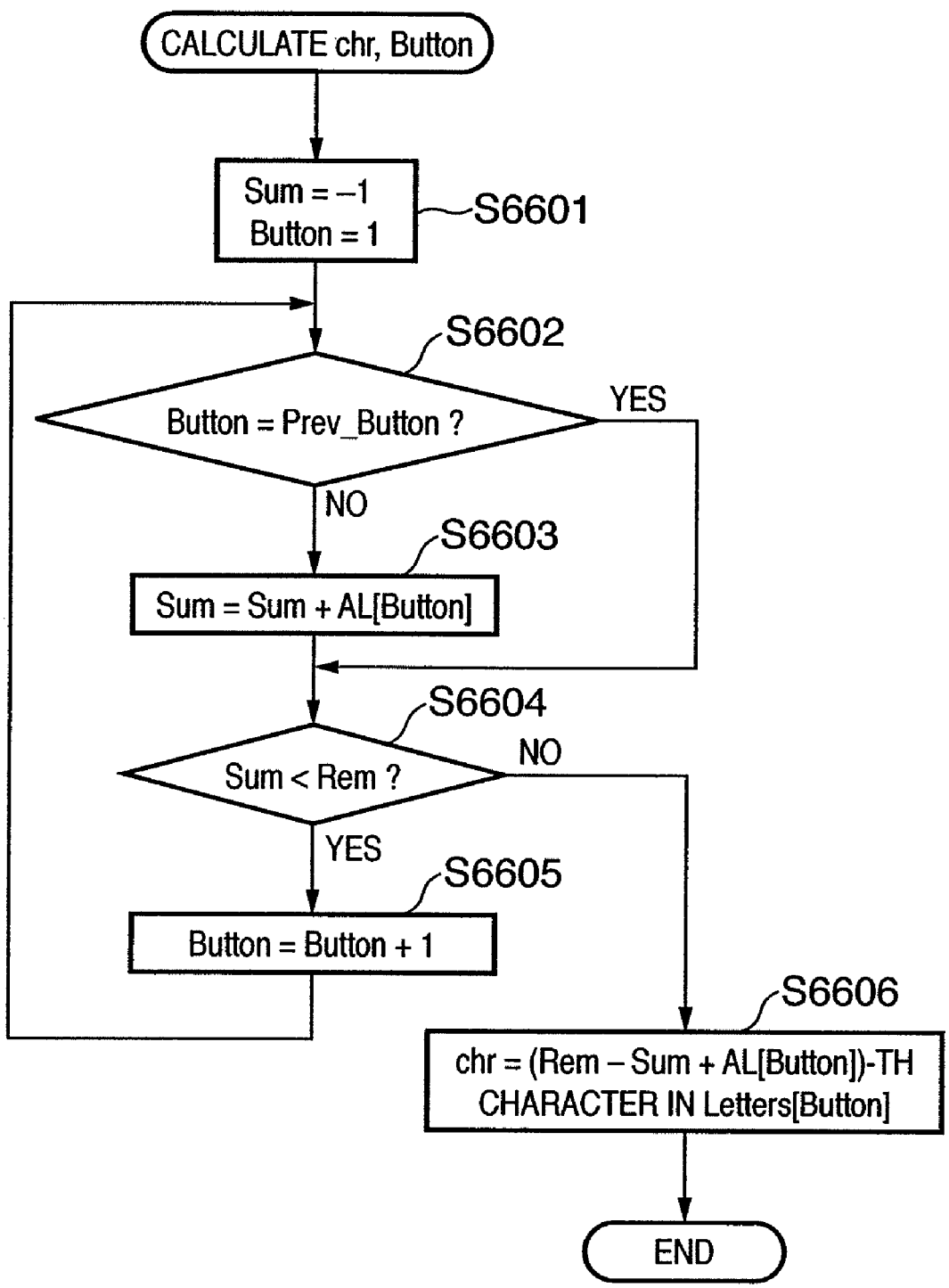
FIG. 65 is a flow chart showing a process for associating a given numeral with an alphabetical letter, and calculating a button of a portable phone that can input the alphabetical letter in the embodiment of the present invention.

FIG. 65 is a flow chart showing the process for calculating character Chr corresponding to Rem and button number Button to which that character belongs in step S6505 in FIG. 64.

In step S6601, work variable Sum which counts the total of the number of letters that appear when the buttons of the portable phone are pressed in turn from "1" is reset to "−1", and Button is reset to "1".

It is checked in step S6602 if Button=Prev_Button. If Button=Prev_Button, that button cannot be used, and the flow jumps to step S6604; otherwise, the number AL[Button} of letters that can be input by Button is added to Sum.

It is checked in step S6604 if Sum<Rem. If Sum<Rem, Button is incremented by "1", and the flow returns to step S6602. If Rem≦Sum, it is determined that a character corresponding to Rem is present in Button, and the flow advances to step S6606.

In step S6606, chr is calculated chr is the (Rem−Sum+AL[Button])-th character in Letters[Button].

(Example of Sequence of Album Browse Process)

Figure 66:
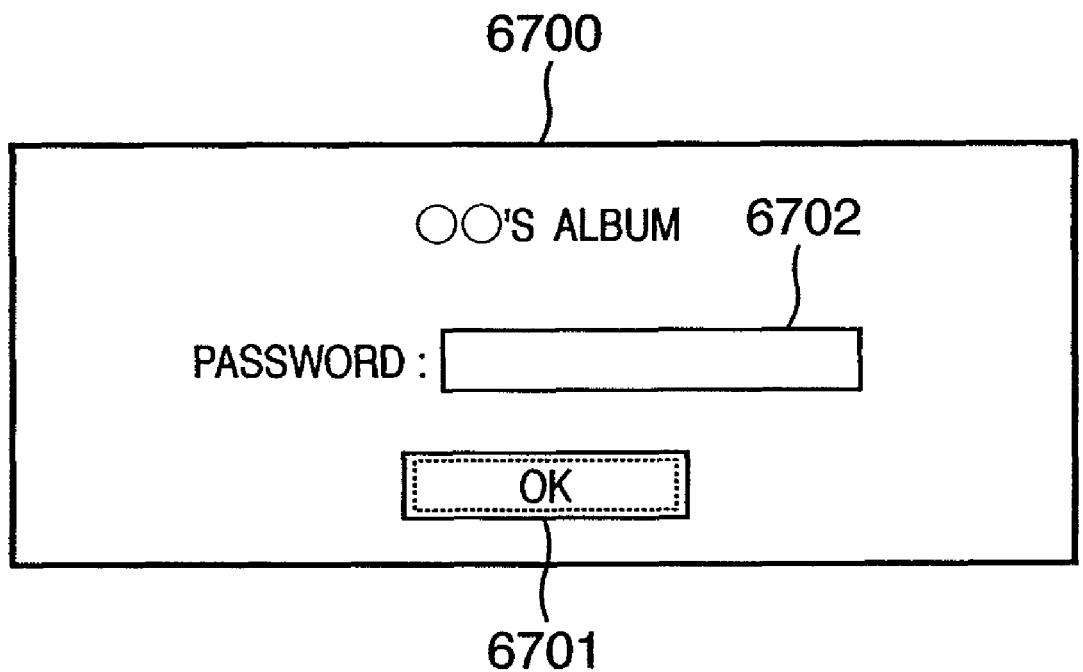
FIG. 66 shows an album browse start dialog in the embodiment of the present invention.

Upon reception of the notification mail message shown in FIG. 61, the user can display an album browse start dialog 6700 shown in FIG. 66 by designating a URL 6201 described in the mail document. Note that this dialog is also displayed when the user inputs an album ID 6203 described in the notification mail message to the album ID input field 1905, and presses the GO! button 1906.

Figure 70:
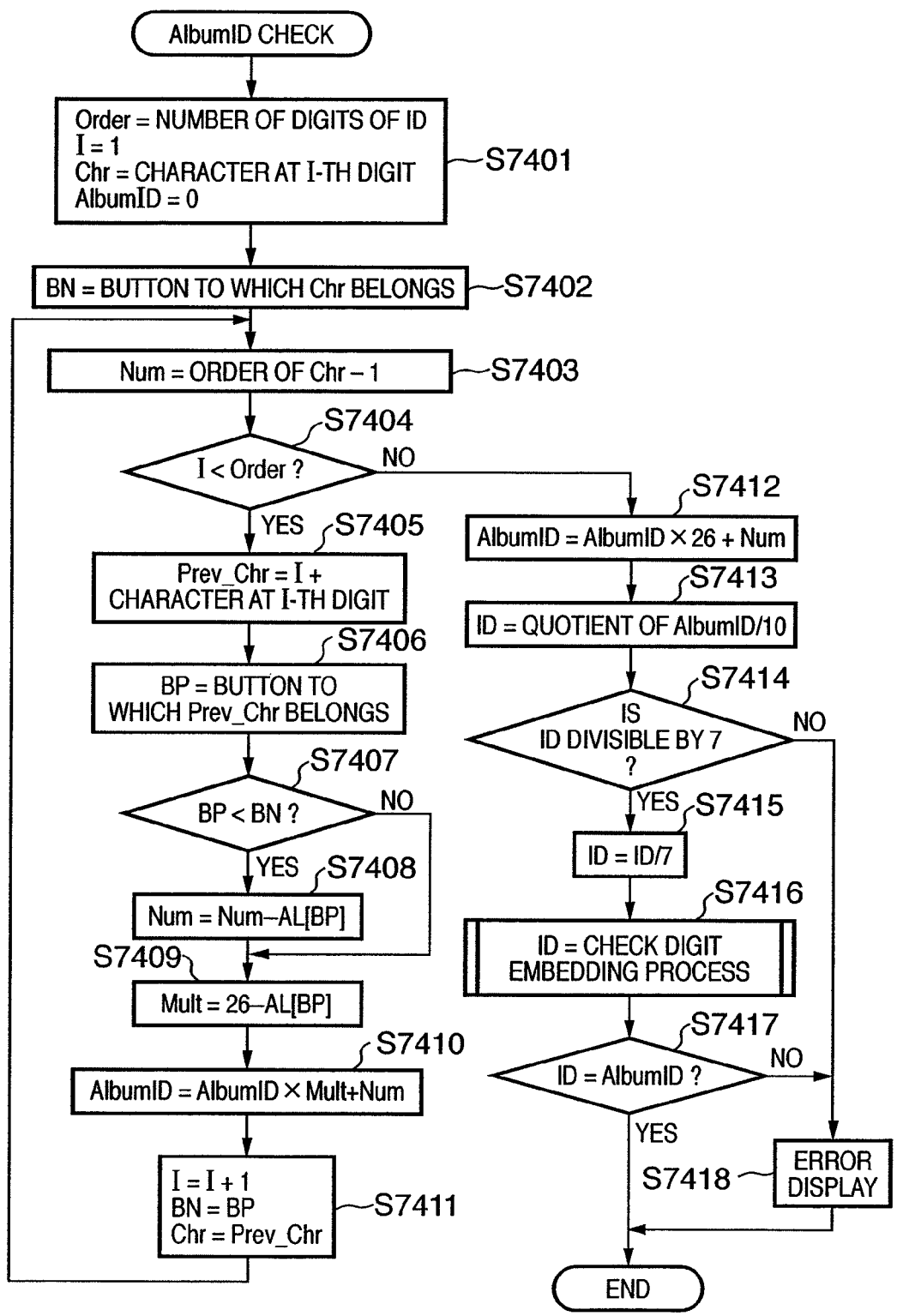
FIG. 70 is a flow chart showing a process for checking an ID input upon browsing an album.

FIG. 70 is a flow chart showing a process for determining whether or not an album having the designated album ID is present.

Figure 71:
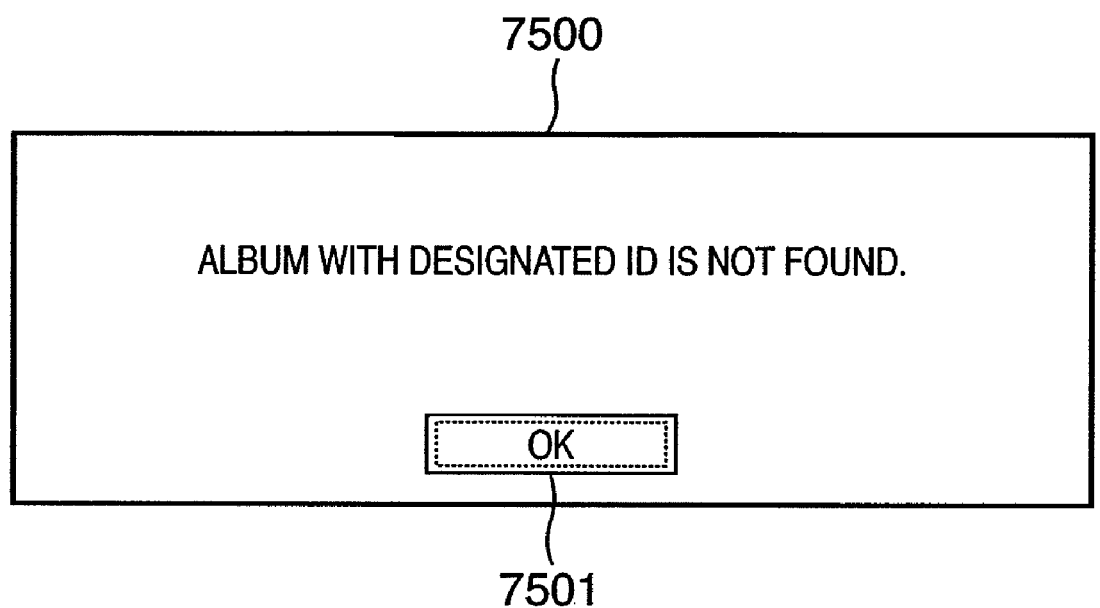
FIG. 71 shows a dialog displayed when an album corresponding to the ID input upon browsing an album is not found.

In step S7401, Order is reset to the number of digits of the input ID, work variable I used to count the digit number is reset to "1", work variable Chr indicating a character is reset to the first character, and AlbumID to be obtained is reset to "0". In this embodiment, input parameters that represent the album ID are limited to alphabetical letters. Upon checking an illicit input (e.g., an input character is other than alphabetical letters), an error dialog 7500 shown in FIG. 71 is displayed as in a case wherein an album with the designated album ID is not found.

In step S7402, the portable phone button/alphabetical letter list 6400 is searched for a button where character Chr is laid out, and that button is set in BN. In step S7403, the order of Chr in alphabetical letters is obtained, and a value obtained by subtracting "1" from that order is set in Num. It is checked in step S7404 if I<Order.

If it is determined in step S7404 that I<Order, a character at the (I+1)-th digit is set in Prev_Chr in step S7405. In step S7406, the portable phone button/alphabetical letter list 6400 is searched for a button where character Prev_Chr is laid out, and that button is set in BP.

In step S7407, BP and BN are compared. In this embodiment, since two letters assigned to an identical button are never successively input, if BP=BN, the error dialog 7500 is displayed (not shown in FIG. 70). If it is determined in step S7407 that BP<BN, AL[BP] is subtracted from Num in step S7408. On the other hand, if BP≧BN in step S7407, the process in step S7408 is skipped.

In step S7409, a value obtained by subtracting AL[BP] from 26 is set in work variable Mult indicating a multiplier. In step S7410, the sum of the product of AlbumID and Mult, and Num is set as new AlbumID. In step S7411, I is incremented by "1", BP is substituted in BN, and Prev_Chr is substituted in Chr. The flow then returns to step S7403.

If it is determined in step S7404 that I≧Order, the sum of the product of AlbumID and 26, and Num is set as new AlbumID in step. S7412. If the user inputs a correct album ID value, AlbumID calculated in this step becomes the ID shown in FIG. 62. In this embodiment, since this value is obtained by embedding the check digit at the one's digit after the existing album ID is multiplied by 7, a quotient obtained upon dividing AlbumID by 10 is set in ID in step S7413 and it is checked in step S7414 if ID is divisible by 7.

If ID is divisible by 7 in step S7414, ID is divided by 7 in step S7415. This ID undergoes the check digit embedding process shown in FIG. 62 in step S7416, and it is checked in step S7417 if ID matches AlbumID.

It is determined in step S7414 that ID is indivisible by 7, and if it is determined in step S7417 that ID does not match AlbumID, it is determined that a correct album ID is not input, and the error dialog 7500 shown in FIG. 71 is displayed in step S7418.

Only when the photo site server 105 analyzes AlbumID in the parameter part of the input URL or the album ID input to the album ID input field 1905 and finds a corresponding album, it searches the album information table 700 for a record having the ID obtained in step S7415 as the album ID 701, searches the customer album table 600 for the user ID having that album ID, and further searches the customer information table for a record having that user ID in the field 401.

After that, the name (last name) 405 is displayed on the album browse start dialog 6700 shown in FIG. 66. If it is determined based on the password availability flag 705 of the retrieved record of the album information data table 700 that a password is set for the album, a password input field 6702 is displayed. Note that no password input field 6702 is displayed for an album without any password.

Figure 67:
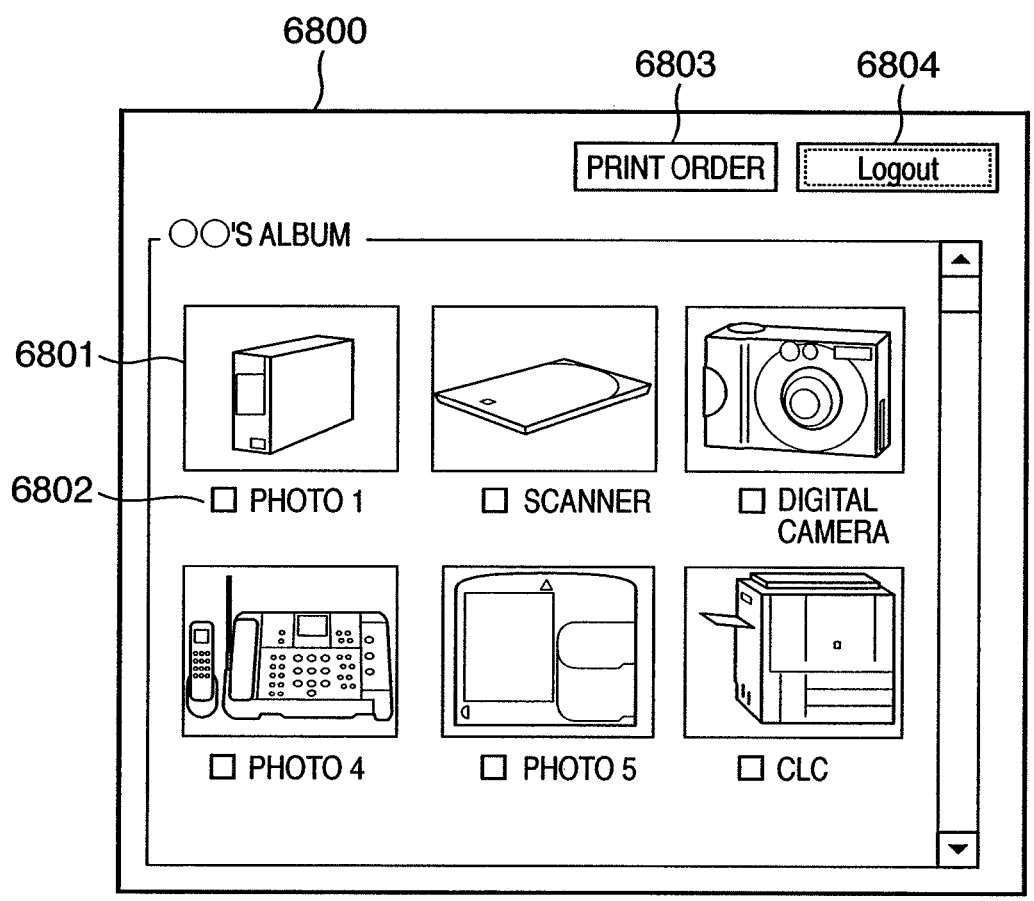
FIG. 67 shows an album browse dialog in the embodiment of the present invention.

Upon depression of an OK button 6701, a dialog 6800 shown in FIG. 67 is displayed for the album without any password or the album whose password is correctly input. The contents of this dialog are the same as those of the album display field 2923 on the dialog 2900. If a wrong password is input, the dialog 2500 shown in FIG. 24 is displayed. Upon depression of the OK button 2501, the dialog 6700 is displayed again.

The value of the print availability flag 707 is acquired from the album information data table, and if that album is printable, a button 6803 is displayed, and the user can place a print order. In this case, the flow of the print order process is substantially the same as that for the registered user, except that no added value (points) is added at the photo site server 105.

(Example of Sequence of Browse Process from Portable Phone)

Figure 72:
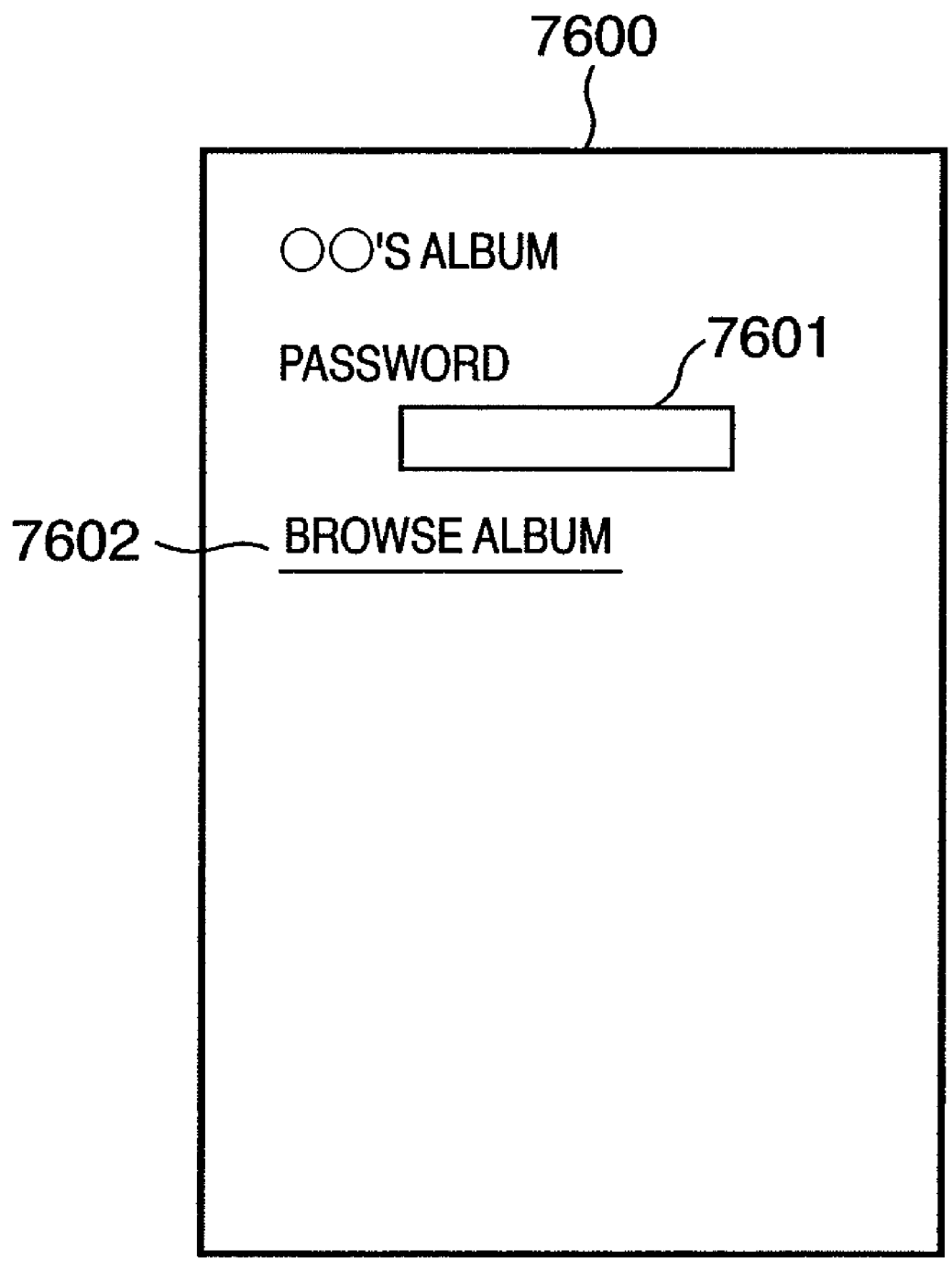
FIG. 72 shows the first dialog displayed upon browsing an album from a portable phone.

A dialog 7600 shown in FIG. 72 is an example of a dialog displayed upon browsing from the portable phone. The photo site server 105 acquires terminal information of a terminal that issued a browse request in response to the browse request from the user, and determines whether the browse request comes from the portable terminal or PC. If the browse request is issued by the portable terminal, the dialog 7600 shown in FIG. 72 is displayed. Since the contents of this dialog are the same as those of the dialog 6700, a description thereof will be omitted. The dialog 7600 is displayed when the user directly designates the URL described in the notification mail shown in FIG. 61. Also, the dialog 7600 is displayed when the user inputs the album ID shown in FIG. 61 to the album ID input field 7801 and presses a button 7802 on the dialog 7800 shown in FIG. 74.

Figure 73:
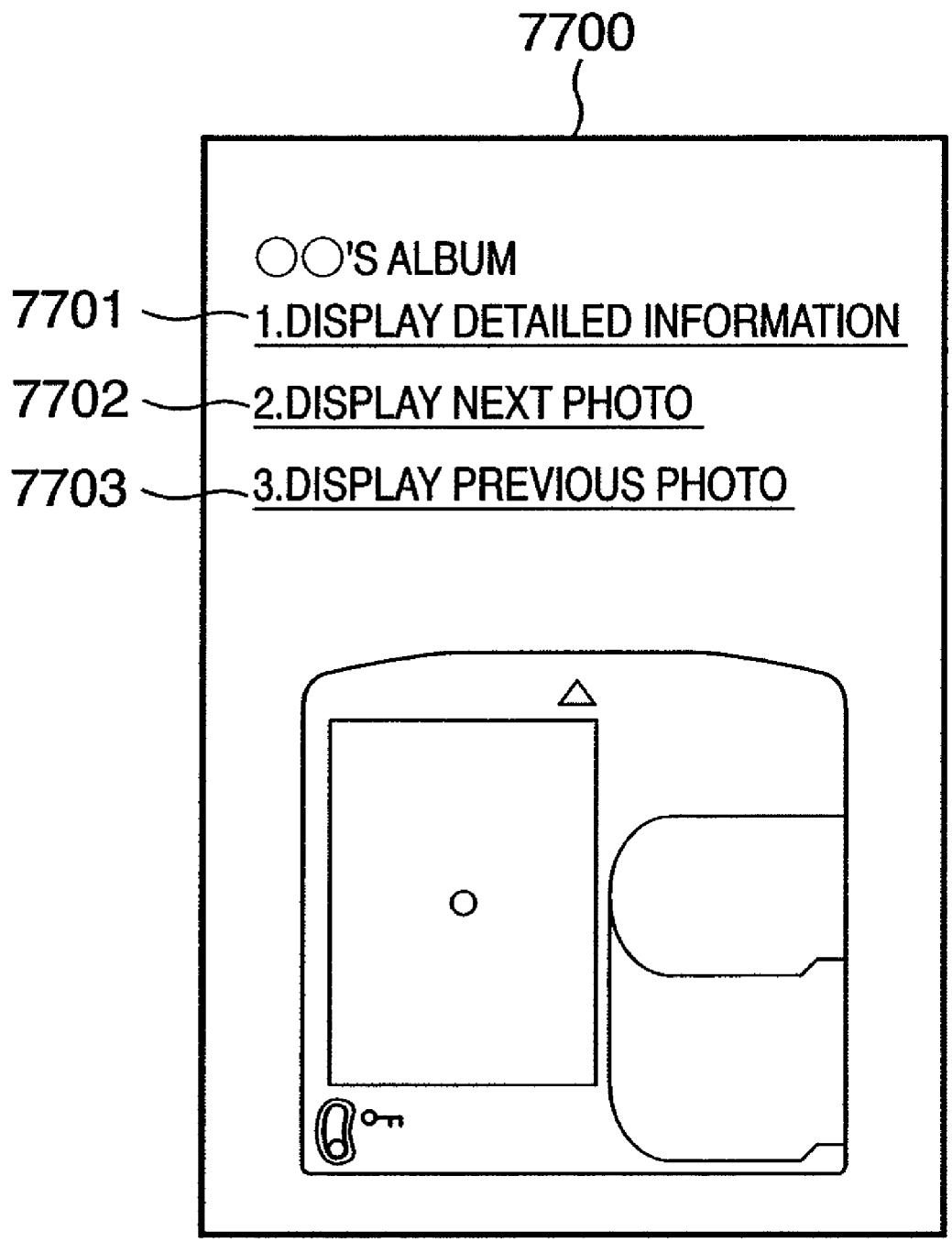
FIG. 73 shows a dialog displayed upon browsing an album from a portable phone.

Upon depression of a button 7602 on the dialog 7600, a dialog 7700 shown in FIG. 73 is displayed. The photo site server 105 displays an image in a reduced size. Furthermore, the photo site server 105 divisionally displays images in the album one by one upon selection of the next or previous image. Upon depression of a button 7701, detailed information such as an image name, comment, and the like is displayed. The contents displayed in this case are the same as those displayed for each image shown in FIG. 35. Upon depression of a button 7702 or 7703, a displayed image in the album can be updated one by one.

Another Embodiment

In the above embodiment, the flow of the processes among the client PC 102A, photo site server 105, and print site 109A when the photo site makes settlement has been explained.

This embodiment will explain a case wherein the print site makes settlement.

Figure 75:
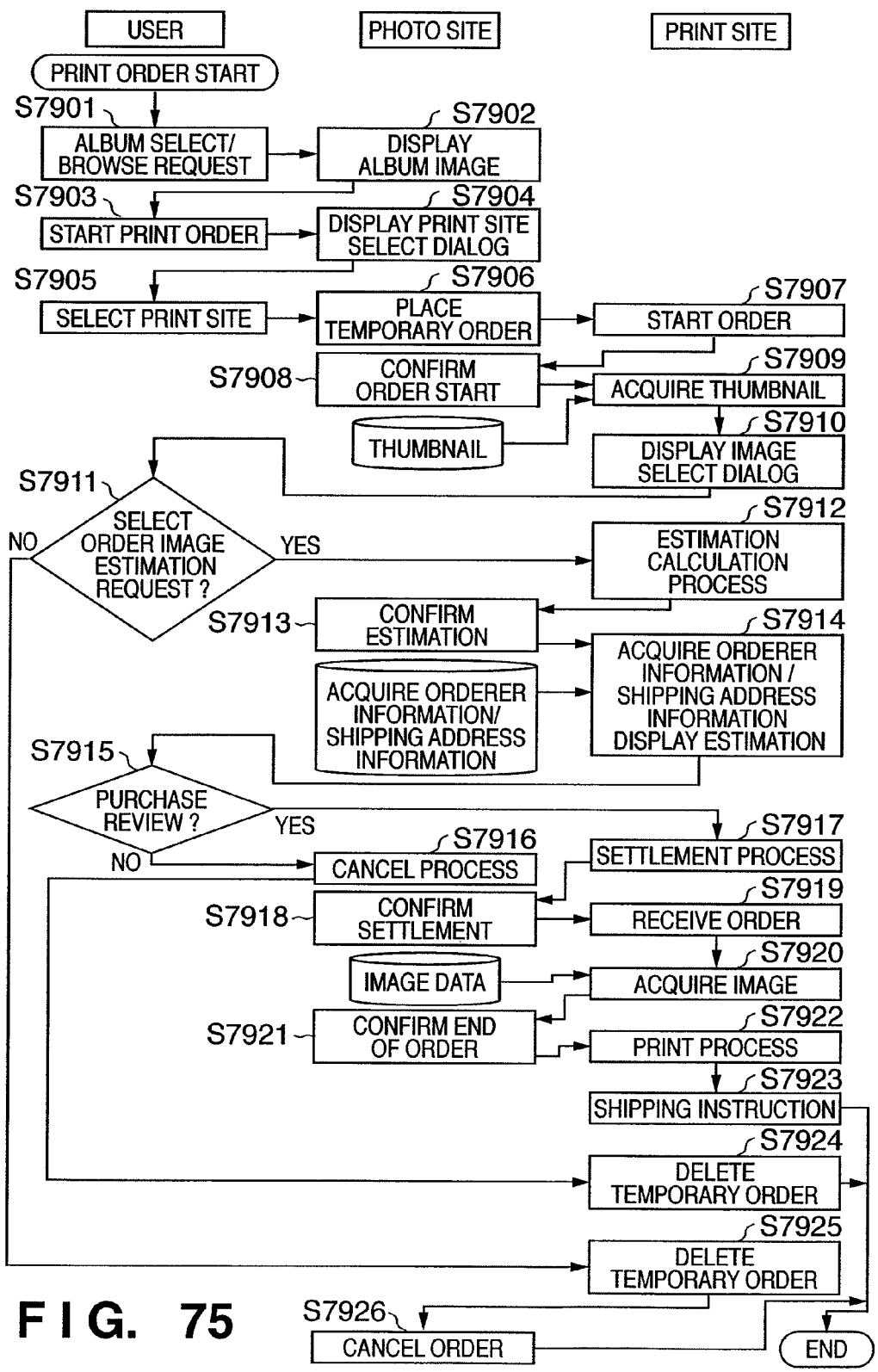
FIG. 75 is a flow chart showing the flow of processes among a client PC, photo site, and print site when a print order is placed using the photo site and a settlement process is done at the print site in another embodiment of the present invention.

FIG. 75 is a flow chart showing the flow of the processes among the client PC 102A, photo site server 105, and print site 109A when the print site makes settlement and the user places a print order in such system. Since the processes in FIG. 75 are substantially the same as those in FIG. 41 except that the print site 109A makes settlement in place of the photo site server 105, and only associated processes are different, only processes different from FIG. 41 will be explained.

Processes in steps S7901, S7902, S7903, S7904, S7905, S7906, S7907, S7908, S7909, and S7910 in FIG. 75 are respectively the same as those in steps S4201, S4202, S4203, S4204, S4205, S4206, S4222, S4223, S4224, and S4207 in FIG. 41.

If the user selects order images from the order dialog 4400, inputs sizes and quantities, and then presses the estimation button 4405 in step S7911, the print site 109A executes an estimation calculation process in accordance with the flow shown in FIG. 80 in step S7912, as will be described later. If it is determined in step S7911 that the user does not issue any estimation request, i.e., he or she presses the cancel button 4405 on the dialog 4400, the print site 109A deletes a temporary order in step S7925, and notifies the photo site server 105 of cancel of the order. In step S7926, the photo site server 105 cancels the temporary order process, and displays the dialog 2900.

Upon notification of estimation status from the photo site 109A by calling the print status notification CGI, the photo site server 105 updates the status 1014 of a record, corresponding to the print order ID designated as an argument of the print status notification CGI, in the order information data table 1000 to "2" (estimation). Also, the photo site server 105 generates orderer information and shipping address information based on the record of the customer information data table 400 corresponding to the orderer ID of the record, and saves them in the photo site server 105. The photo site server 105 generates a new record in an orderer information/shipping address information table 8100, and sets the path to a file that saves the orderer information and shipping address information in a file path 8103 of orderer information/shipping address information, "0" (unlock state) in a lock flag 8104, "0" (not acquired) in an acquired flag 8105, and "0" in an acquisition count 8106. FIG. 76 shows an example of the orderer information and shipping address information.

The photo site server 105 returns a URL of an orderer information/shipping address information acquisition CGI as a return value of the print status notification CGI. In this embodiment, the URL of the orderer information/shipping address information acquisition CGI is returned as the return value of the print status notification CGI. Alternatively, orderer information/shipping address information may be generated upon placing a temporary order, and the URL of the orderer information/shipping address information acquisition CGI may be described in a temporary order shown in FIG. 53.

Figure 81:
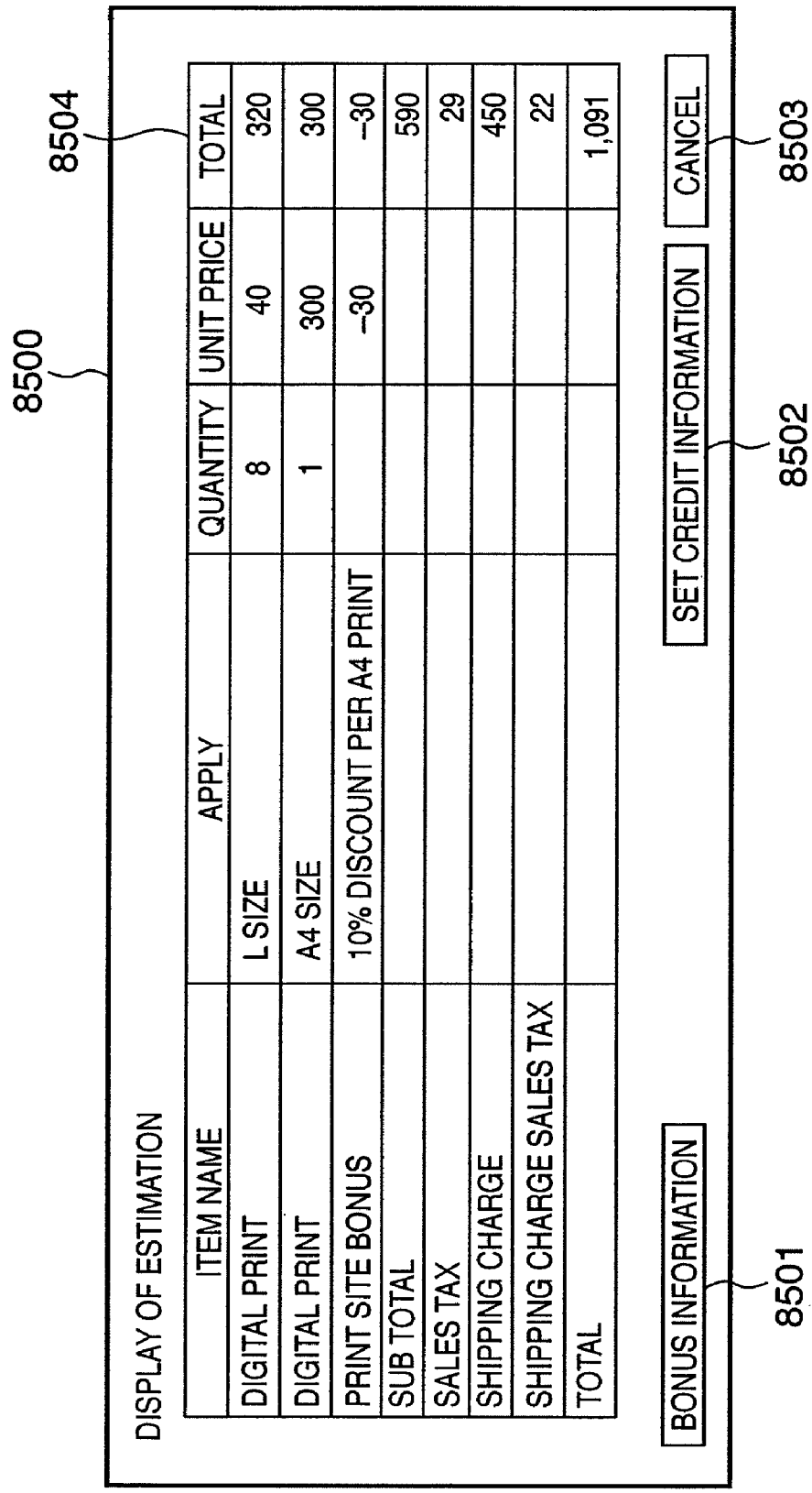
FIG. 81 shows a display example of an estimation dialog displayed at the print site in the other embodiment of the present invention.

In step S7914, the print site 109A acquires the orderer information and shipping address information by calling the URL of the orderer information/shipping address information acquisition CGI obtained as the return value of the print status notification CGI, and makes estimation display on the basis of the estimation amount calculated in step S7912 and a shipping charge obtained from the orderer information/shipping address information. A dialog 8500 shown in FIG. 81 is an example of an estimation display dialog displayed at that time. An estimation display field 8504 displays print amounts for respective print paper sheets, and then displays bonus information at the print site. Furthermore, the total amount (print charge) to be paid for the print site, shipping charge, and shipping charge tax are summed up, and bonus information at the photo site are added to the sum, thus displaying the amount that the user must pay. Upon calling the URL of the orderer information/shipping address information acquisition CGI, the photo site server 105 confirms if the lock flag 8104 is "0" (unlock state) and the acquired flag 8105 is "0" (not acquired) in the corresponding record in the orderer information/shipping address information table 8100. The photo site server 105 then returns the contents of a file designated by the file path 8103 of orderer information/shipping address information as a return value of the CGI, and increments the acquisition count 8106 by "1". If the values of the lock flag 8104 and acquired flag 8105 are other than the above values, an acquisition failure is returned as a return value of the CGI.

After the estimation dialog is displayed, the user makes a purchase review process in step S7915. In FIG. 75, only purchase review is described in step S7915. However, upon purchase review, the input process of credit information shown in FIG. 45, and the shipping address information shown in FIG. 46 is executed between the print site 109A and user PC 102A. If a cancel button 8503, 4602, or 4702 is pressed during purchase review, the flow advances to step S7916 to execute a cancel process. Since a shipping charge is flat in this embodiment, the aforementioned flow is used. However, if the shipping charge varies depending on the shipping addresses, a dialog for this process is displayed by the print site 109A before the estimation calculation process in step S7912.

If the user approves the estimation and places an order, the print site 109A executes a settlement process in step S7917, and notifies the photo site server 105 of the end of the settlement process by calling the URL 1505 to the print status notification CGI of the photo site server 105, which is registered in advance in the photo site data table 1500 of the print site 109A, together with required arguments (print order ID, status (3)).

Upon reception of the settlement process notification from the print site 109A, the photo site server 105 updates the status 1014 in the order information data table 1000, which corresponds to the print order ID designated as the argument of the print status notification CGI to "3" (settlement). Also, the photo site server 105 sets the lock flag 111 in the order image data table 1100 corresponding to each image data used in a print process to "0" (unlock state), and updates the acquired flag 8105 in the record, which corresponds to the print order ID designated as the argument of the print status notification CGI, in the orderer information/shipping address information table 8100 to "1" (acquired). In this way, the orderer information/shipping address information can be prevented from being unnecessarily acquired from the print site 109A.

Upon completion of the settlement process end notification to the photo site server 105, the print site 109A executes an order reception process in step S7919. After step S7919, processes in steps S7920, S7921, S7922, and S7923 are the same those in steps S4214, S4215, S4225, S4216, and S4217 in FIG. 41.

(Example of Sequence of Estimation Calculation Process)

Figure 80:
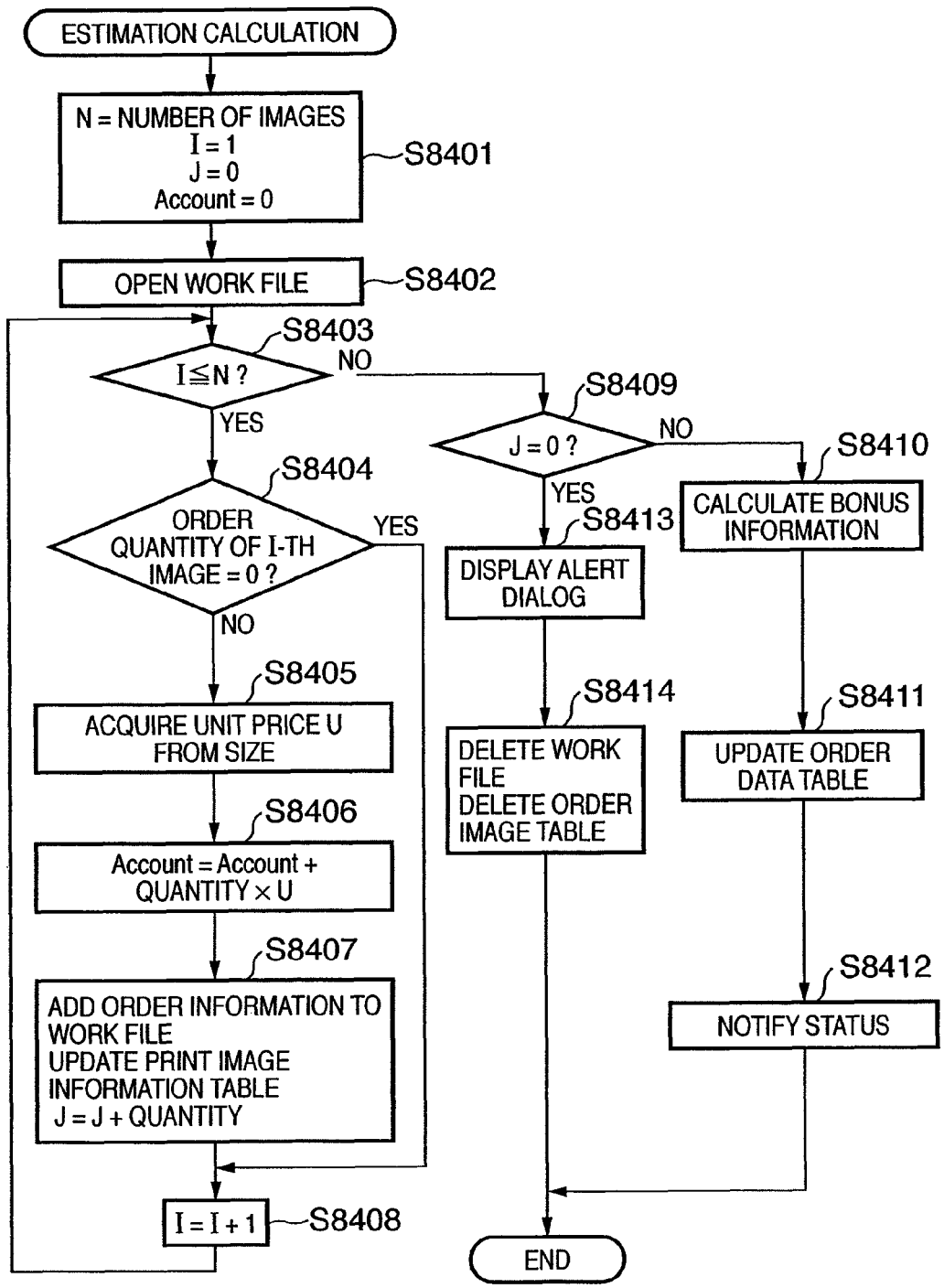
FIG. 80 is a flow chart showing an estimation calculation process at the print site in the other embodiment of the present invention.

FIG. 80 is a flow chart showing the estimation calculation process at the print site in this embodiment. The estimation calculation process will be described below along steps.

In step S8401, the number of images displayed on the dialog 4400 is set in N, "1" is substituted in work image counter I, "0" is substituted in work order image count J, and "0" is substituted in work total amount Account. In step S8402, a work file is created.

It is checked in step S8403 if I≦N. By repeating processes in steps S8404 to S8408 while I≦N, estimation information and the total amount for all images can be calculated.

In step S8404, the value of the quantity input field 4404 of the I-th image on the dialog 4400 is acquired, and it is checked if the acquired value is "0". If the value is not "0", information set in the size input field 4403 is acquired and unit price U corresponding to that size is acquired from a corresponding paper size in the service content data list 5800 in step S8405.

In step S8406, an amount obtained by multiplying the image print quantity by U is added to Account.

In step S8407, order estimation information associated with the I-th image is added to the work file. Furthermore, the print image information table 1700 in the database 119A is searched for a record which has the current print site receipt number in the receipt number 1701, and I in the image number 1702. The contents of the print quantity 1706 and print size 1707 of the retrieved record are updated by the current setting values, and the print unit price 1709 is updated by U. By adding the currently set print quantity to J, the number of images that has been print-ordered so far is held.

In step S8408, I is incremented by "1", and the flow returns to step S8403. If it is determined in step S8404 that the order quantity is "0", I is incremented by "1" In step S8408, and the flow returns to step S8403.

If it is determined in step S8403 that I>N, it is checked in step S8409 if J=0. If J=0, since it is determined no print image is selected, an alert dialog is displayed in step S8415. The alert dialog displayed at this time is the same as the dialog 4900. Upon depression of the OK button, the work file is deleted in step S8416, and the dialog 4400 is displayed again.

If J≠0 in step S8409, a charge of some bonus at the print site is calculated in step S8410 if such bonus is available. Note that the bonus information is acquired by searching the print site bonus list 5900 shown in FIG. 58. If a list corresponding to the size ID in the service content data list is present, a discount described in a price field is given in accordance with the quantity in a bonus unit field.

In step S8411, the order data table 1600 is searched for a record having the current print site receipt number as the receipt number 1601. The print type 1607 of the retrieved record is updated by information input in the type input field 4401 on the dialog 4400, and Account is substituted in the print charge 1608. Also, the bonus charge and print tax are respectively input to the fields 1609 and 1610. Furthermore, the estimated shipping charge and shipping charge tax are input to the fields 1611 and 1612, and the sum total of the values set in the fields 1608 to 1612 is set in the total amount 1613, thus updating the record.

In step S8412, the print site 109A notifies the photo site server 105 of completion of estimation by calling the URL 1505 to the print status notification CGI of the photo site server 105, which is registered in the photo site data table 1500 of the print site 109A in advance, together with required arguments (print order ID, status (2)). Upon reception of that notification, the photo site server 105 updates the status value 1014 of the record corresponding to the temporary order, which is being processed, in the order information data table 1000 to "2" (estimation).

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores the program codes corresponding to the aforementioned flow charts.

As described above, according to the present invention, when a second information processing apparatus acquires image data stored in a first information processing apparatus, whether or not an unwanted image is transferred from the first information processing apparatus to the second information processing apparatus, and whether or not image data illicitly leaks are confirmed. Hence, unwanted image data can be prevented from leaking from the first information processing apparatus to the second information processing apparatus, and image data that has already been acquired by the second information processing apparatus can be prevented from being repetitively transferred from the first information processing apparatus to the second information processing apparatus.

According to the present invention, the second information processing apparatus notifies the first information processing apparatus of state transition of a series of processes to be executed by the second information processing apparatus, and information such as image data or the like corresponding to the current state of the series of processes to be executed by the second information processing apparatus is passed to the second information processing apparatus. Hence, information such as unwanted image data or the like can be prevented from leaking to the second information processing apparatus.

As many apparently widely different embodiments of the present invention can be made without departing from the spirit and scope thereof, it is to be understood that the invention is not limited to the specific embodiments thereof except as defined in the appended claims.

What is claimed is:

1. A system comprising a data managing apparatus and a print processing apparatus, in which image data designated as a target to be printed by a user terminal is transmitted, via a network, from the data managing apparatus that stores the image data, to the print processing apparatus that performs a printing process on the image data,
   wherein the data managing apparatus includes:
      a computer processor;
      a memory unit;
      a managing unit that stores a table that associates the image data with an acquired flag indicating whether the print processing apparatus has acquired the image data from the data management apparatus;
      an updating unit that updates the acquired flag to a state indicating that the print processing apparatus has not acquired the image data from the data management apparatus, if a settlement processing of a printing cost for the image data has been completed by the user terminal, and which updates the acquired flag to a state indicating that the print processing apparatus has acquired the image data from the data management apparatus, if the settlement processing of the printing cost for the image data has been completed and the image data has been transmitted to the print processing apparatus from the data management apparatus;
      a referring unit that refers to the acquired flag stored by the managing unit, in response to a request for acquiring the image data from the print processing apparatus; and
      a transmission control unit that allows the image data to be transmitted to the print processing apparatus, if, based on a result of the referring by the referring unit, the acquired flag is determined to be in the state indicating that the print processing apparatus has not acquired the image data from the data management apparatus, and prohibits the image data from being transmitted to the print processing apparatus, if, based on the result of the referring by the referring unit, the acquired flag is determined to be in the state indicating that the print processing apparatus has acquired the image data from the data management apparatus, and
   wherein the print processing apparatus includes a print processing unit that performs the printing process on the image data transmitted from the data managing apparatus to the print processing apparatus.

2. A data managing apparatus for accepting a designation of image data as a target to be printed from a user terminal and for transmitting, via a network, the image data to a print processing apparatus for performing a printing process on the image data, comprising:
   a computer processor;
   a memory unit;
   a managing unit that stores a table that associates the image data with an acquired flag indicating whether the print processing apparatus has acquired the image data from the data management apparatus;
   an updating unit that updates the acquired flag to a state indicating that the print processing apparatus has not acquired the image data from the data management apparatus, if a settlement processing of a printing cost for the image data has been completed by the user terminal, and which updates the acquired flag to a state indicating that the print processing apparatus has acquired the image data from the data management apparatus, if the settlement processing of the printing cost for the image data has been completed and the image data has been transmitted to the print processing apparatus from the data management apparatus;
   a referring unit that refers to the acquired flag stored by the managing unit, in response to a request for acquiring the image data from the print processing apparatus; and
   a transmission control unit that allows the image data to be transmitted to the print processing apparatus, if, based on a result of the referring by the referring unit, the acquired flag is determined to be in the state indicating that the print processing apparatus has not acquired the image data from the data management apparatus, and prohibits the image data from being transmitted to the print processing apparatus, if, based on the result of the referring by the referring unit, the acquired flag is determined to be in the state indicating that the print processing apparatus has acquired the image data from the data management apparatus.

3. The apparatus according to claim 2,
   wherein the table stored by the managing unit further associates the image data with a lock flag indicating whether the image data can be acquired from the data managing apparatus, wherein the updating unit further updates the lock flag to a state indicating that the image data cannot be acquired from the data managing apparatus, if the image data is designated by the user terminal, and updates the lock flag to a state indicating that the image data can be acquired from the data managing apparatus, if the settlement processing has been completed by the user terminal, wherein the referring unit refers to the lock flag together with the acquired flag, and wherein the transmission control unit allows the image data to be transmitted to the print processing apparatus, if, as a result of the referring by the referring unit, the lock flag is determined to be in the state indicating that the image data can be acquired from the data managing apparatus and the acquired flag is determined to be in the state indicating that the print processing apparatus has not acquired the image data.

4. The apparatus according to claim 2, wherein the managing unit associates the image data with a plurality of acquired flags, and wherein each acquired flag indicates whether a different one of a plurality of print processing apparatuses has acquired the image data.

5. A method of managing image data in a data managing apparatus for accepting a designation of the image data as a target to be printed from a user terminal and for transmitting, via a network, the image data to a print processing apparatus for performing a printing process on the image data, the method comprising:

storing a table that associates the image data with an acquired flag indicating whether the print processing apparatus has acquired the image data from the data management apparatus;

updating the acquired flag to a state indicating that the print processing apparatus has not acquired the image data from the data management apparatus, if a settlement processing of a printing cost for the image data has been completed by the user terminal, and updating the acquired flag to a state indicating that the print processing apparatus has acquired the image data from the data management apparatus, if the settlement processing of the printing cost for the image data has been completed and the image data has been transmitted to the print processing apparatus from the data management apparatus;

referring to the acquired flag, in response to a request for acquiring the image data from the print processing apparatus; and allowing the image data to be transmitted to the print processing apparatus, if, based on a result of the referring, the acquired flag is determined to be in the state indicating that the print processing apparatus has not acquired the image data from the data management apparatus, and prohibiting the image data from being transmitted to the print processing apparatus, if, based on the result of the referring, the acquired flag is determined to be in the state indicating that the print processing apparatus has acquired the image data from the data management apparatus.

6. A non-transitory computer-readable storage medium storing a program that, when executed by a computer, causes the computer to perform a method of managing image data in a data managing apparatus for accepting a designation of the image data as a target to be printed from a user terminal and transmitting, via a network, the image data to be printed to a print processing apparatus for performing a printing process on the image data, the method comprising:

storing a table that associates the image data with an acquired flag indicating whether the print processing apparatus has acquired the image data from the data management apparatus;

updating the acquired flag to a state indicating that the print processing apparatus has not acquired the image data from the data management apparatus, if a settlement processing of a printing cost for the image data has been completed by the user terminal, and updating the acquired flag to a state indicating that the print processing apparatus has acquired the image data from the data management apparatus, if the settlement processing of the printing cost for the image data has been completed and the image data has been transmitted to the print processing apparatus from the data management apparatus;

referring to the acquired flag, in response to a request for acquiring the image data from the print processing apparatus; and allowing the image data to be transmitted to the print processing apparatus, if, based on a result of the referring, the acquired flag is determined to be in the state indicating that the print processing apparatus has not acquired the image data from the data management apparatus, and prohibiting the image data from being transmitted to the print processing apparatus, if, based on the result of the referring, the acquired flag is determined to be in the state indicating that the print processing apparatus has acquired the image data from the data management apparatus.

* * * * *